US010609404B2

(12) United States Patent
Kurokawa

(10) Patent No.: US 10,609,404 B2
(45) Date of Patent: Mar. 31, 2020

(54) DECODER, RECEIVER, AND ELECTRONIC DEVICE IN BROADCAST SYSTEM

(71) Applicant: SEMICONDUCTOR ENERGY LABORATORY CO., LTD., Atsugi-shi, Kanagawa-ken (JP)

(72) Inventor: Yoshiyuki Kurokawa, Kanagawa (JP)

(73) Assignee: Semiconductor Energy Laboratory Co., Ltd., Atsugi-shi, Kanagawa-ken (JP)

(*) Notice: Subject to any disclaimer, the term of this patent is extended or adjusted under 35 U.S.C. 154(b) by 0 days.

(21) Appl. No.: 16/371,174

(22) Filed: Apr. 1, 2019

(65) Prior Publication Data

US 2019/0230373 A1 Jul. 25, 2019

Related U.S. Application Data

(63) Continuation of application No. 15/089,715, filed on Apr. 4, 2016, now abandoned.

(30) Foreign Application Priority Data

Apr. 13, 2015 (JP) .................................. 2015-082016

(51) Int. Cl.
*H03K 19/173* (2006.01)
*H04N 11/02* (2006.01)
(Continued)

(52) U.S. Cl.
CPC ............. *H04N 19/44* (2014.11); *H04N 19/42* (2014.11); *H04N 19/436* (2014.11)

(58) Field of Classification Search
CPC ...... H04N 19/42; H04N 19/436; H04N 19/44; H01L 27/1225; H01L 29/7869;
(Continued)

(56) References Cited

U.S. PATENT DOCUMENTS 5,614,952 A 3/1997 Boyce et al.
5,995,439 A * 11/1999 Watanabe ................ G11C 7/02
365/230.03
(Continued)

FOREIGN PATENT DOCUMENTS

CN 001166668 A 12/1997
CN 001501706 A 6/2004
(Continued)

OTHER PUBLICATIONS

Kawashima.S et al., "13.3-in. 8K×4K 664-ppi OLED Display Using CAAC-OS FETs", SID Digest '14 : SID International Symposoim Digest of Technical Papers, Jun. 3, 2014, pp. 627-630.
(Continued)

*Primary Examiner* — Jessica M Prince

(74) *Attorney, Agent, or Firm* — Fish & Richardson P.C.

(57) ABSTRACT

Power consumption of a decoder is reduced. The decoder includes an FPGA. The FPGA performs at least one processing to decode the data. In the case where the data has first resolution, an input data signal of the FPGA is a binary signal and a clock frequency of the FPGA is a first frequency. In the case where the resolution of the data is lower than the first resolution, the input data signal of the FPGA is a pulse signal and the FPGA operates at a second frequency which is lower than the first frequency. The FPGA operates at the first clock frequency in the case of decoding 8K data and the FPGA operates at the second clock frequency in the case of decoding 4K or 2K data.

5 Claims, 36 Drawing Sheets

(51) Int. Cl.
*H04N 19/44* (2014.01)
*H04N 19/42* (2014.01)
*H04N 19/436* (2014.01)

(58) Field of Classification Search
CPC ......... H03K 19/09441; H03K 19/1737; H03K 19/17728; H03K 19/1776; H03K 2005/00195; H03K 3/012; H03K 3/037; H03K 3/356; H03K 3/86; H03K 5/134
See application file for complete search history.

(56) References Cited

U.S. PATENT DOCUMENTS

| | | |
|---|---|---|
| 6,037,925 A | 3/2000 | Kim |
| 6,222,757 B1 * | 4/2001 | Rau .................. H03K 19/1776 365/154 |
| 6,754,439 B1 | 6/2004 | Hensley et al. |
| RE38,568 E | 8/2004 | Kim |
| 7,088,136 B1 * | 8/2006 | Lewis .............. H03K 19/17728 326/38 |
| RE40,201 E | 4/2008 | Kim |
| RE40,905 E | 9/2009 | Kim |
| RE40,906 E | 9/2009 | Kim |
| 7,652,652 B2 | 1/2010 | Maeda et al. |
| RE41,564 E | 8/2010 | Kim |
| RE41,600 E | 8/2010 | Kim |
| 8,547,753 B2 | 10/2013 | Takemura et al. |
| 9,065,438 B2 | 6/2015 | Aoki et al. |
| 9,172,370 B2 | 10/2015 | Ikeda et al. |
| 9,356,589 B2 * | 5/2016 | Ebuchi ................ G06F 13/4282 |
| 9,461,646 B2 | 10/2016 | Kozuma et al. |
| 9,716,852 B2 | 7/2017 | Kurokawa |
| 9,876,499 B2 | 1/2018 | Kozuma et al. |
| 2003/0133504 A1 | 7/2003 | Hanami et al. |
| 2004/0221302 A1 | 11/2004 | Ansari et al. |
| 2005/0062889 A1 | 3/2005 | Linzer |
| 2007/0040890 A1 | 2/2007 | Morioka et al. |
| 2009/0027254 A1 | 1/2009 | Troxel |
| 2009/0066383 A1 * | 3/2009 | Uchida .................. H03K 3/017 327/175 |
| 2009/0196356 A1 | 8/2009 | Houki |
| 2010/0325651 A1 | 12/2010 | Kawai |
| 2013/0253938 A1 | 9/2013 | You |
| 2013/0336592 A1 | 12/2013 | Matsunobu et al. |
| 2014/0157342 A1 | 6/2014 | Yahata et al. |
| 2014/0159771 A1 | 6/2014 | Ikeda et al. |
| 2014/0226064 A1 | 8/2014 | Hamamura |
| 2014/0232932 A1 | 8/2014 | LiKamWa et al. |
| 2015/0029876 A1 | 1/2015 | Ogata et al. |
| 2015/0326923 A1 | 11/2015 | Chung et al. |
| 2016/0226490 A1 | 8/2016 | Kozuma et al. |
| 2016/0295152 A1 | 10/2016 | Kurokawa |
| 2017/0301391 A1 | 10/2017 | Kurokawa |

FOREIGN PATENT DOCUMENTS

| | | |
|---|---|---|
| JP | 2001-238190 A | 8/2001 |
| JP | 2003-209845 A | 7/2003 |
| JP | 2006-295337 A | 10/2006 |
| JP | 2010-206639 A | 9/2010 |
| JP | 2010-283588 A | 12/2010 |
| JP | 2015-026986 A | 2/2015 |
| JP | 2015-080187 A | 4/2015 |

OTHER PUBLICATIONS

International Search Report (Application No. PCT/162016/051812) dated Jul. 5, 2016.
Written Opinion (Application No. PCT/IB2016/051812) dated Jul. 5, 2016.

* cited by examiner

[binary signal]

data signal

[pulse signal]

data signal

[pulse signal]

LE 225

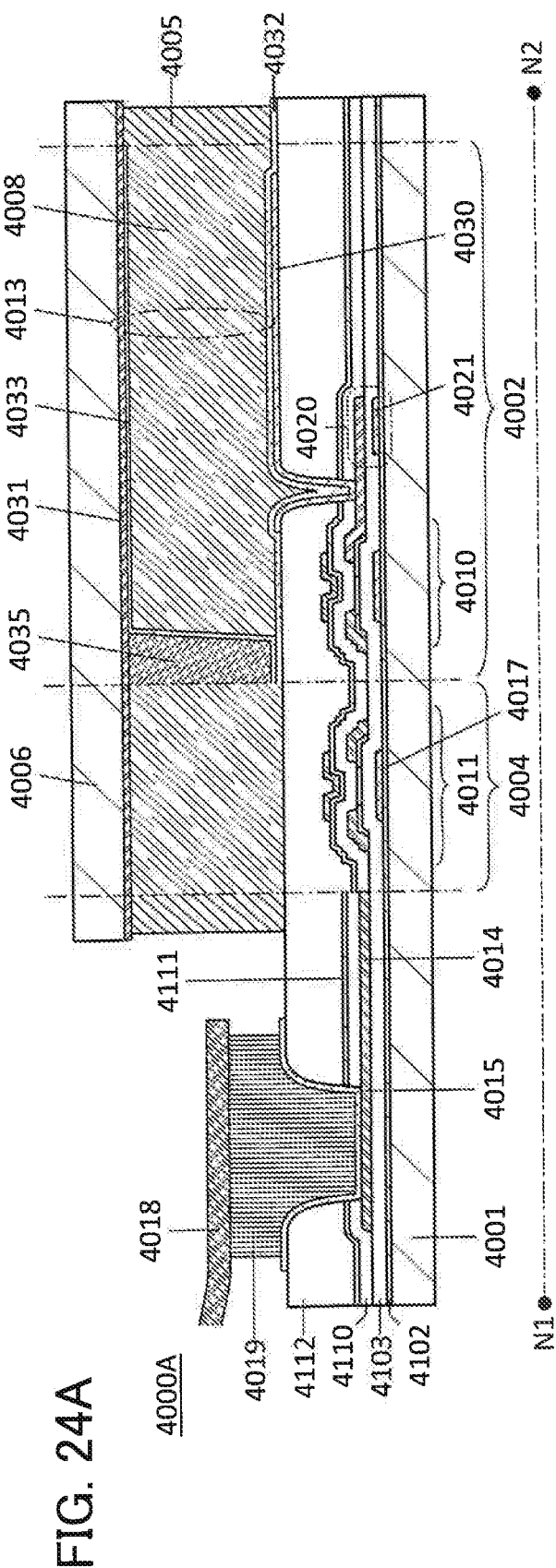
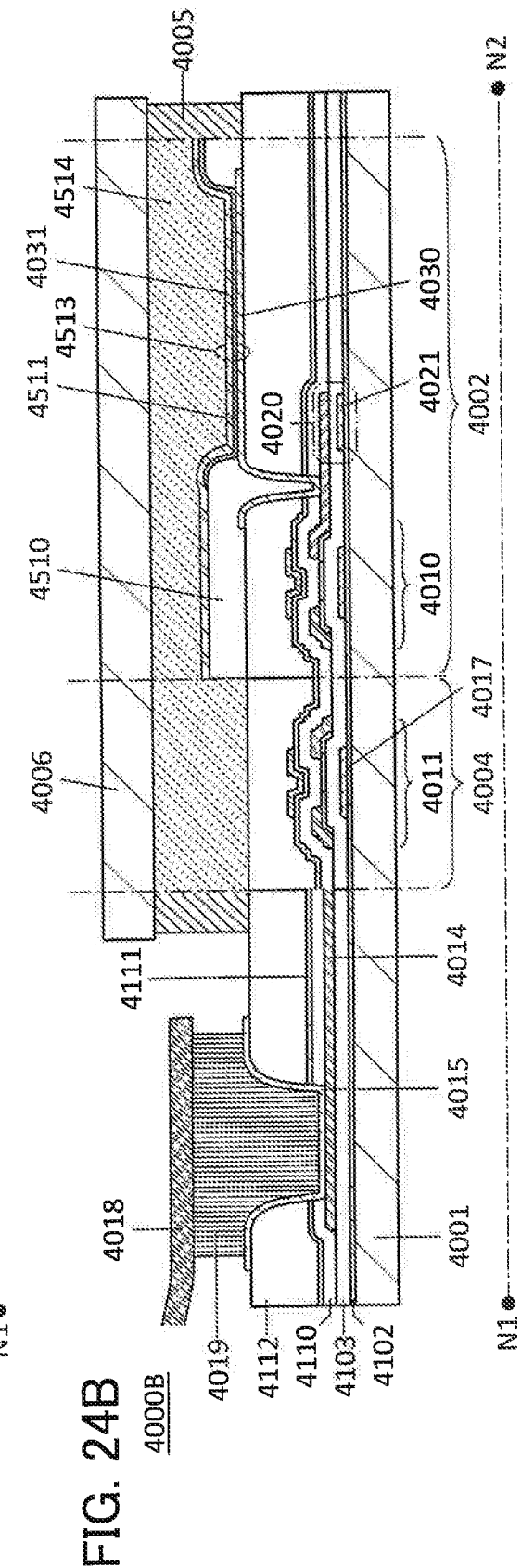
FIG. 24A
FIG. 24B

FIG. 31A
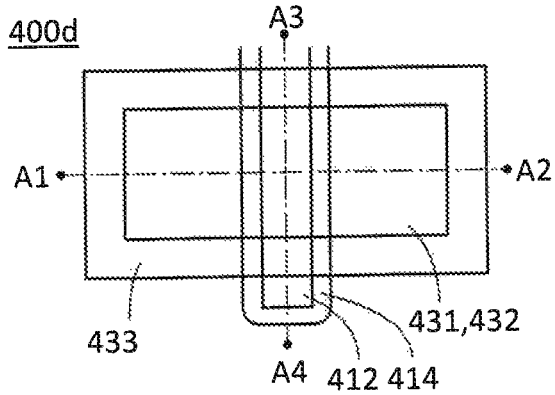
FIG. 31B
FIG. 31C
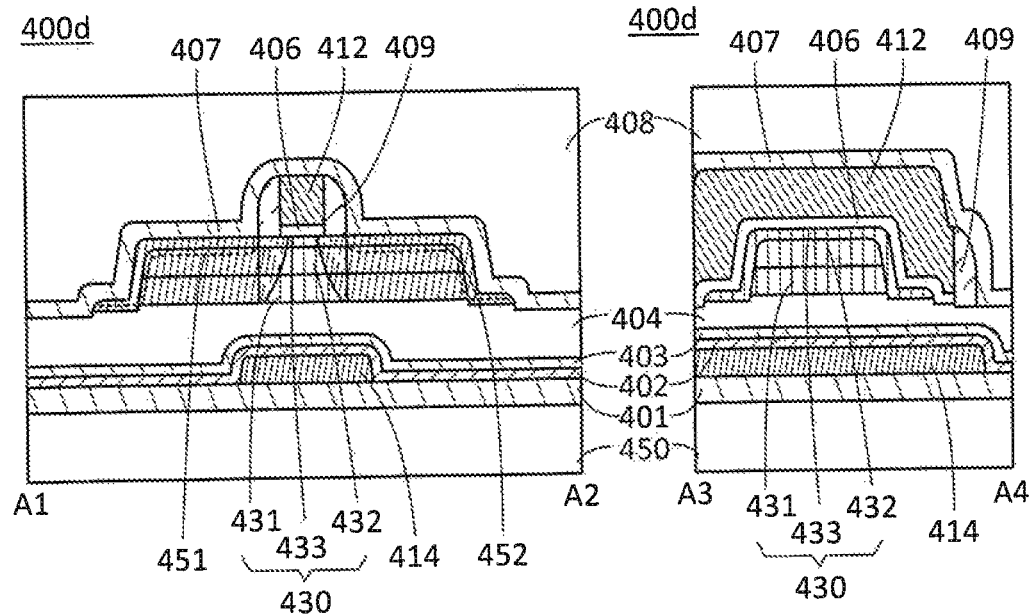
FIG. 31D
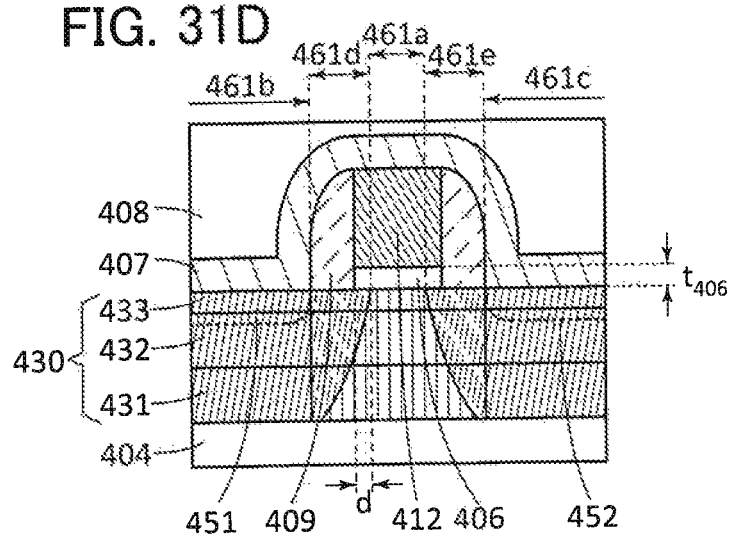

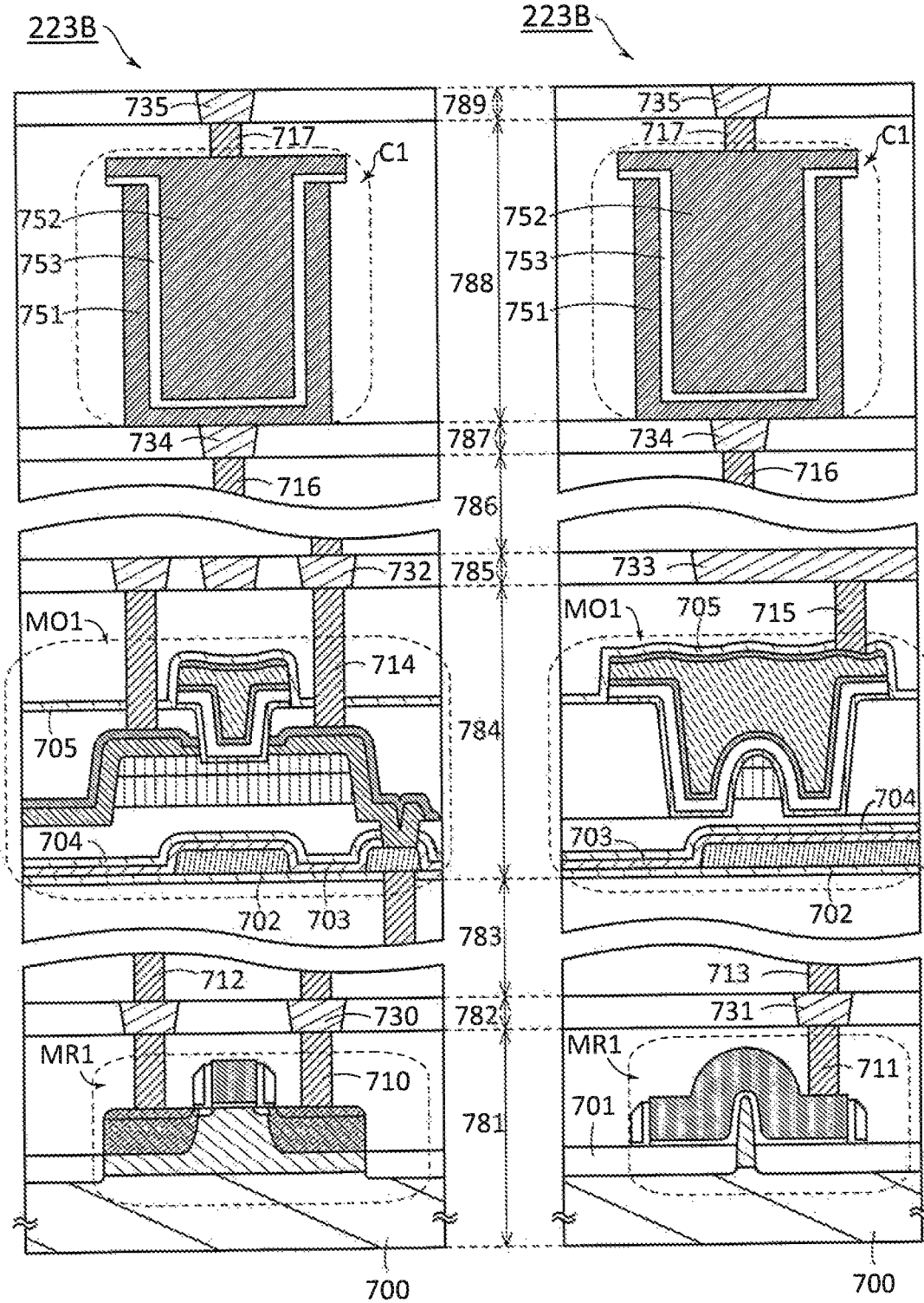

DECODER, RECEIVER, AND ELECTRONIC DEVICE IN BROADCAST SYSTEM

CROSS-REFERENCE TO RELATED APPLICATIONS

This application is a continuation of U.S. application Ser. No. 15/089,715, filed Apr. 4, 2016, now pending, which claims the benefit of a foreign priority application filed in Japan as Serial No. 2015-082016 on Apr. 13, 2015, both of which are incorporated by reference.

TECHNICAL FIELD

The specification, drawings, and claims of this application (hereinafter referred to as "this specification and the like") relates to a semiconductor device, an electronic component, an electronic device, operating methods thereof, and manufacturing methods thereof. Examples of a technical field of one embodiment of the present invention include a semiconductor device, a storage device, a processor, a switch circuit (e.g., a power switch and a wiring switch), a display device, a liquid crystal display device, a light-emitting device, a lighting device, a power storage device, an input device, an imaging device, a driving method thereof, and a manufacturing method thereof.

BACKGROUND ART

As a screen of a television (TV) becomes larger, it is desired to be able to watch a high-definition image. For this reason, ultra-high definition TV (UHDTV) broadcast has been increasingly put into practical use. In Japan, 4K broadcast service utilizing a communication satellite (CS) and an optical line are started in 2015. The test broadcast of UHDTV (4K and 8K) by a broadcast satellite (BS) will start in the future. Therefore, various electronic devices which correspond to 8K broadcast are developed (e.g., Non-Patent Document 1). In practical 8K broadcasts, 4K broadcasts and 2K broadcasts (full-high vision broadcast) will be also employed.

REFERENCE

Non-Patent Document

[Non-Patent Document] S. Kawashima, et al., "13.3-In. 8K×4K 664-ppi OLED Display Using CAAC-OS FETs," SID 2014 DIGEST, pp. 627-630.

DISCLOSURE OF INVENTION

As a video encoding method in 8K broadcast, a new standard of H.265|MPEG-H high efficiency video coding (hereinafter referred to as HEVC) is employed. The resolution (the number of pixels in the horizontal and perpendicular directions) of an image in 8K broadcast is 7680×4320, which is 4 times and 16 times as high as those in 4K (3840×2160) broadcast and 2K (1920×1080) broadcast, respectively. Therefore, a decoder (data expander) of a television for receiving 8K broadcast is required to have high performance; thus, the circuit size and operation frequency of the decoder are determined to achieve performance suitable for the 8K broadcast. In contrast, the operation efficiency of the decoder is reduced when receiving 4K broadcast or 2K broadcast because the decoder exceeds the specification limit.

An object of one embodiment of the present invention is to reduce power consumption or provide a novel semiconductor device or a method for driving the novel semiconductor device.

Note that objects are not mutually exclusive and several objects can coexist. One embodiment of the present invention does not necessarily achieve all the objects. Objects other than those listed above are apparent from the description of the specification, drawings, and claims, and such objects could be an object of one embodiment of the present invention.

According to one embodiment of the present invention, an FPGA is included in a decoder having a function of decoding data which is encoded. The FPGA performs at least one processing to decode the data. In the case where the data has a first resolution, an input data signal of the FPGA is a binary signal and a clock frequency of the FPGA is a first frequency. In the case where the resolution of the data is lower than the first resolution, the input data signal of the FPGA is a pulse signal and the clock frequency of the FPGA is a second frequency which is lower than the first frequency.

In the above embodiment, the FPGA may include a logic element. The logic element may include a data input portion to which the input data signal is input, an arithmetic circuit that performs an arithmetic operation on the input data signal, and a data output portion that processes a data signal which is obtained as a result of arithmetic operation performed in the arithmetic circuit and generates an output data signal. In the case where the resolution of the data is lower than the first resolution, the data input portion may be configured so that the input data signal can be converted into a binary signal, the data output portion may be configured so that the output data signal can be converted into a pulse signal, and power gating of the arithmetic circuit can be performed.

According to another embodiment of the present invention, a decoder having a function of decoding data which is encoded includes a circuit that performs first processing to decode the data. In the case where the data has a first resolution, an input data signal of the circuit is a binary signal and a clock frequency of the circuit is a first frequency. In the case where the resolution of the data is lower than the first resolution, the input data signal of the circuit is a pulse signal and the clock frequency of the circuit is a second frequency which is lower than the first frequency.

In the above embodiment, the circuit may include a data input portion to which the input data signal is input, a dedicated circuit that performs the first processing, and a data output portion that generates an output data signal from a signal processed in the dedicated circuit. In the case where the resolution of the data is lower than the first resolution, the data input portion may be configured so that the input data signal can be converted into a binary signal, the data output portion may be configured so that the output data signal can be converted into a pulse signal, and power gating of the dedicated circuit may be performed.

In this specification and the like, a semiconductor device refers to a device that utilizes semiconductor characteristics, and means a circuit including a semiconductor element (e.g., a transistor, a diode, or a photodiode), a device including the circuit, and the like. The semiconductor device also means any device that can function by utilizing semiconductor characteristics. For example, an integrated circuit, a chip including an integrated circuit, and an electronic component including a chip in a package are examples of semiconductor devices. Moreover, a storage device, a display device, a light-emitting device, a lighting device, an electronic device, and the like themselves might be semiconductor devices, or might each include a semiconductor device.

In this specification and the like, description "X and Y are connected" means that X and Y are electrically connected, X and Y are functionally connected, and X and Y are directly connected. Accordingly, without being limited to a predetermined connection relationship, for example, a connection relationship shown in drawings or texts, another connection relationship is included in the drawings or the texts. Each of X and Y denotes an object (e.g., a device, an element, a circuit, a wiring, an electrode, a terminal, a conductive film, or a layer).

A transistor is an element having three terminals: a gate, a source, and a drain. The gate functions as a control terminal for controlling the conduction state of the transistor. Depending on the type of the transistor or levels of potentials applied to the terminals, one of two input/output terminals functions as a source and the other functions as a drain. Therefore, the terms "source" and "drain" can be interchanged with each other in this specification and the like. In this specification and the like, two terminals except a gate are sometimes referred to as a first terminal and a second terminal or as a third terminal and a fourth terminal.

A node can be referred to as a terminal, a wiring, an electrode, a conductive layer, a conductor, an impurity region, or the like depending on a circuit structure, a device structure, and the like. Furthermore, a terminal, a wiring, or the like can be referred to as a node.

Note that voltage refers to a potential difference between a given potential and a reference potential (e.g., a ground potential (GND) or a source potential) in many cases. Voltage can be referred to as a potential. Note that a potential has a relative value. Accordingly, GND does not necessarily mean 0 V.

In this specification and the like, ordinal numbers such as "first," "second," and "third" are used to show the order in some cases. Alternatively, ordinal numbers such as "first," "second," and "third" are used to avoid confusion among components in some cases, and do not limit the number of components or do not limit the order. For example, it is possible to replace the term "first" with the term "second" or "third" in describing one embodiment of the present invention.

Other matters regarding the description of this specification and the like will be described in Embodiment 5.

One embodiment of the present invention can reduce power consumption or provide a novel semiconductor device or a method for driving the novel semiconductor device. The description of a plurality of effects does not preclude the existence of other effects. In one embodiment of the present invention, there is no need to achieve all the effects described above. In one embodiment of the present invention, an object other than the above objects, an effect other than the above effects, and a novel feature will be apparent from the description of the specification and the drawings.

BRIEF DESCRIPTION OF DRAWINGS

FIGS. 24A and 24B are cross-sectional views illustrating structure examples of a display panel.

FIG. 31A and FIGS. 31B to 31D are a top view and cross-sectional views, respectively, each illustrating a structure example of a transistor.

FIGS. 34A and 34B are cross-sectional views illustrating a structure example of a semiconductor device.

BEST MODE FOR CARRYING OUT THE INVENTION

Figure 1:
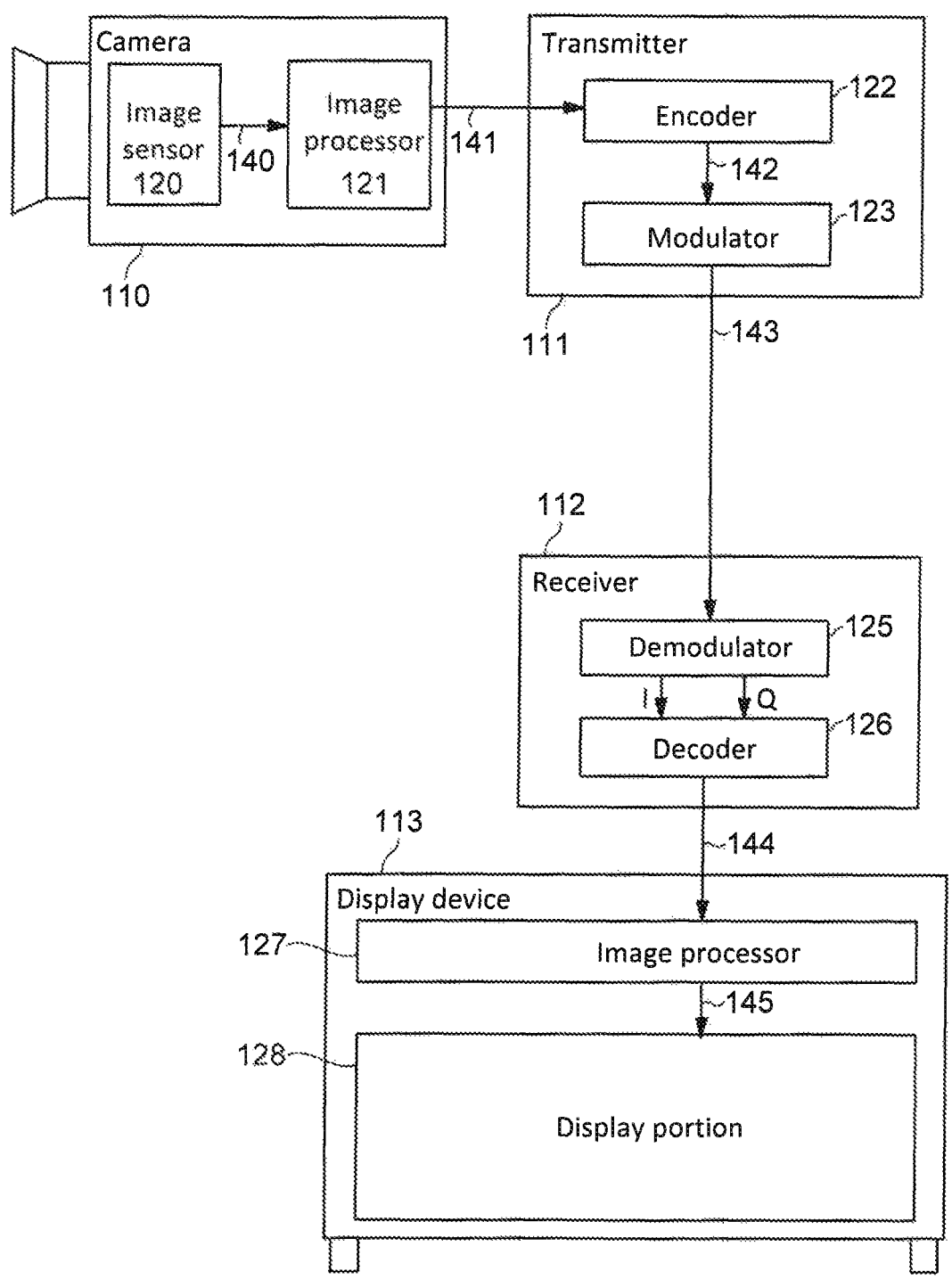
FIG. 1 is a block diagram illustrating a structure example of a broadcast system.

Embodiments of the present invention will be described below. Note that the present invention is not limited to the following description. It will be readily appreciated by those skilled in the art that modes and details of the present invention can be modified in various ways without departing from the spirit and scope of the present invention. The present invention therefore should not be construed as being limited to the following description of the embodiments.

Any of the embodiments described below can be combined as appropriate. When a plurality of structure examples (including a manufacturing method example, an operation method example, and the like) are shown in one embodiment, any of the structure examples can be combined with each other or combined with at least one structure example shown in another embodiment as appropriate.

In the drawings, the same components, components having similar functions, components formed of the same material, or components formed at the same time are sometimes denoted by the same reference numerals, and description thereof is not repeated in some cases. When a plurality of elements denoted by the same reference numerals need to be distinguished from one another, "_1", "_2", "[i, j]", or the like is sometimes added to the reference numerals. For example, in the case where three wirings WL are distinguished from one another, they are sometimes represented as wirings WL[0], WL[1], and WL[2].

In this specification, a high power supply potential VDD may be simply referred to as a potential VDD or VDD, for example. The same applies to other components (e.g., signal, voltage, circuit, element, electrode, and wiring).

Embodiment 1

<<Broadcast System>>

FIG. 1 is a block diagram schematically illustrating a configuration example of a broadcast system. A broadcast system 100 includes a camera 110, a transmitter 111, a receiver 112, and a display device 113. The camera 110 includes an image sensor 120 and an image processor 121. The transmitter 111 includes an encoder 122 and a modulator 123. The receiver 112 includes a demodulator 125 and a decoder 126. The display device 113 includes an image processor 127 and a display portion 128.

When the camera 110 is capable of taking an 8K image, the number of pixels included in the image sensor 120 corresponds to the number of pixels that can capture an 8K color image. For example, when one red (R) subpixel, two green (G) subpixels, and one blue (B) subpixel are included in one pixel, the image sensor 120 needs at least 7680×4320×4 [R, G+G, and B] pixels, the image sensor 120 with a 4K camera needs at least 3840×2160×4 pixels, and the image sensor 120 with a 2K camera needs at least 1920×1080×4 pixels.

The image sensor 120 generates Raw data 140 which is not processed. The image processor 121 performs image processing (such as noise removal or interpolation processing) on the Raw data 140 and generates an image data 141. The image data 141 is output to the transmitter 111.

The transmitter 111 processes the image data 141 and generates a broadcast signal 143 (a carrier wave) that accords with a broadcast band. The encoder 122 processes the image data 141 and generates an encoded data 142. The encoder 122 performs processing of encoding the image data 141, processing of adding data for controlling broadcast (e.g., authentication data) to the image data 141, encryption processing, scramble processing (processing of rearranging data for spread spectrum), or the like.

The modulator 123 performs IQ modulation (orthogonal amplitude modulation) on the encoded data 142 to generate and output the broadcast signal 143. The broadcast signal 143 is a composite signal including data on components of I (identical phase) and Q (quadrature phase). ATV broadcast station takes a role in obtaining the image data 141 and supplying the broadcast signal 143.

The receiver 112 receives the broadcast signal 143. The receiver 112 has a function of converting the broadcast signal 143 into an image data 144 that can be displayed on the display device 113. The demodulator 125 demodulates the broadcast signal 143 and decomposes it into two analog signals of an I signal and a Q signal.

The decoder 126 performs the processing of converting the I signal and the Q signal into a digital signal. Moreover, the decoder 126 performs various processing on the digital signal and generates a data stream. This processing includes frame separation, decryption of a low density parity check (LDPC) code, separation of data for controlling broadcast, descramble processing, and the like. The decoder 126 decodes the data stream and generates the image data 144. The processing for decryption includes orthogonal transform such as discrete cosine transform (DCT) and discrete sine transform (DST), inter-frame prediction processing, and motion compensation prediction processing.

The image data 144 is input to the image processor 127 of the display device 113. The image processor 127 processes the image data 144 and generates a data signal 145 that can be input to the display portion 128. The processing by the image processor 127 includes image processing (gamma processing), digital-analog conversion processing, and the like. The data signal 145 is input, whereby the display portion 128 displays an image.

Figure 2:
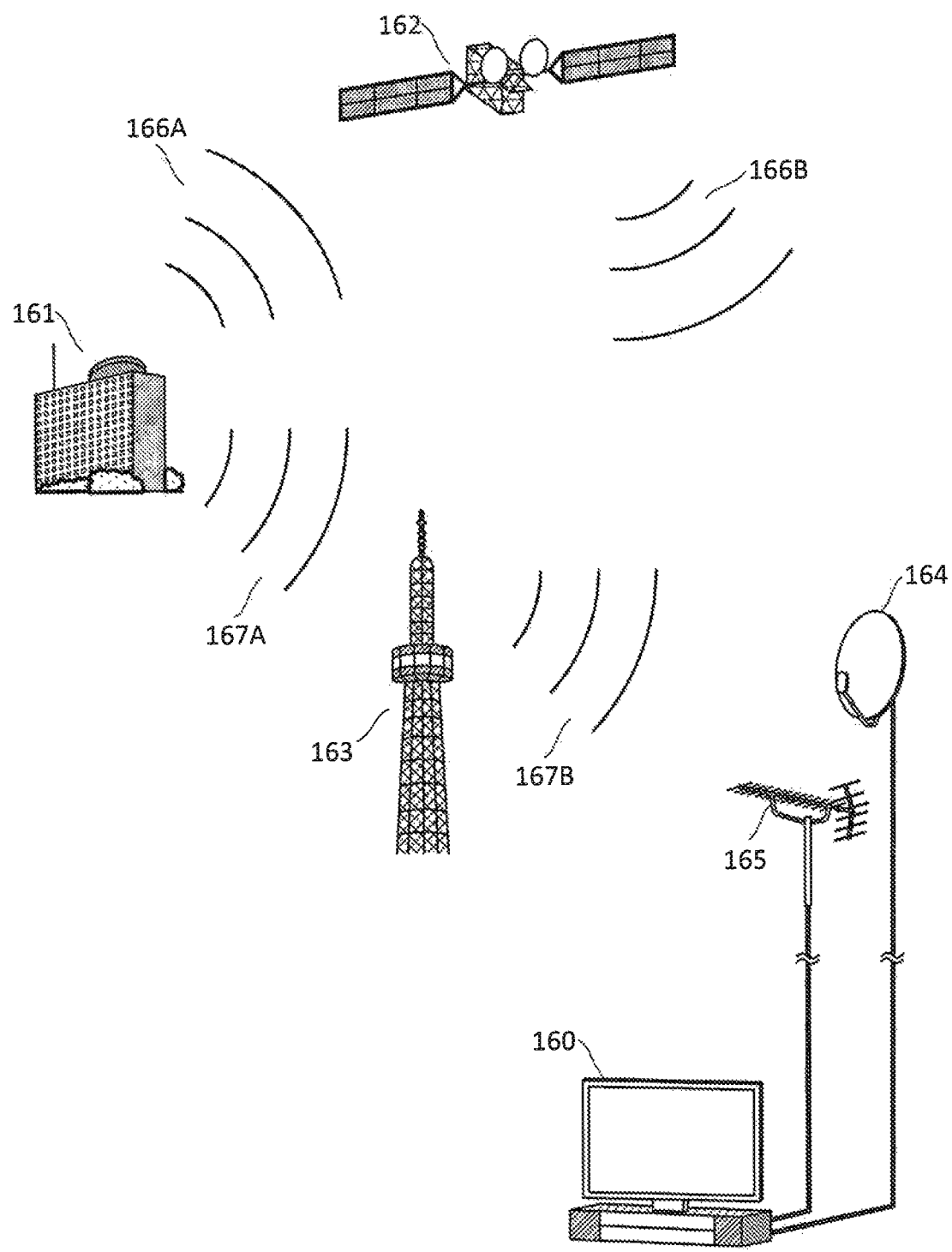
FIG. 2 is a schematic view illustrating data transmission in a broadcast system.

FIG. 2 schematically illustrates data transmission in the broadcast system. FIG. 2 illustrates a path in which a radio wave (a broadcast signal) transmitted from a broadcast station 161 is delivered to a television receiver 160 (a TV 160) of every household. The TV 160 is provided with the receiver 112 and the display device 113. As examples of an artificial satellite 162, a communication satellite (CS) and a broadcast satellite (BS) can be given. As examples of an antenna 164, a BS·110° CS antenna and a CS antenna can be given. As examples of an antenna 165, ultra high frequency (UHF) antenna can be given.

Radio waves 166A and 166B are broadcast signals for a satellite broadcast. The artificial satellite 162 transmits the radio wave 166B toward the ground when receiving the radio wave 166A. The antenna 164 of every household receives the radio wave 166B, and a satellite TV broadcast can be watched on the TV 160. Alternatively, the radio wave 166B is received by an antenna of another broadcast station, and a receiver in the broadcast station processes the radio wave 166B into a signal that can be transmitted to an optical cable. The broadcast station transmits the broadcast signal to the TV 160 of every household using an optical cable network. Radio waves 167A and 167B are broadcast signals for a terrestrial broadcast. A radio wave tower 163 amplifies the received radio wave 167A and transmits it as the radio wave 167B. A terrestrial TV broadcast can be watched on the TV 160 of every household when the antenna 165 receives the radio wave 167B.

An image distribution system of this embodiment is not limited to a system for a TV broadcast. Image data to be distributed may be either moving image data or still image data.

Figure 36:
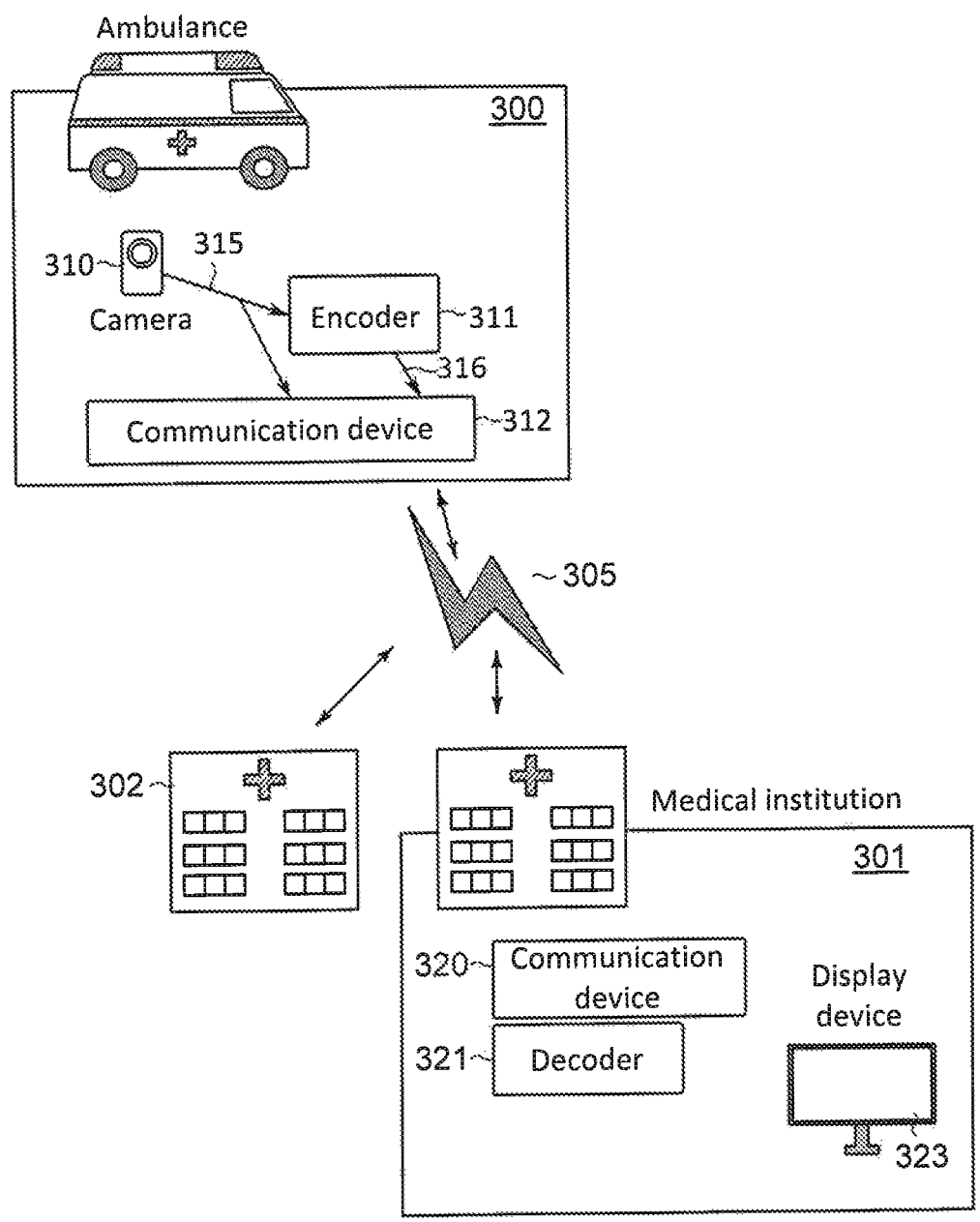
FIG. 36 illustrates a structure example of an image distribution system in the medical field.

For example, the image data 141 of the camera 110 may be distributed via a high-speed IP network. The distribution system of the image data 141 can be used in, for example, the medical field for remote diagnosis and remote treatment. For accurate image diagnosis and medical practice, an image used for medical practice is required to have a high definition, and the distribution system of the image data that can be displayed on a high-resolution display device (8K, 4K, or 2K) is required. FIG. 36 schematically illustrates an emergency medical system using the distribution system of the image data.

A high-speed network 305 performs communication between an emergency transportation vehicle (an ambulance) 300 and a medical institution 301 and between the medical institution 301 and a medical institution 302. The ambulance 300 is equipped with a camera 310, an encoder 311, and a communication device 312.

A patient taken to the medical institution 301 is photographed with the camera 310. An image data 315 obtained with the camera 310 can be transmitted in an uncompressed state by the communication device 312, so that the high-resolution image data 315 can be transmitted to the medical institution 301 with a short delay because no time is required for compression of the image data 315. In the case where the high-speed network 305 cannot be used for the communication between the ambulance 300 and the medical institution 301, the image data can be encoded with the encoder 311 and the encoded image data 316 can be transmitted.

In the medical institution 301, a communication device 320 receives the image data transmitted from the ambulance 300. When the received image data is uncompressed data, the data is transmitted and displayed on a display device 323 via the communication device 320. When the image data is compressed data, the data is expanded with a decoder 321 and then transmitted and displayed on the display device 323. Judging from the image on the display device 323, doctors instruct crews of the ambulance 300 or staff members in the medical institution 301 who treat the patient. The doctors can check the condition of the patient in detail in the medical institution 301 while the patient is taken by the ambulance because the distribution system in FIG. 36 can transmit a high-definition image. Therefore, the doctors can instruct the ambulance crews or the staff members appropriately in a short time, resulting in improvement of a lifesaving rate of patients.

The communication of image data between the medical institution 301 and the medical institution 302 can be performed in the same way. A medical image obtained from an image diagnostic device (such as CT or MRI) of the medical institution 301 can be transmitted to the medical institution 302. Here, the ambulance 300 is given as an example of the means to transport patients; however, an aircraft such as a helicopter or a vessel may be used.

Figure 3A:
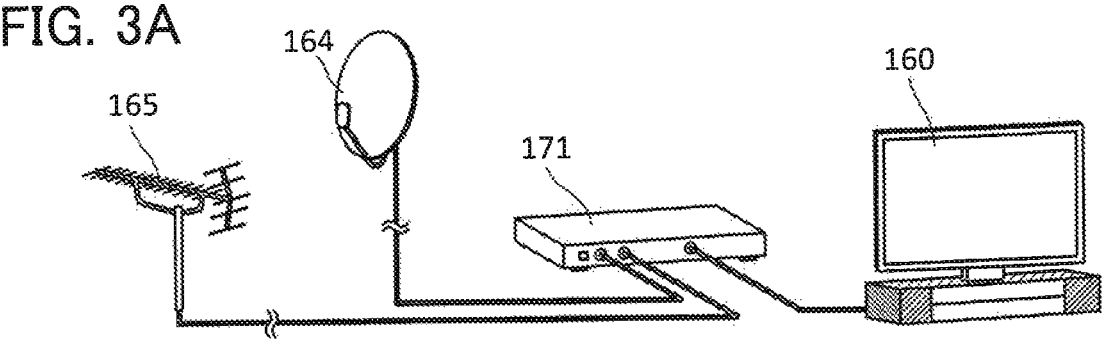
FIGS. 3A to 3D illustrate structure examples of a receiver.
Figure 3B:
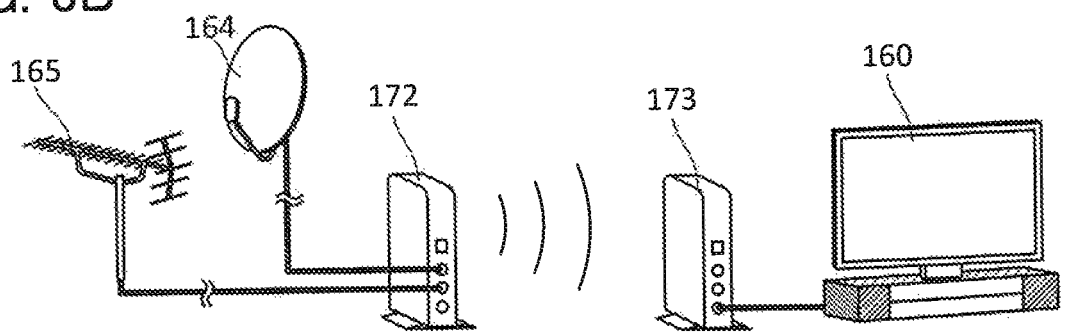
Figure 3C:
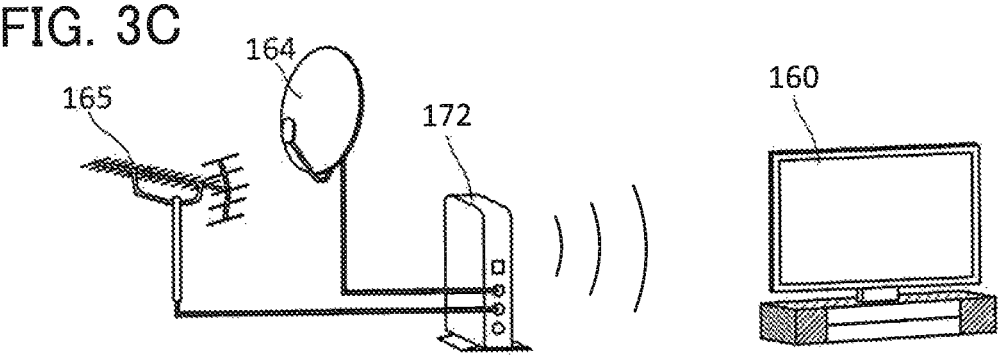
Figure 3D:
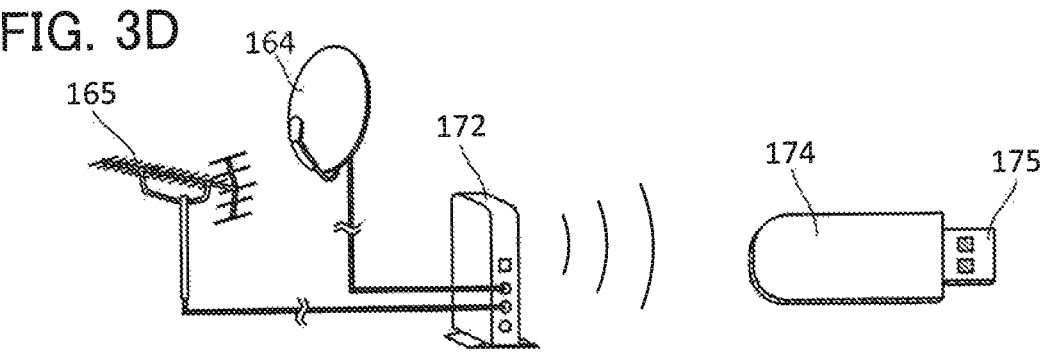

FIG. 2 illustrates an example in which a receiver is incorporated in the TV 160. It is possible to receive the radio waves by a receiver independent of the TV 160 to be displayed on the TV 160. Such examples are illustrated in FIGS. 3A to 3D. A receiver 171 may be provided outside the TV 160 (FIG. 3A). Data may be transmitted and received between the antennas 164 and 165 and the TV 160 via wireless devices 172 and 173 (FIG. 3B). In this case, the wireless device 172 or 173 functions as a receiver. The wireless device 173 may be incorporated in the TV 160 (FIG. 3C).

The size of a receiver can be reduced so that it can be portable. A receiver 174 illustrated in FIG. 3D includes a connector portion 175. If a display device and an electronic device such as an information terminal (e.g., a personal computer, a smartphone, a mobile phone, or a tablet terminal) include a terminal capable of being connected to the connector portion 175, they can be used to watch a satellite broadcast or a terrestrial broadcast.

In the broadcast system 100 in FIG. 1, the decoder 126 can be combined with dedicated IC or processor (e.g., GPU or CPU), for example. The decoder 126 can be integrated into one dedicated IC chip. Alternatively, some or all dedicated ICs can be configured with a programmable logic device (e.g., an FPGA). The same applies to the encoder 122.

<Decoder>

Figure 4:
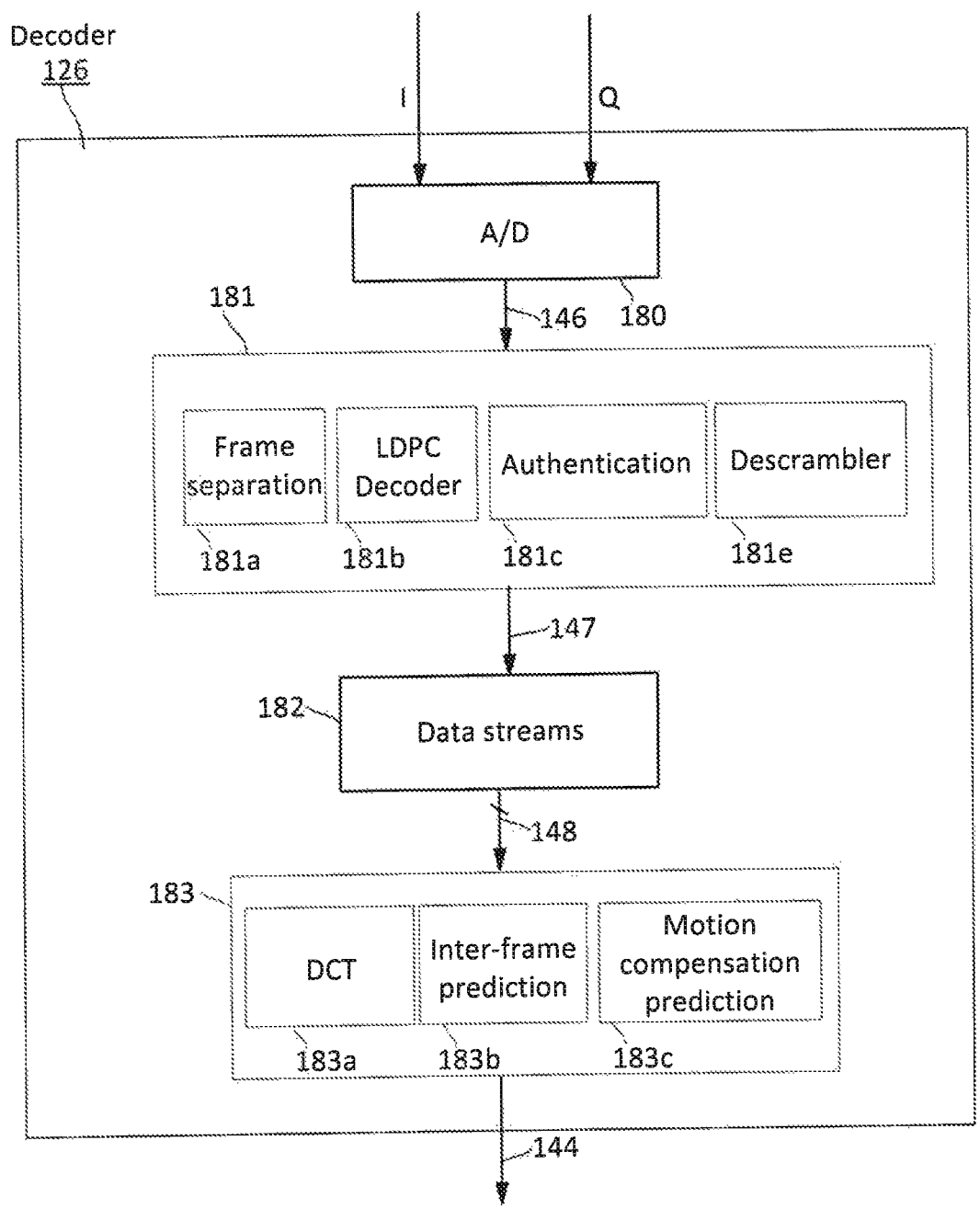
FIG. 4 is a block diagram illustrating a configuration example of a decoder.

FIG. 4 is a block diagram illustrating a configuration example of the decoder 126. The decoder 126 includes circuits 180 to 183. The circuit 180 is an analog-to-digital converter (ADC) portion. The circuit 181 is a data stream generating portion. The circuit 182 is a data parallelizing portion. The circuit 183 is a decoding portion (an image data expanding portion).

The circuit 180 performs analog-to-digital conversion on the I signal and the Q signal and generates a digital signal 146. The circuit 181 separates a control signal for broadcast from the digital signal 146 and generates a data stream 147. The circuit 181 includes various circuits for generating the data stream 147. For example, the circuit 181 includes a frame separation circuit 181$a$, an LDPC decoder circuit 181$b$, an authentication processing circuit 181$c$, and a descrambler 181$d$.

The circuit 182 divides the data stream 147 into a plurality of data streams 148 to be output. Accordingly, the circuit 183 can process the data streams 148 in parallel. The circuit 183 decodes the data streams 148 and generates the image data 144. The circuit 183 includes circuits for decoding the data streams 148. For example, the circuit 183 includes a DCT circuit 183$a$, inter-frame prediction circuit 183$b$, and a motion compensation prediction circuit 183$c$.

The decision whether the circuits of the decoder 126 are provided or not can be made as appropriate. Alternatively, another circuit may be added to the decoder 126. For example, the circuit 183 may process the data stream 147 instead of the circuit 182. The decoder 126 is capable of decoding a 8K broadcast signal in real time, resulting in a high operation frequency. Therefore, the operation efficiency of the decoder 126 is reduced when decoding a 4K broadcast signal or a 2K broadcast signal because the decoder 126 exceeds the specification limit.

Thus, a reduction in power consumption of the decoder 126 is achieved by changing the driving method or operation frequency (a clock frequency) of the decoder 126 in accordance with the data resolution of an image to be broadcast. Therefore, an FPGA is employed for the circuit 183 of the decoder 126.

In the case of decoding data of an image for a 8K broadcast, an FPGA operates by binary driving in which a binary signal is transmitted and received between logic elements (LE) of an FPGA. In the case of decoding data of an image for a 4K broadcast or a 2K broadcast, an FPGA operates by pulse driving in which a pulse signal is transmitted and received between the LEs. Moreover, the operation frequency at the binary driving is preferably higher than the operation frequency at the pulse driving. The binary driving and the pulse driving will be described later.

During pulse driving, the LEs are set to a circuit configuration with power gating. In this circuit configuration, whether a pulse signal reaches the LEs or not is determined, and if the pulse signal reaches the LEs, an arithmetic circuit in the LE is turned on to start arithmetic operation. After the arithmetic operation is terminated, the arithmetic circuit is turned off. Therefore, although there is overhead in time and power consumption when employing pulse driving, power consumption can be reduced when a signal does not transition for a long period. Therefore, pulse driving is advantageous in the case where the operation frequency is low. In contrast, during binary driving, the LEs are set to the circuit configuration without power gating. Therefore, binary driving is advantageous in the case where the operation frequency is high.

The numbers of pixels used in the 4K broadcast and the 2K broadcast are ¼ and ¹⁄₁₆ of that used in the 8K broadcast, respectively. Therefore, the operation frequencies can be ¼ and ¹⁄₁₆ in the case where their frame frequencies are the same as that of the 8K broadcast, when arithmetic quantity is assumed to be proportional to the number of pixels. Thus, in the case of the 4K broadcast or the 2K broadcast, it is effective to employ a circuit configuration of an FPGA with pulse driving, and in the case of the 8K broadcast, it is effective to employ a circuit configuration of an FPGA with binary driving.

<<FPGA>>

Figure 5:
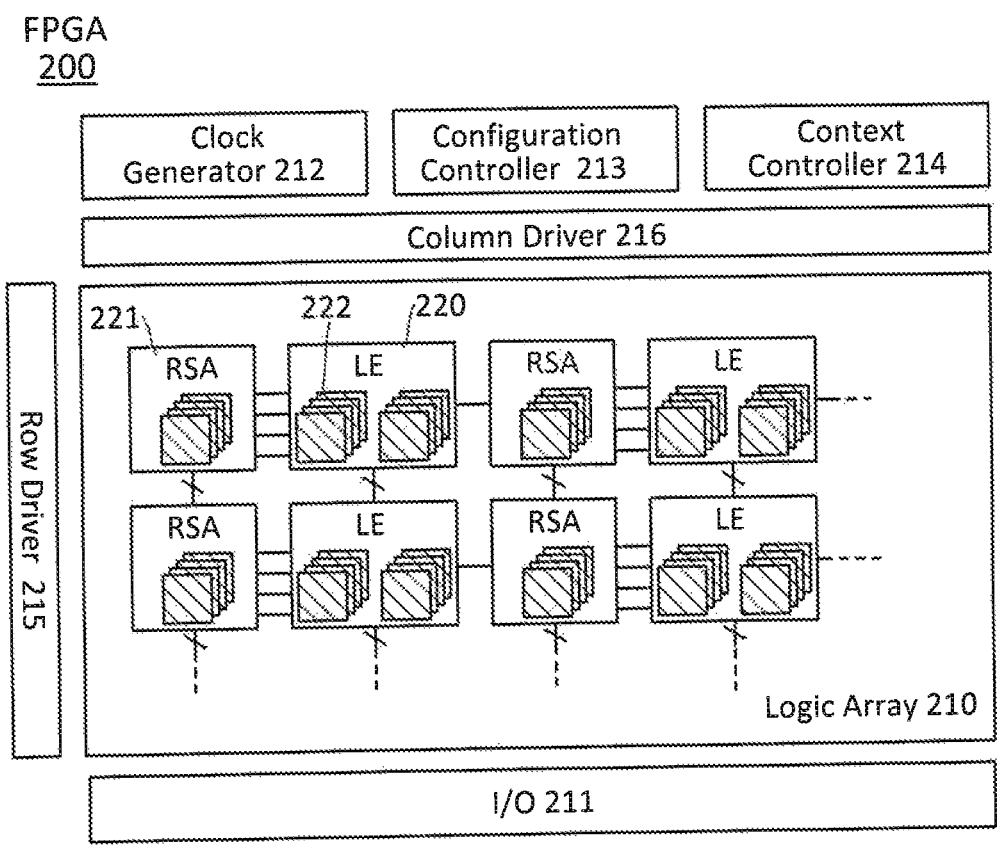
FIG. 5 is a block diagram illustrating a configuration example of an FPGA.

FIG. 5 illustrates an example of an FPGA. An FPGA 200 illustrated in FIG. 5 includes a logic array 210, an input/output unit (I/O) 211, and peripheral circuits. The I/O 211 is an input/output interface of the logic array 210. The peripheral circuits include functional circuits for driving the logic array 210 and the I/O 211. For example, the peripheral circuits include a clock generator 212, a configuration controller 213, a context controller 214, a row driver 215, and a column driver 216.

The logic array 210 includes a plurality of logic elements (LEs) 220 and a plurality of routing switch arrays (RSA) 221. Here, an LE 220 is a logic circuit having four inputs and one output. The RSA 221 includes a plurality of routing switches (RSs). Each RS controls connection between two LEs 220. A plurality of LEs 220 arranged in the same column may be connected to one another so as to configure a register chain.

The LE 220 includes a plurality of configuration memories (CFMs) 222. The circuit configuration of the LE 220 is determined by configuration data stored in the CFMs 222. The CFM 222 is a configuration memory corresponding to a multi-context and capable of storing sets of configuration data. Moreover, each RS of the RSA 221 includes a memory device corresponding to a multi-context, and connection between the LEs 220 is determined by configuration data stored in the RSs.

The configuration of the FPGA 200 can be changed quickly by switching the sets of configuration data to be loaded. The sets of configuration data can be switched by the context controller 214. The row driver 215 and the column driver 216 are circuits for driving the CFMs 222. The configuration controller 213 has a function of controlling the row driver 215 and the column driver 216.

Here, a configuration example of the logic array 210 with two contexts is described. The two contexts are referred to as "CNTXT0" and "CNTXT1". A context signal for selecting the CNTXT0 is referred to as "ctx[0]", and a context signal for selecting the CNTXT1 is referred to as "ctx[1]".

<<Routing Switch>>

Figure 6A:
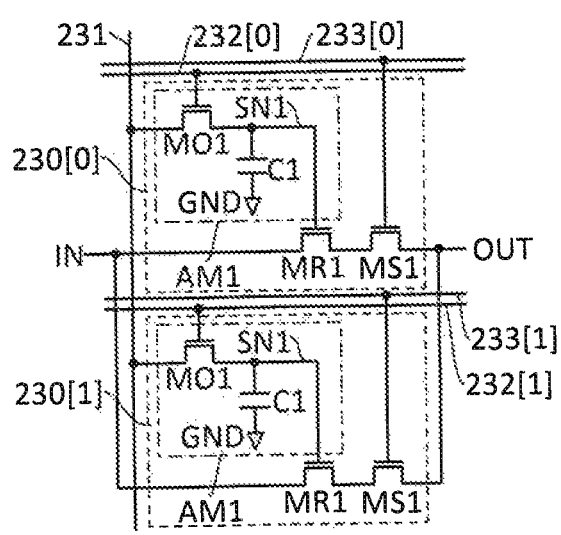
FIGS. 6A to 6D are circuit diagrams illustrating configuration examples of a routing switch.

The RSA 221 includes a plurality of RSs 223. FIG. 6A illustrates a configuration example of the RS 223. The RS 223 is a programmable routing switch, in which a node IN is electrically connected to an output node of one LE 220 and a node OUT is electrically connected to an input node of another LE 220. In the RS 223, two switch circuits 230 (hereinafter referred to as SWs 230) are electrically connected in parallel between the node IN and the node OUT. Note that in the case where the number of contexts is larger than 2, as many SWs 230 as contexts may be electrically connected in parallel between the node IN and the node OUT.

The SW 230 includes transistors MO1, MR1, and MS1 and a capacitor C1. The SW 230 has a circuit configuration similar to that of a three-transistor gain cell. In the SW 230, an analog memory AM1 (hereinafter referred to as AM1) is configured with the transistor MO1 and the capacitor C1. A node SN1 serves as a hold node of the AM1. The conduction state of the MR1 is controlled by the potential of the node SN1. The capacitor C1 is a storage capacitor for holding the potential of the node SN1. One terminal of the capacitor C1 is electrically connected to the node SN1, and the other terminal thereof is electrically connected to a power supply line for ground potential (GND) (hereinafter referred to as a GND line).

The SW 230[0] and the SW 230 [1] are connected to one line 231 provided in a column direction. The line 231 serves a bit line, and configuration data written to each AM1 is transmitted to the SWs 230 by the line 231. The SW 230[0] is electrically connected to lines 232[0] and 233[0]. The SW 230[1] is electrically connected to lines 232[1] and 233[1]. The lines 232[0] and 232[1] serve as word lines, and the lines 233[0] and 233[1] serve as lines for context signals. In the case where the CNTXT0 is selected, the transistor MS1 of the SW 230[0] is turned on by the ctx[0] and the transistor MS1 of the SW 230[1] is turned off by the ctx[1]. In contrast, in the case where the CNTXT1 is selected, the conduction states of the two transistors MS1 are reversed.

The use of a transistor including an oxide semiconductor in a channel formation region (an OS transistor) as the transistor MO1 can increase the holding time of the AM1. Therefore, the AM1 can be used as a nonvolatile memory device. Each of the transistors MR1 and MS1 may be an OS transistor or a Si transistor.

Here, an off-state current refers to a current that flows between a source and a drain of a transistor in an off state. In the case of an n-channel transistor, for example, when the threshold voltage of the transistor is approximately 0 V to 2 V, a current flowing between a source and a drain when a voltage between a gate and the source is negative can be referred to as an off-state current. An extremely low off-state current means that, for example, an off-state current per micrometer of channel width is lower than or equal to 100 zA (z represents zepto and denotes a factor of $10^{-21}$). Since the off-state current is preferably as low as possible, the normalized off-state current is lower than or equal to 10 zA/μm, preferably lower than or equal to 1 zA/μm and further preferably lower than or equal to 10 yA/μm (y represents yocto and denotes a factor of $10^{-24}$).

An oxide semiconductor has a bandgap of 3.0 eV or higher; thus, an OS transistor has low leakage current due to thermal excitation and, as described above, extremely low off-state current. A channel formation region of an OS transistor is preferably formed from an oxide semiconductor containing at least one of indium (In) and zinc (Zn). Typical examples of such an oxide semiconductor include an In-M-Zn oxide (M is Al, Ga, Y, or Sn, for example). By reducing impurities serving as electron donors, such as moisture or hydrogen, and also reducing oxygen vacancies, an i-type (intrinsic) or substantially i-type oxide semiconductor can be obtained. Here, such an oxide semiconductor can be referred to as a highly purified oxide semiconductor. By using a highly purified oxide semiconductor, the off-state current of the OS transistor that is normalized by channel width can be as low as approximately several yoctoamperes per micrometer to several zeptoamperes per micrometer. An OS transistor and an oxide semiconductor will be described in Embodiments 4 and 5.

Moreover, the OS transistor has small temperature dependence of off-state current characteristics. Therefore, normalized off-state current of the OS transistor can be less than or equal to 100 zA (z represents zepto and denotes a factor of $10^{-21}$) even at a high temperature (e.g., 100° C. or higher). Thus, when an OS transistor is used as the transistor in the analog memory, the FPGA 200 can be obtained with high reliability with respect to temperature because the AM1 can hold data without losing it even in an environment at a high temperature.

Figure 6B:
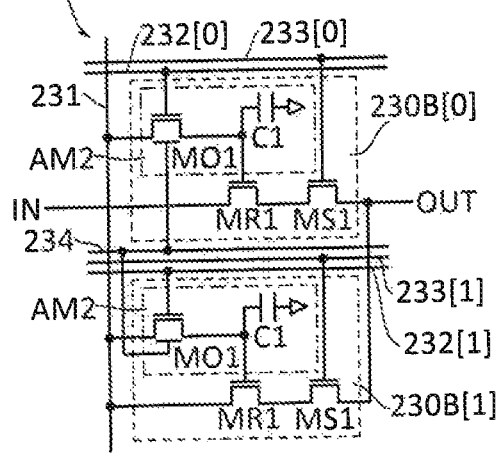
Figure 6C:
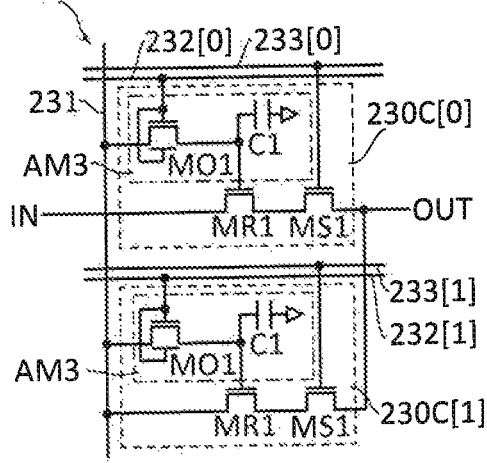

FIGS. 6B and 6C illustrate variations of the RS 223 (i.e., a RS 223B and a RS 223C). The RS 223B includes a SW 230B instead of the SW 230. An analog memory AM2 of the SWs 230B is provided with a transistor MO1 including a back gate. The back gates of the two transistors MO1 are electrically connected to a common wiring 234. The threshold voltages of the transistors MO1 can be controlled by the potential of the wiring 234. In the case where a charge accumulation layer is provided with an insulating layer between the back gate and a channel formation region of the transistor MO1, charge can be injected into a charge accumulation layer of the transistor MO1 by using the wiring 234 at the time of manufacture of the FPGA 200. In the case of performing this step, the back gates of the transistors MO1 may be brought into an electrically floating state to operate the FPGA 200 without controlling the potential of the wiring 234.

The RS 223C includes a SW 230C instead of the SW 230. An analog memory AM3 of the SWs 230C is provided with a transistor MO1 in which a back gate is electrically connected to a gate (a front gate).

Figure 6D:
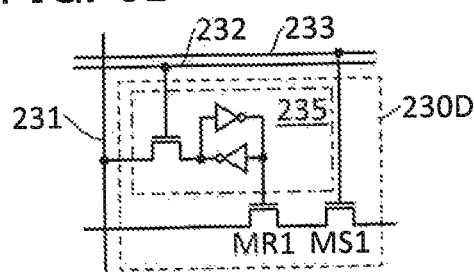

In each of the routing switches illustrated in FIGS. 6A to 6C, a memory device for storing configuration data is used for an analog memory including an OS transistor; however, another memory device may be used. A SW 230D illustrated in FIG. 6D is provided with a latch circuit 235 for storing configuration data. The latch circuit 235 includes an access transistor and an inverter loop.

<<Configuration Memory>>

Figure 7:
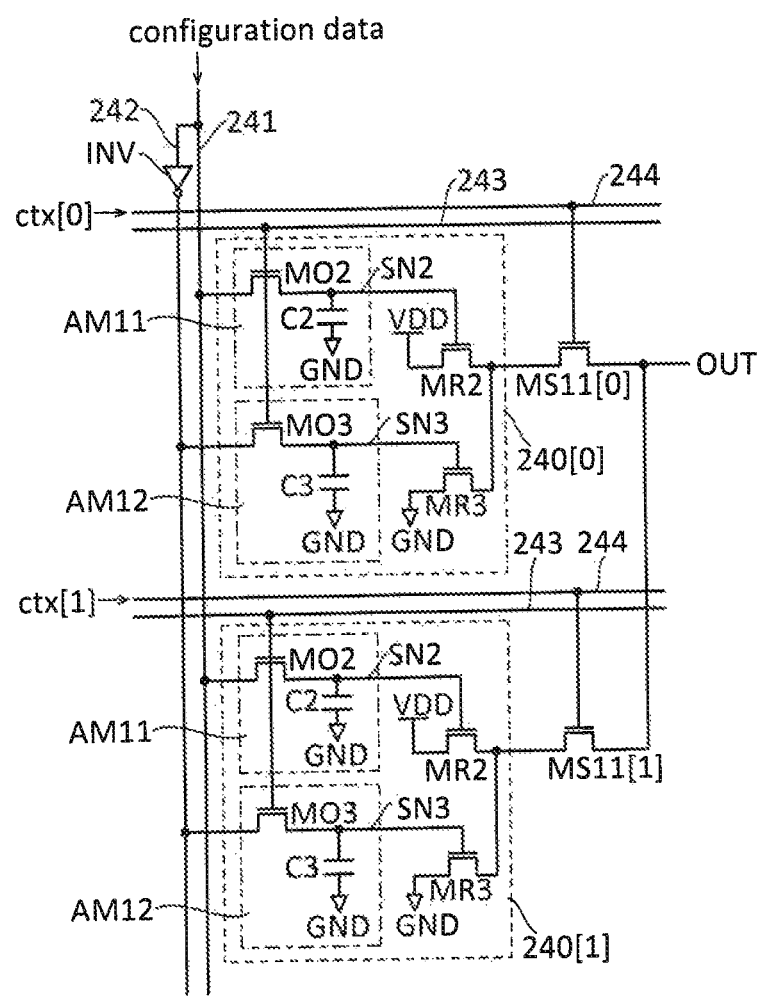
FIG. 7 is a circuit diagram illustrating a configuration example of a configuration memory.

FIG. 7 illustrates a configuration example of the CFM 222. The CFM 222 includes two memory cells (MC) 240 and two transistors MS11. The two transistors MS11 are each a selection transistor for selecting the MC 240 for outputting configuration data, and gates of the two transistors MS11 are each electrically connected to a different line for a context signal (a wiring 244). In the case where the CNTXT0 is selected, the transistor MS11[0] is turned on by the ctx[0] and configuration data stored in the MC 240[0] is output. In the case where the CNTXT1 is selected, the transistor MS11[1] is turned on by the ctx[1] and configuration data stored in the MC 240[1] is output.

The MC 240 is a memory device that can store complementary data. The MC 240 includes two analog memories AM11 and AM12 and two reading transistors MR2 and MR3. The AM11 includes a node SN2, a transistor MO2, and a capacitor C2, and the AM12 includes a node SN3, a transistor MO3, and a capacitor C3. With the use of OS transistors as the transistor MO2 and the transistor MO3, the AM11 and the AM12 can be used as nonvolatile memory devices like the AM1.

A pair of lines 241 and 242 serves as a bit line pair, and configuration data is input to the line 242 via an inverter (INV). A line 243 serves as a word line. The AM11 stores data whose logic is the same as that of the configuration data, and the AM12 stores data whose logic is inverted from that of the configuration data. Thus, when the potential of the node SN2 takes a high ("H") level by writing the configuration data, the potential of the node SN3 takes a low ("L") level.

In the transistor MR2, a gate is electrically connected to the node SN2, a first terminal is electrically connected to a power supply line for supplying a power supply potential VDD (hereinafter referred to as a VDD line), and a second terminal is electrically connected to a first terminal of the transistor MS11. In the transistor MR3, a gate is electrically connected to the node SN3, a first terminal is electrically connected to a GND line, and a second terminal is electrically connected to the first terminal of the transistor MS11. Note that VDD denotes a high power supply potential of the logic array 210 and GND denotes a low power supply potential of the logic array 210.

The AM11 and the AM12 may have the same circuit configurations as the AM2 (FIG. 6B). Alternatively, the AM11 and the AM12 may have the same circuit configurations as the AM3 (FIG. 6C). Further alternatively, the latch circuit 235 (FIG. 6D) may be provided instead of the AM11 and the AM12. Although the latch circuit 235 needs power to hold data, the AM11 and the AM12 do not need power. Therefore, the circuit configuration of the CFM 222 that holds data with an analog memory like the AM11 and the AM12 is effective in reducing power consumption of the FPGA 200. The same applies to the circuit configuration of the RS 223.

<Logic Element>

Figure 8:
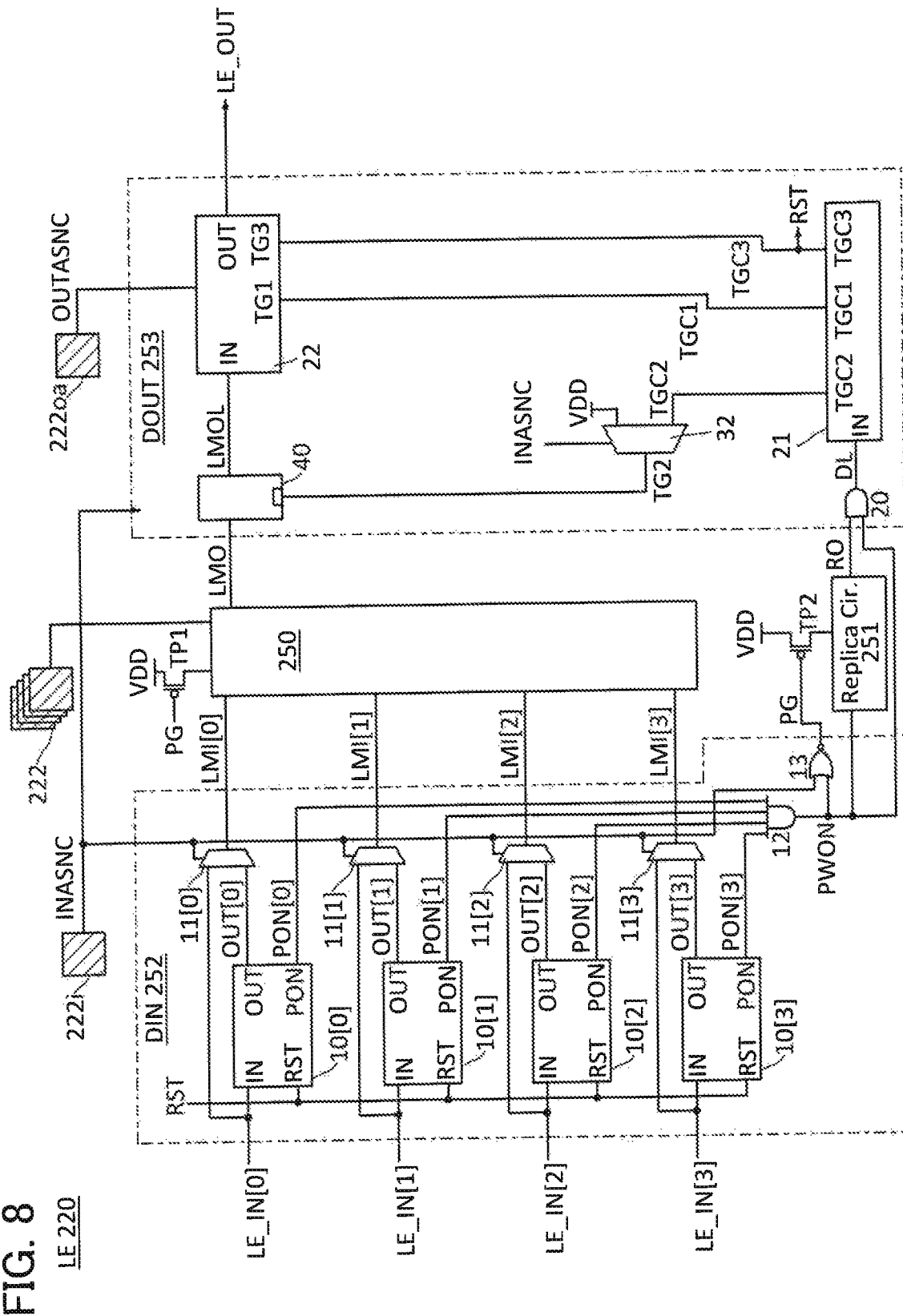
FIG. 8 is a block diagram illustrating a configuration example of a logic element.
Figure 10:
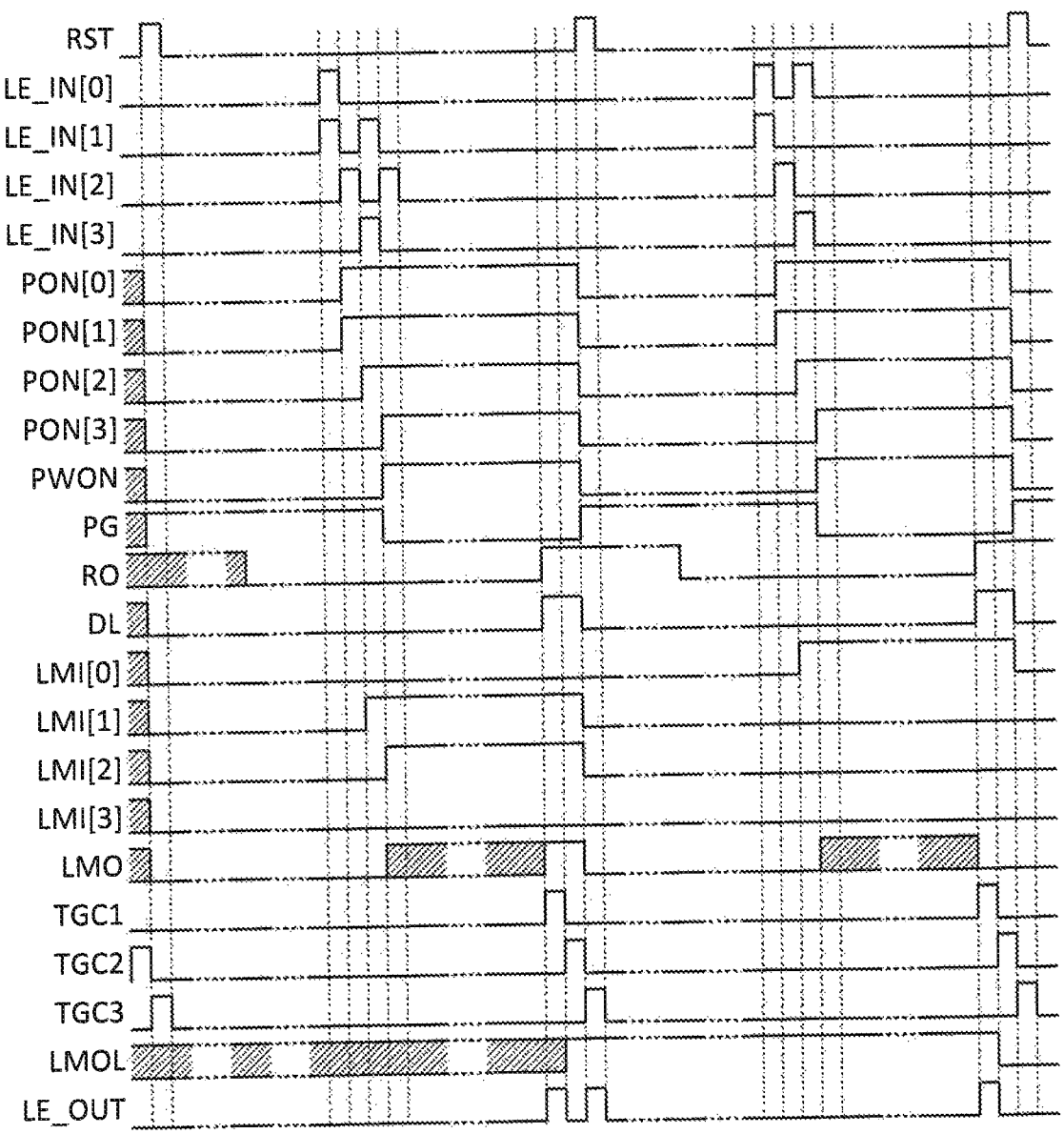
FIG. 10 is a timing chart illustrating an operation example of a logic element.

FIG. 8 is a block diagram illustrating a configuration example of the LE 220. FIG. 10 is a timing chart illustrating an operation example of the LE 220. The LE 220 includes a plurality of CFMs 222, an arithmetic circuit 250, a replica circuit 251, a data input portion (DIN) 252, a data output portion (DOUT) 253, a transistor TP1, and a transistor TP2.

The LE 220 is a programmable logic circuit having four inputs and one output. The LE 220 performs arithmetic processing on data signals LE_IN[0] to LE_IN[3] and outputs a data signal LE_OUT. The data signal LE_OUT becomes an input data signal of another LE 220 via the RSs 223. Signals RST, PG, OUT[0], LMO, and the like are signals (internal signals) that internal circuits of the LE 220 generate.

Here, between the plurality of CFMs 222, one that stores INASNC is referred to as CFM 222i and one that stores OUTASNC is referred to as CFM 222*oa*. The INASNC is a data signal for setting the circuit configuration of the LE 220 in accordance with the configurations of the data signals LE_IN (whether pulse signals or binary signals). The OUTASNC is a data signal for setting the configuration of a data signal to be output, and the LE 220 is set to a circuit configuration that can output a pulse signal or a binary signal by the OUTASNC.

The transistor TP1 functions as a power switch (a sleep transistor) of the arithmetic circuit 250, and the transistor TP2 functions as a power switch (a sleep transistor) of the replica circuit 251. Supply of VDD to the arithmetic circuit 250 and the replica circuit 251 is controlled by the transistors TP1 and TP2, respectively. The signal PG serves as a power gating signal and controls on/off of each of the transistors TP1 and TP2.

The LE 220 is an asynchronous circuit that does not control timing with a global clock signal. Therefore, power consumption can be reduced because there is no wiring that distributes a global clock signal. A signal can be transmitted between internal circuits of the LE 220 without a hand-shake signal. Thus, the numbers of wirings and elements can be reduced because there is no need to provide a wiring for a hand-shake signal. Moreover, the LE 220 can start power gating of the arithmetic circuit 250 without synchronizing with a global clock signal. Therefore, power gating can be performed as soon as the arithmetic processing in the arithmetic circuit 250 is terminated; thus, power gating with fine time granularity is achieved and power consumption can be effectively reduced.

Figure 9A:
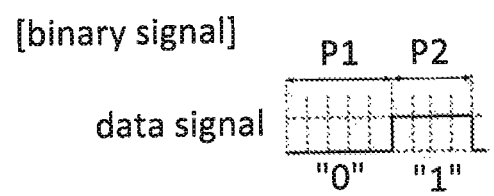
FIG. 9A illustrates a binary signal, and FIGS. 9B and 9C each illustrate a pulse signal.

In the LE 220, there are two kinds of signals that configure the data signal. Here, one of the signals is referred to as a "binary signal", and the other signal is referred to as a "pulse signal". The binary signal represents one-bit logic ("0" or "1") only by a potential level. FIG. 9A illustrates an example of a signal waveform in the case where the data signal is a binary signal. In a period P1 during which a potential of the data signal is at an "L" level, the logic of the data signal is "0". In a period P2 during which a potential of the data signal is at an "H" level, the logic of the data signal is "1".

Figure 9B:
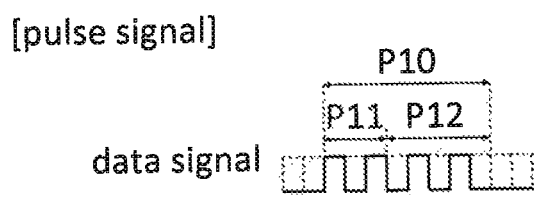

The pulse signal represents its logic by not only a potential level of the data signal but also the history of a change in the potential level. FIG. 9B illustrates an example of a signal waveform in the case where the data signal is a pulse signal. The value of the data signal is determined by changes of the waveform in a period P10. The waveform in a period P11 is that of a wakeup signal, which indicates an input of the data signal. Although the number of pulses in the wakeup signal is here 2, it may be 1 or larger than 2. A signal in a period P12 indicates a data part, and the number of pulses in the signal determines the logic of the data signal. For example, when the number of pulses is 0, the value of the data signal is "0", and when the number of pulses is 2, the value of the data signal is "1".

Figure 9C:
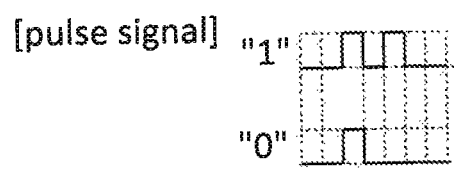

Here, in the case where a data signal such as the data signal LE_IN is a pulse signal, the value and waveform of the data signal can be defined as in FIG. 9C. That is, the number of pulses of a wakeup signal is 1. If one pulse is input after the wakeup signal, the logic of the data signal is "1", whereas if there is no pulse input, the logic of the data signal is "0". The driving method of the FPGA 200 when the data signal to be processed is a binary signal is referred to as "binary driving", and the driving method when the data signal to be processed is a pulse signal is referred to as "pulse driving".

In binary driving as illustrated in FIG. 9A, the case where the data signal is not input cannot be distinguished from the case where the data signal of "0" is input. In pulse driving, in contrast, it is possible to distinguish whether the data signal is input or not. Thus, the LE 220 is configured to perform power gating effectively during pulse driving by utilizing the feature of a pulse signal. Accordingly, optimum arithmetic efficiency and low power consumption can be achieved in the FPGA 200.

Binary driving and pulse driving can be switched by switching contexts. Here, the CNTXT0 is selected to make the FPGA 200 operate by binary driving, and the CNTXT1 is selected to make the FPGA 200 operate by pulse driving. Moreover, INASNC determines whether power gating is performed on the arithmetic circuit 250 and the replica circuit 251 or not. Note that INASNC of CNTXT0 (binary driving) is "1", and INASNC of CNTXT1 (pulse driving) is "0".

<<Switching of Contexts>>

Contexts of the FPGA 200 can be switched in the following manner, for example. A parameter regarding an image format is extracted with the decoder 126 of the receiver 112 and the number of pixels (8K, 4K, 2K, or the like) is specified. In the case where the number of pixels is 8K, the context is switched to CNTXT0 by the context controller 214 and the FPGA 200 is configured so as to be driven by binary driving. In the case where the number of pixels is 4K or 2K, the context is switched to CNTXT1 by the context controller 214 and the FPGA 200 is configured so as to be driven by pulse driving. Moreover, it is effective to employ a configuration in which the clock frequency of the FPGA 200 is changed in accordance with the number of pixels. Specifically, the clock generator 212 may change the frequency of the clock signal in accordance with the context.

FIG. 10 is a timing chart illustrating an operation example of the LE 220 in pulse driving. Note that in FIG. 10, a hatched portion of a waveform denotes that the voltage level is inconstant. The same applies to other timing charts. A configuration example and an operation example of the LE 220 will be described below. Note that although reference to FIG. 8 and FIG. 10 is not made in other timing charts in some cases, the description is based on these drawings.

<<Data Input Portion>>

The DIN 252 includes four latch circuits (LATs) 10, four multiplexers (MUXs) 11, an AND gate 12, and a NOR gate 13. The DIN 252 has functions of latching the data signals LE_IN, converting the latched data signals into binary signals, and generating signals PON. Note that the AND gate is shortened to AND in the following description. The same applies to other logic gates.

Figure 11A:
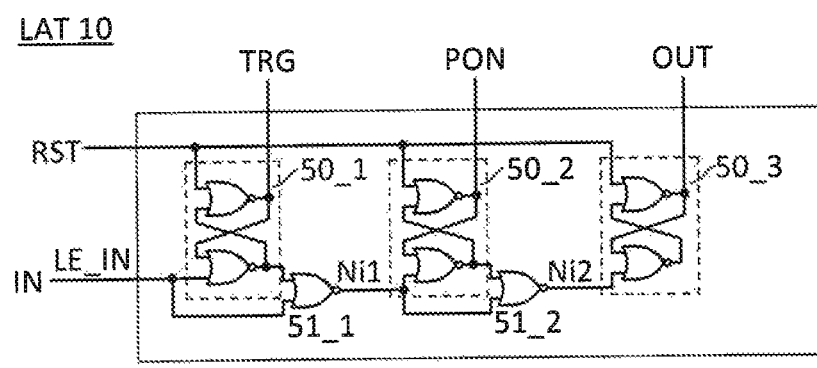
FIG. 11A is a circuit diagram illustrating a configuration example of a latch circuit.

Each LAT 10 has functions of latching the corresponding data signal LE_IN, generating a data signal OUT, and generating the signal PON. The data signal OUT corresponds to a data signal which is a binary signal converted from the data signal LE_IN and also to a delay signal of the signal LE_IN. The signal PON is a signal that determines the timing of power gating. FIG. 11A is a circuit diagram illustrating a configuration example of the LAT 10, and FIG. 11B is a timing chart illustrating an operation example of the LAT 10.

The LAT 10 includes three reset/set latch circuits (RS latches) 50_1 to 50_3 and two NORs 51_1 and 51_2. The RS latches 50_1 to 50_3 are configured with the two NORs.

Figure 11B:
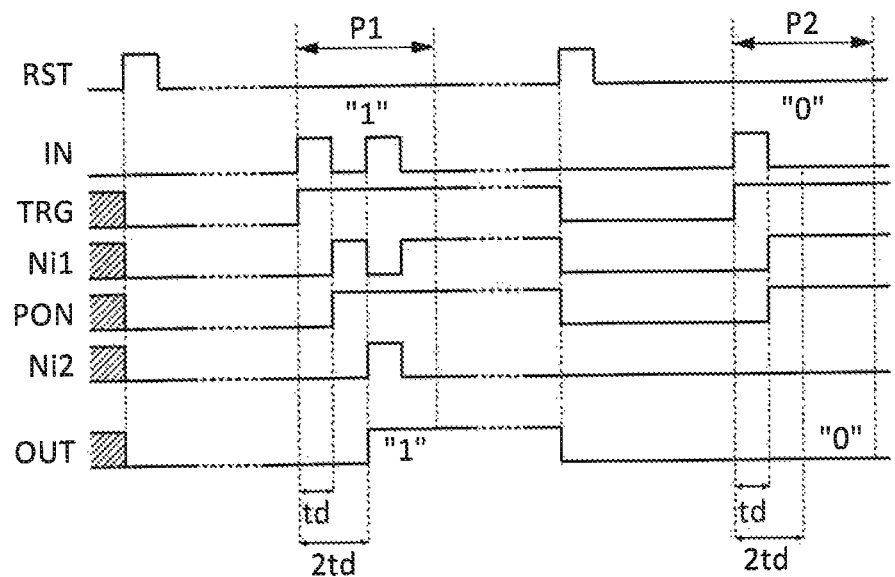
FIG. 11B is a timing chart illustrating an operation example of the latch circuit.

FIG. 11B is a timing chart of the LAT 10 during pulse driving. Signals Ni1 and Ni2 are signals output from the NOR 51_1 and the NOR 51_2, respectively.

When a reset signal (RST) is input, signals TRG, PON, OUT, Ni1, and Ni2 are each reset to an "L" level. That is, the RS latches 50_1, 50_2, and 50_3 store the signals TRG, PON, and OUT, respectively, until the signal RST is input.

The data signal LE_IN input in the period P1 is "1", whereas the data signal LE_IN input in the period P2 is "0". When the data signal LE_IN is input, the signal TRG takes an "H" level. The signal is held at the "H" level until the signal RST is input. The signal TRG is a signal that indicates an input of the data signal LE_IN and is also a signal that serves as a trigger to start the operation of the LE 220. The signal PON takes an "H" level at timing delayed by only a time td after the input of the data signal LE_IN. Note that the signal PON is a signal for turning on the arithmetic circuit 250. The logic (potential level) of the data signal OUT is determined by the potential level of the data signal LE_IN a time 2td after the input of the data signal LE_IN. When the data signal LE_IN is "1", the data signal OUT is also "1", and when the data signal LE_IN is "0", the data signal OUT is also "0". That is, the LAT 10 has functions of converting the data signal LE_IN in a pulse signal into that in a binary signal and delaying the data signal LE_IN. A binary signal whose logic is the same as that of the data signal LE_IN is output from the LAT 10 at timing delayed by the time 2td.

Each MUX 11 has a function of selecting either the corresponding data signal OUT or LE_IN and outputting the selected data signal to the arithmetic circuit 250. The INASNC determines the signal to be output to the arithmetic circuit 250. In the case where the CNTXT0 is selected, the MUX 11 outputs the data signal LE_IN because of binary driving, whereas in the case where the CNTXT1 is selected, the MUX 11 outputs the data signal OUT because of pulse driving.

The AND 12 generates a signal PWON by conducting an AND operation on the signals PON[0] to PON[3]. The NOR gate 13 generates the signal PG by conducting a NOR operation on the signal PWON and the INASNC. Since the INASNC is at the level of "1" ("H") during binary driving, the signal PG takes an "L" level regardless of the logic of the signal PWON; thus, VDD is always supplied to the arithmetic circuit 250 and the replica circuit 251. During pulse driving, the logic of the signal PG is determined by the logic of the signal PWON. When the signal PWON is at an "H" level, the signal PG is at an "L" level; thus, the transistors TP1 and TP2 are turned on. When the signal PWON is at an "L" level, the signal PG is at an "H" level; thus, the transistors TP1 and TP2 are turned off.

In the case where the signals PON[0] to PON[3] are all at "H" levels, the signal PWON takes the "H" level. The potentials of the signals PON[0] to PON[3] all become "H" levels after the data signals LE_IN[0], LE_IN[1], LE_IN[2], and LE_IN[3] are latched by the LAT 10[0], LAT 10[1], LAT 10[2], and LAT 10[3], respectively; therefore, the transistors TP1 and TP2 can be turned on at this timing. Thus, the arithmetic circuit 250 and the replica circuit 251 can be turned off until the data signals LE_IN[0], LE_IN[1], LE_IN[2], and LE_IN[3] are input to the LAT 10[0], LAT 10[1], LAT 10[2], and LAT 10[3], respectively.

As described above, the LE 220 has a circuit configuration without power gating in binary driving. In pulse driving, in contrast, the LE 220 has a circuit configuration with power gating in a period during which operation of the arithmetic circuit 250 and the replica circuit 251 is not necessary. In the case where the operation frequency is high, processing speed of the FPGA 200 is prioritized with binary driving of the LE 220. In the case where the operation frequency is low, power consumption is reduced with pulse driving of the LE 220. When the operation frequency is low, power consumption can be effectively reduced because the power gating time with respect to operation time can be set relatively long compared to the case of binary driving.

<<Arithmetic Circuit and Replica Circuit>>

The arithmetic circuit 250 has a function of outputting the signal LMO by performing arithmetic processing of signals LMI[0] to LMI[3] and configuration data output from the CFM 222. The arithmetic circuit 250 includes, for example, a lookup table (LUT) and a MUX, and the functions and the circuit configurations of the LUT and the MUX are determined by the configuration data.

Figure 12A:
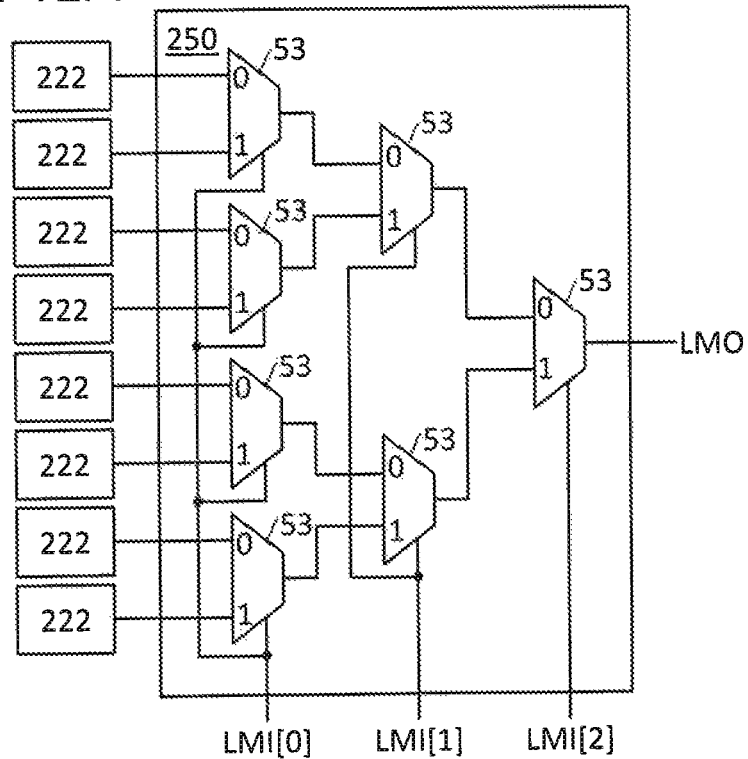
FIGS. 12A and 12B are circuit diagrams illustrating a configuration example of an arithmetic circuit.

FIG. 12A illustrates a configuration example of the arithmetic circuit 250. The arithmetic circuit 250 includes seven MUXs 53 which are connected in a tournament manner. Configuration data is input from two CFMs 222 to each of the four MUXs 53 provided in the first stage. A control signal of the four MUXs 53 in the first stage is the signal LMI[0], a control signal of two MUXs 53 in the second stage is the signal LMI[1], and a control signal of one MUX in the third stage is the signal LMI[2].

Figure 12B:
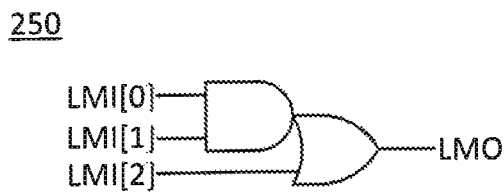

For example, as illustrated in FIG. 12A, in the case where configuration data of "0" and "1" are input two input nodes of each of the four MUXs 53 in the first stage, the arithmetic circuit 250 has the same function as a circuit illustrated in FIG. 12B. That is, the arithmetic circuit 250 functions as a logic circuit that outputs the signal LMO by performing arithmetic processing of the signals LMI[0] to LMI[2].

Figure 12C:
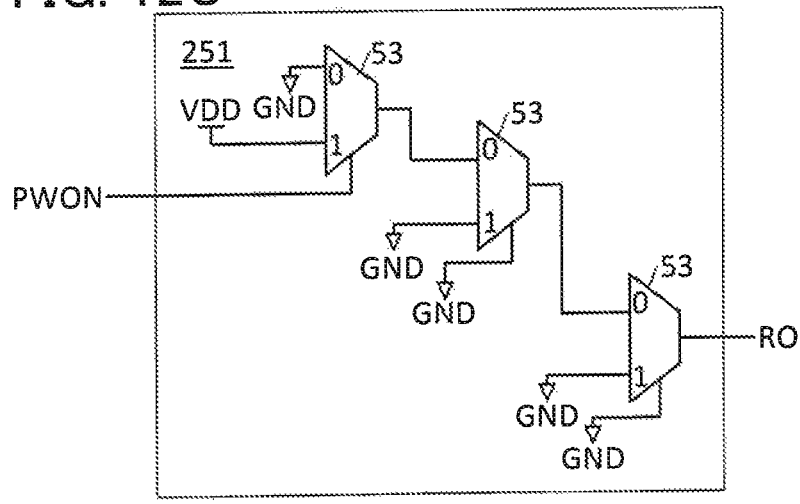
FIG. 12C is a circuit diagram illustrating a configuration example of a replica circuit.

The replica circuit 251 is a circuit that has delay characteristics equivalent to those of a critical path of the arithmetic circuit 250. For example, when the arithmetic circuit 250 has a circuit configuration in FIG. 12A, the replica circuit 251 is configured with three MUXs 53 that are electrically connected to one another in series (FIG. 12C). A control signal of the MUX 53 in the first stage is the signal PWON.

Note that for the replica circuit 251, a circuit configuration in which transition of a signal RO to an "H" level after the signal PWON takes the "H" level is preferable. Therefore, in the case where the critical path of the arithmetic circuit 250 corresponds to a path through which the signal LMO takes an "H" level after an input signal is changed to an "L" level, it is preferable that an inverted signal of the signal PWON be input to the critical path. In the case where the critical path of the arithmetic circuit 250 corresponds to a path through which the signal LMO takes an "L" level after an input signal is changed to an "H" level, it is preferable that the replica circuit 251 output an inverted signal of the signal LMO. Alternatively, in the case where the critical path of the arithmetic circuit 250 corresponds to a path through which t the signal LMO takes the "L" level after an input signal is changed to an "L" level, it is preferable that an inverted signal of the signal PWON be input to the critical path and the replica circuit 251 output an inverted signal of the signal LMO. Further alternatively, the replica circuit 251 is preferably configured such that the signal RO is at the "L" level when the signal PWON is at the "L" level. With such a circuit configuration, the length of a period required for the arithmetic operation by the arithmetic circuit 250 can be precisely estimated by a delay time of the replica circuit 251. Accordingly, power gating of the arithmetic circuit 250 can be performed at an appropriate timing; thus, power consumption of the LE 220 can be effectively reduced.

Note that although the configuration example of the circuit having three inputs is illustrated in FIG. 12A for easy understanding of the configuration example of the arithmetic circuit 250, the same applies to the circuit having four inputs, in which case the arithmetic circuit 250 is provided with 15 MUXs 53. Moreover, the arithmetic circuit 250 can be provided with a diode, a resistor, a logic gate (e.g., a buffer, an inverter, an AND, a NAND, or a NOR), and a switch as appropriate, in addition to the multiplexers.

<<Data Output Portion>>

The DOUT 253 has functions of generating the data signal LE_OUT, controlling output timing of the data signal LE_OUT, generating a signal DL, and generating the signal RST. The signal DL is a signal that indicates termination of the arithmetic operation in the arithmetic circuit 250. The DOUT 253 includes an AND 20, an output timing generation circuit 21, an output signal generation circuit 22, a register 40, and a MUX 32. The INASNC is input from the CFM 222i to the MUX 32. The OUTASNC is input from the CFM 222oa to the output timing generation circuit 21.

The AND 20 generates the signal DL. The signal DL is at an "H" level when the signal PWON and the signal RO are each at the "H" level. The signal RO takes the "H" level after a delay time of the replica circuit 251 when the signal PWON is generated in the AND 12, whereby the signal DL takes the "H" level. In other words, the signal DL is generated when the arithmetic operation by the arithmetic circuit 250 is completed and the signal LMO is fixed. Therefore, the completion of the arithmetic operation by the arithmetic circuit 250 can be monitored by the signal DL. Timing at which a signal is transmitted between internal circuits of the LE 220 can be controlled with the signal DL, so that the operation of the internal circuits can be started or the operation can be terminated at an appropriate timing. For example, the output timing generation circuit 21 generates the signal RST in accordance with the signal DL.

Figure 13A:
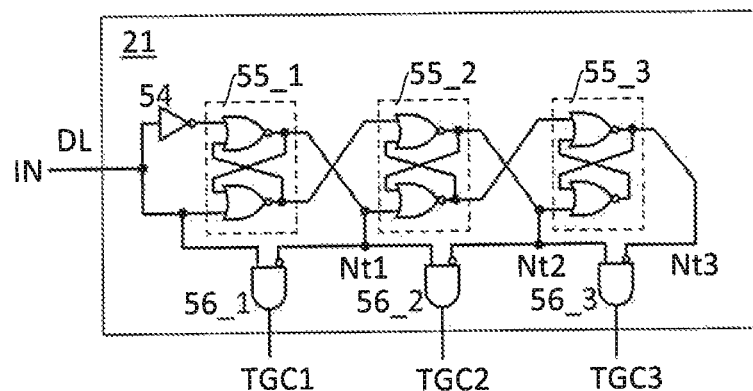
FIG. 13A is a circuit diagram illustrating a configuration example of an output timing generation circuit.
Figure 13B:
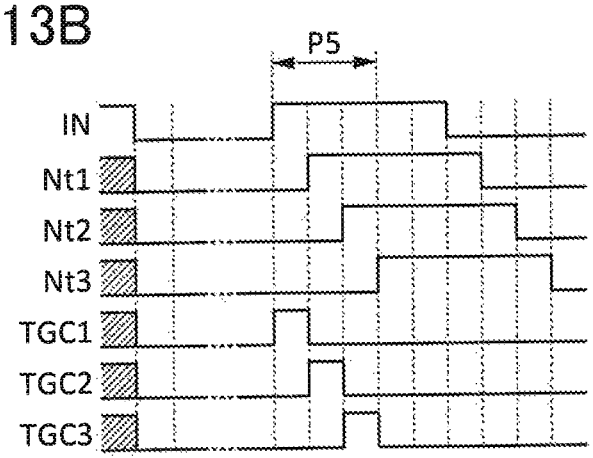
FIG. 13B is a timing chart illustrating an operation example of the output timing generation circuit.

FIG. 13A is a circuit diagram illustrating a configuration example of the output timing generation circuit 21, and FIG. 13B is a timing chart illustrating an operation example of the output timing generation circuit 21. The output timing generation circuit 21 generates signals TGC1, TGC2, and TGC3 on the basis of the signal DL. The TGC3 is used for the reset signal (RST) of the LAT 10.

The output timing generation circuit 21 includes an inverter (INV) 54, RS latches 55_1 to 55_3, and ANDs 56_1 to 56_3. The RS latches 55_1 to 55_3 are each configured with two NORs. In the output timing generation circuit 21, the signals TGC1 to TGC3 are generated when the signal DL takes the "H" level. In FIG. 13B, signals Nt1, Nt2, and Nt3 denote output signals of the RS latches 55_1, 55_2, and 55_3, respectively. The signal TGC1 is a pulse signal having a pulse width corresponding to the delay time of the RS latch 55_1. The same applies to the signals TGC2 and TGC3, whose pulse widths corresponds to the delay times of the RS latches 55_2 and 55_3, respectively.

The pulse width of the signal RST corresponds to times of delay caused by operation of the RS latches in the output timing generation circuit 21. Therefore, the signal RST can have a pulse width which is sufficient for the operation of the LAT 10 when the RS latches of the output timing generation circuit 21 has the same configurations as the RS latches of the LAT 10. The delay times of the RS latches in the output timing generation circuit 21 are affected by process technology, power supply voltage, temperature, or the like; however, the pulse width of the signal RST is corrected in a self-aligned manner because the operation speed of the RS latches in the LAT 10 is similarly affected. Thus, stable circuit operation of the LE 220 can be maintained.

The MUX 32 generates a timing signal of the register 40 in accordance with the INASNC. A signal TG2 is a signal output from the MUX 32. In the case where the CNTXT0 (binary driving) is selected, the output of the MUX 32 is kept at an "H" level, whereas in the case where the CNTXT1 (pulse driving) is selected, the MUX 32 outputs the signal TG2.

The register 40 is provided to hold data (the signal LMO) output from the arithmetic circuit 250. With the register 40, arithmetic results of the arithmetic circuit 250 can be extracted from the LE 220 even while power gating is performed in the arithmetic circuit 250. In binary driving, the logic of a signal LMOL is fixed when the signal TG2 at an "H" level is input to the register 40.

The output signal generation circuit 22 outputs the data signal LE_OUT in accordance with the signals TGC1 and TGC3. Thus, the logic and configuration of the data signal LE_OUT is determined by the logic and context of the signal LMOL. In the case where the CNTXT0 is selected, the data signal LE_OUT is a binary signal whose logic is the same as that of the signal LMOL, whereas in the case where the CNTXT1 is selected, the data signal LE_OUT is a pulse signal whose logic is the same as that of the signal LMOL.

Figure 13C:
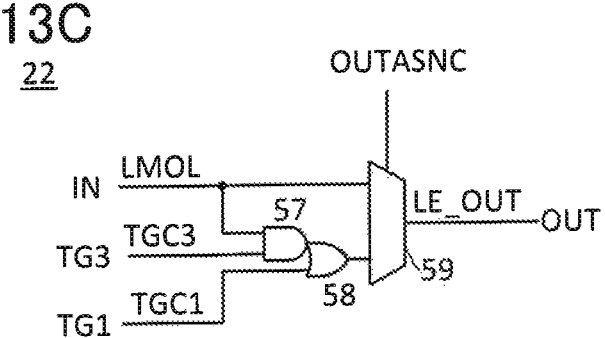
FIG. 13C is a circuit diagram illustrating a configuration example of an output signal generation circuit.

FIG. 13C is a circuit diagram illustrating a configuration example of the output signal generation circuit 22. The output signal generation circuit 22 includes an AND 57, an OR 58, and a MUX 59. The OUTASNC is used as a control signal of the MUX 59. The MUX 59 outputs the signal LMOL in binary driving and an output signal of the OR 58 in pulse driving. Thus, in pulse driving, the data signal LE_OUT becomes a pulse signal whose potential level is set by the signals TGC1 and TGC3 (see a period P5 in FIG. 13B).

The operation of the output signal generation circuit 22 during pulse driving will be described. First, the MUX 59 outputs a wakeup pulse signal in accordance with the signal TGC1. Then, the logic of the signal LMOL is fixed by inputting the signal TG2 to the register 40. After the logic of the signal LMOL is fixed, a pulse signal that determines the logic of the data signal LE_OUT is generated by the signal TGC3. When the signal LMOL is at an "H" level, an output of the MUX 59 is at an "H" level, whereas when the signal LMOL is at an "L" level, an output of the MUX 59 is at an "L" level. Therefore, during the period P5, two pulse signals are output from the MUX 59 when the signal LMOL is at the "H" level, whereas one pulse signal is output from the MUX 59 when the signal LMOL is at the "L" level.

<<Logic Element>>

Figure 14:
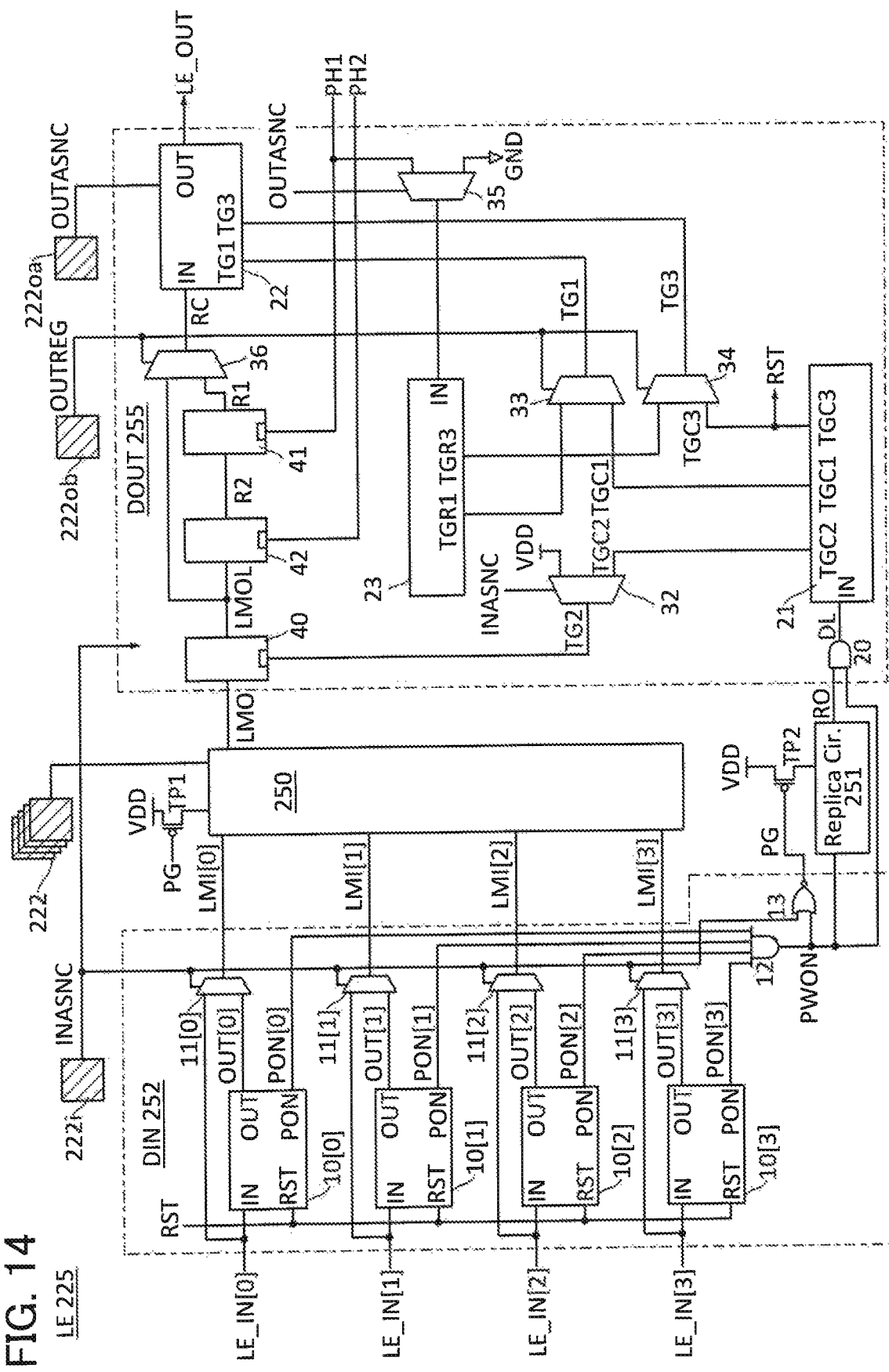
FIG. 14 is a block diagram illustrating a configuration example of a logic element.

FIG. 14 illustrates another configuration example of a logic element applicable to the FPGA 200. A logic element (LE) 225 illustrated in FIG. 14 is a variation of the LE 220 and includes a DOUT 255 instead of the DOUT 253. The DOUT 255 is a variation of the DOUT 253. The DOUT 255 is a circuit in which an output timing generation circuit 23, registers 41 and 42, and MUXs 33 to 36 are added to the DOUT 253. Clock signals PH1 and PH2 are input to the DOUT 255. The DOUT 255 has a function of outputting the data signal LE_OUT synchronously or asynchronously with the clock signal PH1. Here, operation for outputting the data signal LE_OUT synchronously with the clock signal PH1 is referred to as synchronous output operation, and operation for outputting the data signal LE_OUT asynchronously with the clock signal PH1 is referred to as asynchronous output operation.

OUTREG is input from CFM 222ob to the DOUT 255. The OUTREG is data to determine whether the DOUT 255 has a circuit configuration that can perform the synchronous output operation or a circuit configuration that can perform the asynchronous output operation. The OUTREG is input to the MUXs 33, 34, and 36. Note that OUTASNC is input to the MUX 35.

Like the LE 220, the LE 225 can perform power gating of the arithmetic circuit 250 and the replica circuit 251 without synchronizing with a global clock signal during pulse driving. Thus, power consumption of the LE 225 can be effectively reduced.

Figure 15:
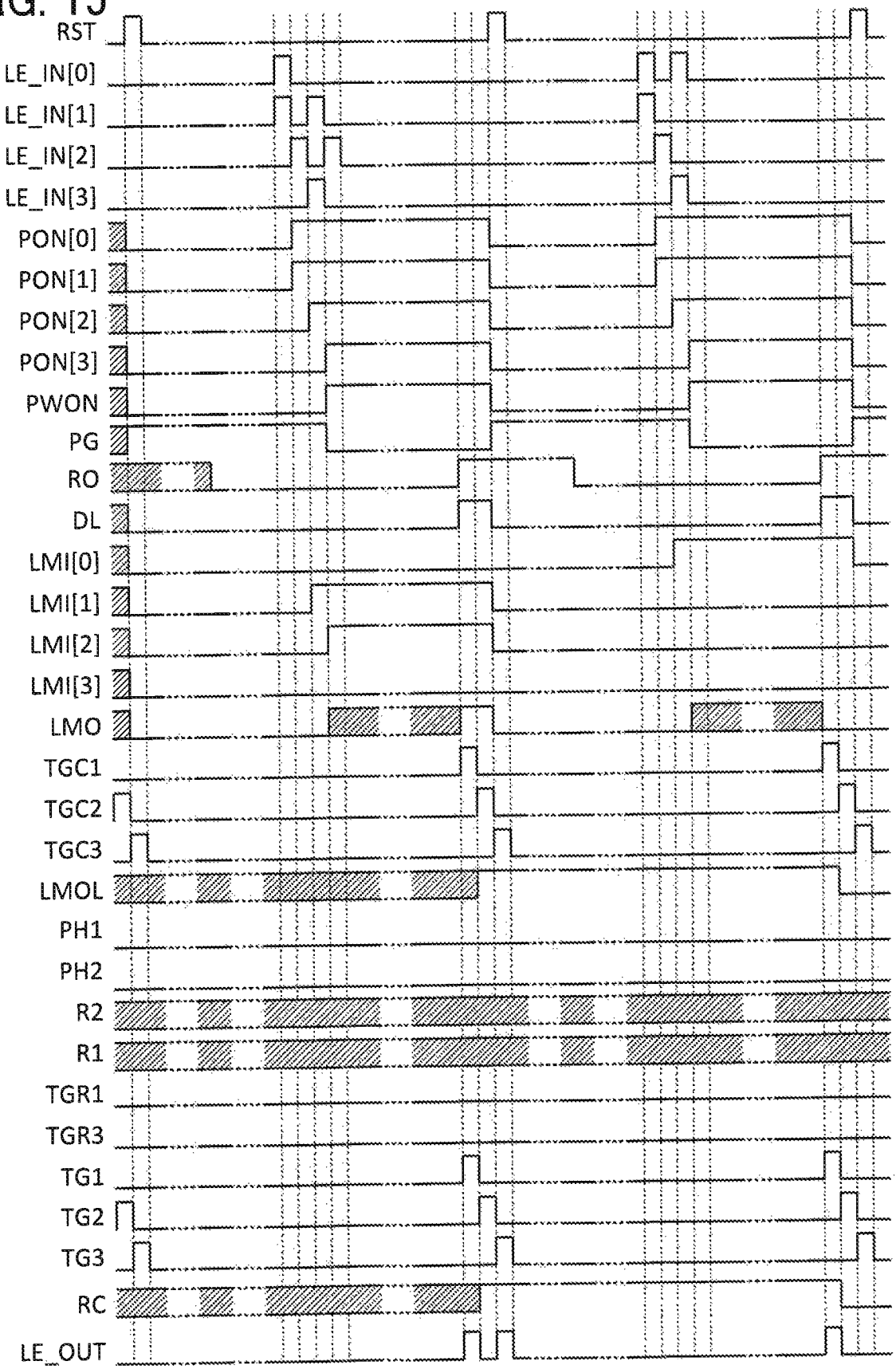
FIG. 15 is a timing chart illustrating an operation example of the logic element.
Figure 16:
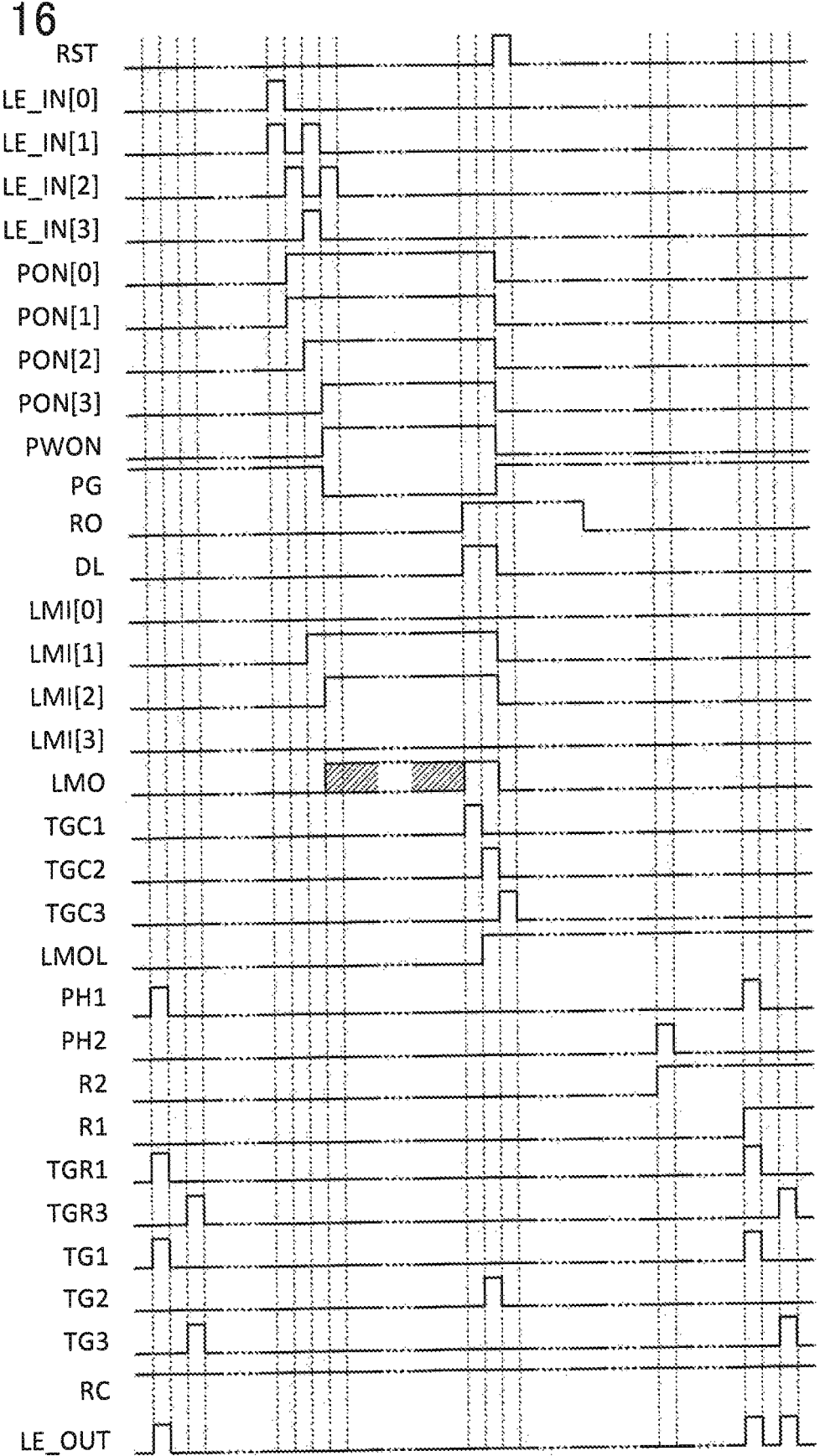
FIG. 16 is a timing chart illustrating an operation example of the logic element.

FIG. 15 and FIG. 16 are timing charts illustrating operation examples of the LE 225 during binary driving. FIG. 15 illustrates an example of the asynchronous output operation, in which case the clock signals PH1 and PH2 are each kept at an "L" level. The operation of the LE 225 is similar to that of the LE 220 in FIG. 10, and the data signal LE_OUT is output at timing at which the signal DL takes an "H" level. FIG. 16 illustrates an example of the synchronous output operation. The data signal LE_OUT is output at timing at which the potential of the clock signal PH1 takes an "H" level.

A configuration example and operation examples of the LE 225 will be described below. Note that although reference to FIG. 14, FIG. 15, and FIG. 16 is not made in the following description in some cases, the description is based on these drawings.

The register 42 has a function of latching a signal LMOL and outputting the latched data under control of the clock signal PH2. A signal R2 is a signal output from the register 42. The register 41 has a function of latching the signal R2 and outputting the latched data under control of the clock signal PH1. A signal R1 is a signal output from the register 41. With the registers 41 and 42, data (LMO) output from the arithmetic circuit 250 at a predetermined timing can be transmitted outside from the LE 225.

The MUX 36 has a function of selecting a signal input to the output signal generation circuit 22 in accordance with the OUTREG. A signal RC is a signal output from the MUX 36. The signal RC becomes the signal LMOL in the case of the asynchronous output operation and the signal R1 in the case of the synchronous output operation. In the case where the CNTXT0 (binary driving) is selected, the MUX 35 always outputs an "L" level, whereas in the case where the CNTXT1 (pulse driving) is selected, the MUX 35 outputs the clock signal PH1.

The output timing generation circuit 23 has a function of generating signals TG1 and TG3 (timing signals) from a signal output from the MUX 35. The output timing generation circuit 23 has a similar circuit configuration to the output timing generation circuit 21 and operates similarly (FIGS. 13A and 13B). The MUXs 33 and 34 are circuits for selecting timing signals used in the output signal generation circuit 22. In the synchronous output operation, signals TGR1 and TGR3 are input to the output signal generation circuit 22, whereas in the asynchronous output operation, signals TGC1 and TGC3 are input to the output signal generation circuit 22.

It is also effective to perform processing of the circuit 183 in the decoder 126 by a dedicated circuit instead of the FPGA. For example, the case where DCT is performed with a dedicated circuit (a DCT circuit) will be described. The DIN 252 is provided in a data input portion of the DCT circuit, and the DOUT 253 or the DOUT 255 is provided in a data output portion thereof. Note that the circuit size of the DIN 252 is based on the number of inputs to the DCT circuit, and the circuit size of the DOUT 253 or 255 is based on the number of outputs from the DCT circuit. The replica circuit 251 serves as a replica circuit of the DCT circuit. With such a circuit configuration of the DCT circuit, the DCT circuit can operate with a high clock frequency during binary driving and can operate with a low frequency and power gating during pulse driving. That is, this embodiment enables optimum arithmetic efficiency and low power consumption of the decoder.

Embodiment 2

This embodiment will describe a semiconductor device used for the broadcast system.
<<Image Sensor>>

Figure 17A:
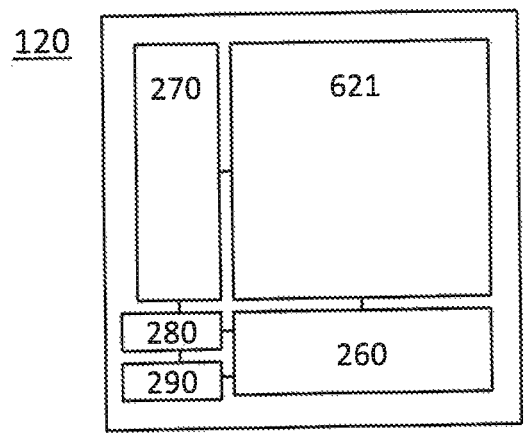
FIGS. 17A to 17C illustrate a configuration example of an image sensor.

FIG. 17A is a plan view illustrating a configuration example of the image sensor 120. The image sensor 120 includes a pixel portion 621 and circuits 260, 270, 280, and 290. In this specification and the like, the circuits 260 to 290 and the like may be referred to as a "peripheral circuit" or a "driver". For example, the circuit 260 can be regarded as part of the peripheral circuit.

Figure 17B:
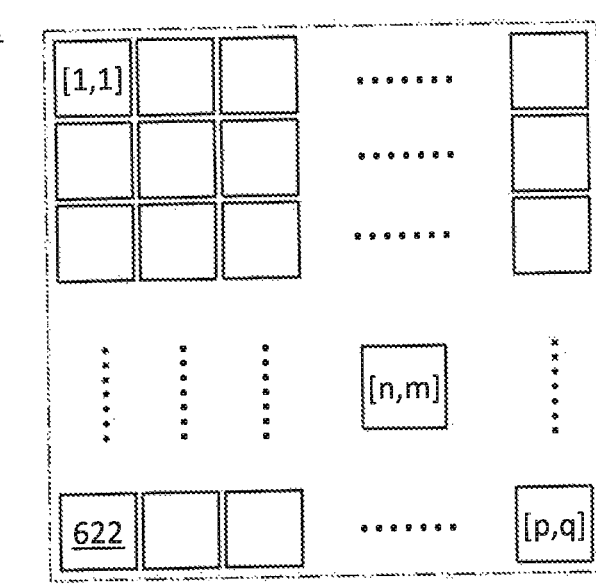

FIG. 17B illustrates a configuration example of the pixel portion 621. The pixel portion 621 includes a plurality of pixels 622 arranged in a matrix of p columns by q rows (p and q are each a natural number greater than or equal to 2). Note that in FIG. 17B, n is a natural number of greater than or equal to 1 and smaller than or equal top, and m is a natural number of greater than or equal to 1 and smaller than or equal to q.

The circuits 260 and 270 are connected to the plurality of pixels 622 and have a function of supplying signals for driving the plurality of pixels 622. The circuit 260 may have a function of processing an analog signal output from the pixels 622. The circuit 280 may have a function of controlling the operation timing of the peripheral circuit. For example, the circuit 280 may have a function of generating a clock signal. Furthermore, the circuit 280 may have a function of converting the frequency of a clock signal supplied from the outside. Moreover, the circuit 280 may have a function of supplying a reference potential signal (e.g., a ramp wave signal).

The peripheral circuit includes at least one of a logic circuit, a switch, a buffer, an amplifier circuit, and a converter circuit. Alternatively, transistors or the like included in the peripheral circuit may be formed using part of a semiconductor that is formed to form the pixel 622, which will be described later. A semiconductor device such as an IC chip may be used as part or the whole of the peripheral circuit.

Note that in the peripheral circuit, at least one of the circuits 260 to 290 may be omitted. For example, when one of the circuits 260 and 290 additionally has a function of the other of the circuits 260 and 290, the other of the circuits 260 and 290 may be omitted. For another example, when one of the circuits 270 and 280 additionally has a function of the other of the circuits 270 and 280, the other of the circuits 270 and 280 may be omitted. For further another example, a function of another peripheral circuit may be added to one of the circuits 260 to 290 to omit that peripheral circuit.

Figure 17C:
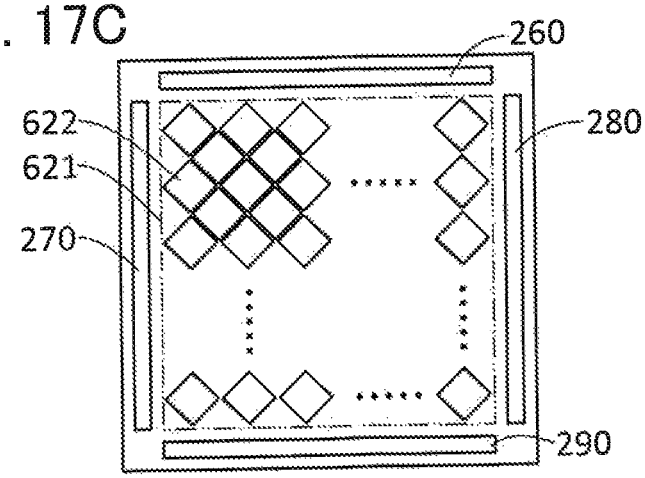

As illustrated in FIG. 17C, the circuits 260 to 290 may be provided along the periphery of the pixel portion 621. In the pixel portion 621 included in the image sensor 120, the pixels 622 may be obliquely arranged. When the pixels 622 are obliquely arranged, the distance between pixels (pitch) can be shortened in the row direction and the column direction. Accordingly, the quality of an image taken with the image sensor 120 can be improved.

The pixel portion 621 may be provided over the circuits 260 to 290 to overlap with the circuits 260 to 290. The provision of the pixel portion 621 over the circuits 260 to 290 to overlap with the circuits 260 to 290 can increase the area occupied by the pixel portion 621 for the image sensor 120. Accordingly, the light sensitivity, the dynamic range, the resolution, the reproducibility of a taken image, or the integration degree of the image sensor 120 can be increased.

The pixels 622 included in the image sensor 120 are used as subpixels, and each of the plurality of pixels 622 is provided with a filter that transmits light in a different wavelength range (color filter), whereby data for achieving color image display can be obtained.

Figure 18A:
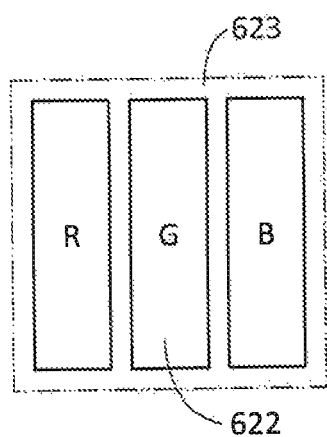
FIGS. 18A to 18D illustrate configuration examples of an image sensor.

FIG. 18A is a plan view illustrating an example of a pixel 623 with which a color image is obtained. The pixel 623 in FIG. 18A is provided with the pixel 622 provided with a color filter that transmits light in a red (R) wavelength range (also referred to as a "pixel 622R"), the pixel 622 provided with a color filter that transmits light in a green (G) wavelength range (also referred to as a "pixel 622G"), and the pixel 622 provided with a color filter that transmits light in a blue (B) wavelength range (also referred to as a "pixel 622B"). The pixel 622R, the pixel 622G, and the pixel 622B collectively function as one pixel 623.

The color filter used in the pixel 623 is not limited to red (R), green (G), and blue (B) color filters, and color filters that transmit light of cyan (C), yellow (Y), and magenta (M) may be used. The pixels 622 that sense light in at least three different wavelength ranges are provided in one pixel 623, whereby a full-color image can be obtained.

Figure 18B:
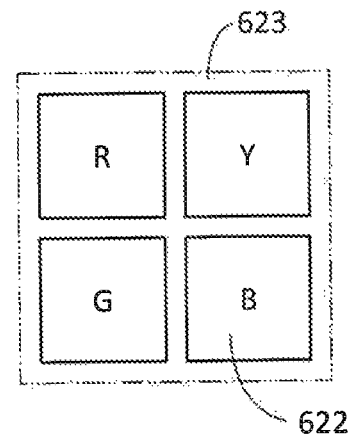
Figure 18C:
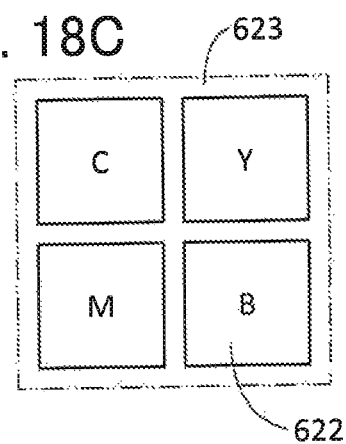

FIG. 18B illustrates the pixel 623 including the pixel 622 provided with a color filter that transmits yellow (Y) light, in addition to the pixels 622 provided with the color filters that transmit red (R), green (G), and blue (B) light. FIG. 18C illustrates the pixel 623 including the pixel 622 provided with a color filter that transmits blue (B) light, in addition to the pixels 622 provided with the color filters that transmit cyan (C), yellow (Y), and magenta (M) light. When the pixels 622 that sense light in four or more different wavelength ranges are provided in one pixel 623, the reproducibility of colors of an obtained image can be increased.

Figure 18D:
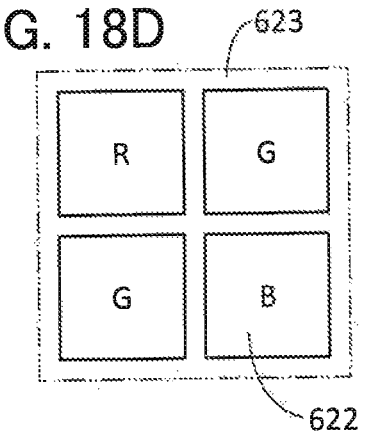

The pixel number ratio (or the ratio of light receiving area) of the pixel 622R to the pixel 622G and the pixel 622B is not necessarily be 1:1:1. The pixel number ratio (the ratio of light receiving area) of red to green and blue may be 1:2:1 (Bayer arrangement), as illustrated in FIG. 18D. Alternatively, the pixel number ratio (the ratio of light receiving area) of red to green and blue may be 1:6:1.

Although the number of pixels 622 used in the pixel 623 may be one, two or more is preferable. For example, when two or more pixels 622 that sense light in the same wavelength range are provided, the redundancy is increased, and the reliability of the image sensor 120 can be increased.

When an infrared (IR) filter that transmits infrared light and absorbs or reflects light in a wavelength shorter than or equal to that of visible light is used as the filter, the image sensor 120 that detects infrared light can be achieved. Alternatively, when an ultra violet (UV) filter that transmits ultraviolet light and absorbs or reflects light in a wavelength longer than or equal to that of visible light is used as the filter, the image sensor 120 that detects ultraviolet light can be achieved. Alternatively, when a scintillator that turns a radiant ray into ultraviolet light or visible light is used as the filter, the image sensor 120 can be used as a radiation detector that detects an X-ray or a γ-ray.

When a neutral density (ND) filter (dimming filter) is used as the filter, a phenomenon of output saturation, which is caused when an excessive amount of light enters a photoelectric conversion element (light-receiving element), can be prevented. With a combination of ND filters with different dimming capabilities, the dynamic range of the image sensor can be increased.

Figure 19A:
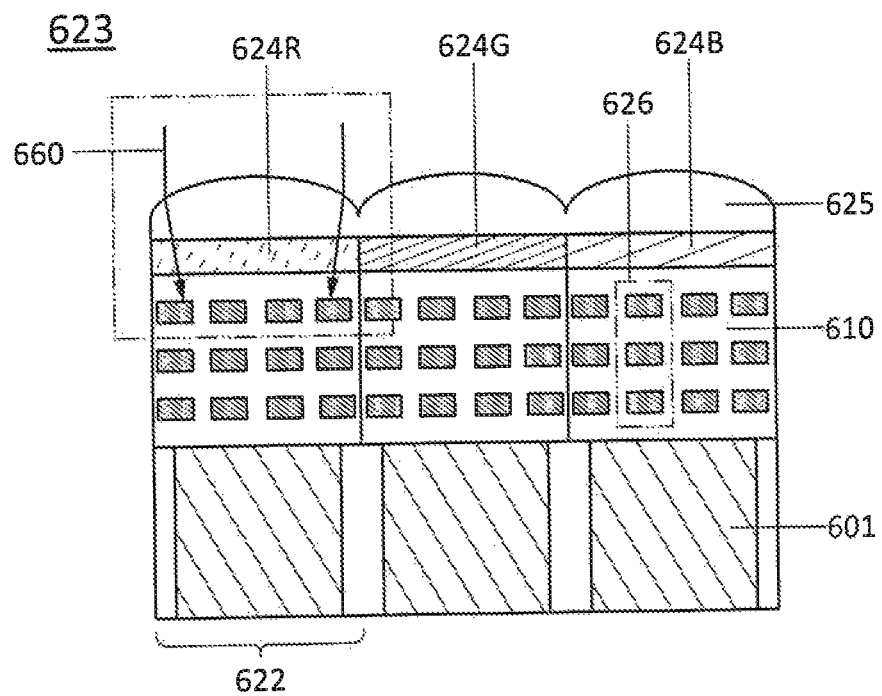
FIGS. 19A and 19B illustrate structure examples of an image sensor.

Besides the above-described filter, the pixel 622 may be provided with a lens. An arrangement example of the pixel 622, a filter 624, and a lens 625 is described with reference to cross-sectional views in FIGS. 19A and 19B. With the lens 625, incident light can be efficiently received by a photoelectric conversion element. Specifically, as illustrated in FIG. 19A, light 660 enters a photoelectric conversion element 601 through the lens 625, the filter 624 (a filter 624R, a filter 624G, or a filter 624B), a pixel driver 610, and the like formed in the pixel 622.

Figure 19B:
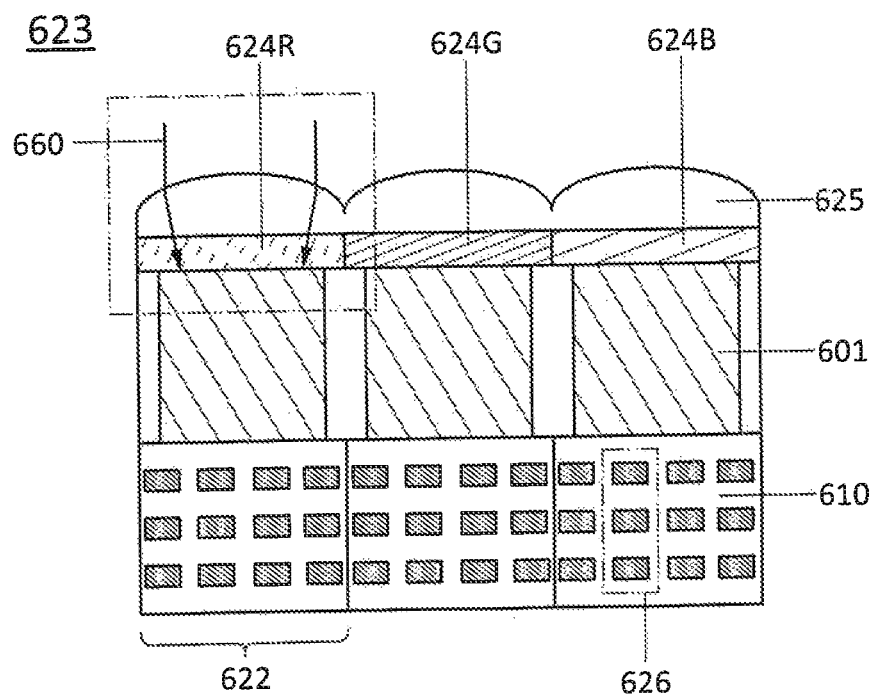

However, as illustrated in a region surrounded by the two-dot chain line, part of the light 660 indicated by the arrows may be blocked by part of a wiring group 626, such as a transistor and/or a capacitor. Thus, a structure in which the lens 625 and the filter 624 are provided on the photoelectric conversion element 601 side, as illustrated in FIG. 19B, may be employed such that the incident light is efficiently received by the photoelectric conversion element 601. When the light 660 is incident on the photoelectric conversion element 601 side, the image sensor 120 with high light sensitivity can be provided.

Figure 20A:
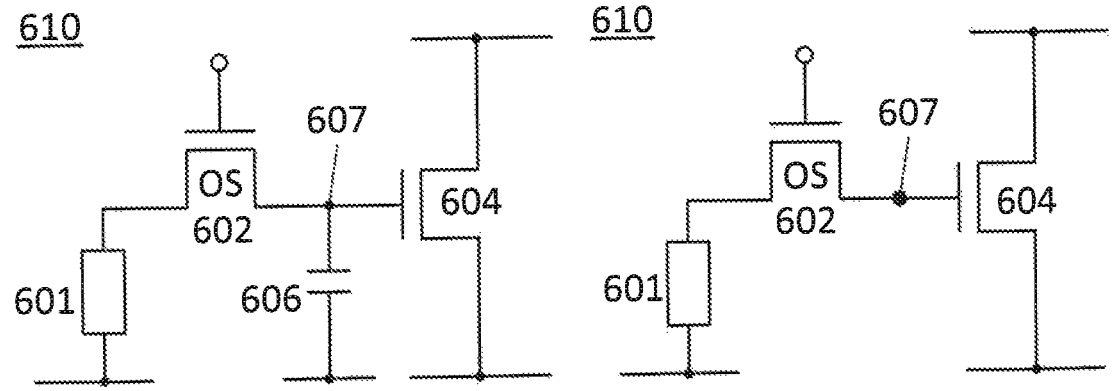
FIGS. 20A to 20C are circuit diagrams illustrating configuration examples of an image sensor.
Figure 20B:
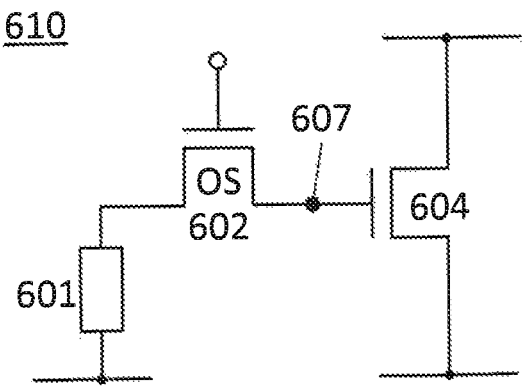
Figure 20C:
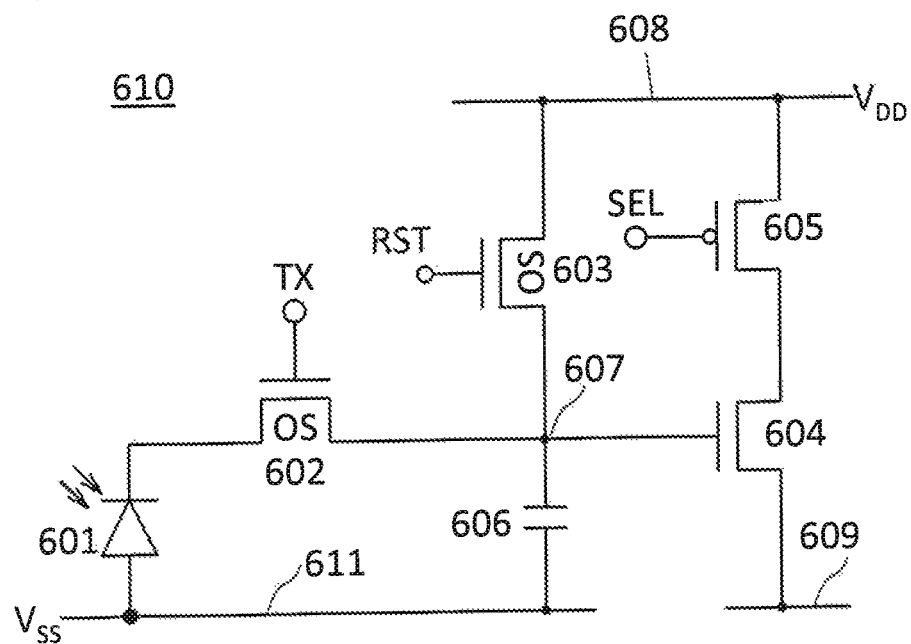

FIGS. 20A to 20C illustrate examples of the pixel driver 610 that can be used for the pixel portion 621. The pixel driver 610 illustrated in FIG. 20A includes a transistor 602, a transistor 604, and a capacitor 606 and is connected to the photoelectric conversion element 601. One of a source and a drain of the transistor 602 is electrically connected to the photoelectric conversion element 601, and the other of the source and the drain of the transistor 602 is electrically connected to a gate of the transistor 604 through a node 607 (a charge accumulation portion).

"OS" indicates that it is preferable to use an OS transistor. The same applies to the other drawings. Since the off-state current of the OS transistor is extremely low, the capacitor 606 can be made small. Alternatively, the capacitor 606 can be omitted as illustrated in FIG. 20B. Furthermore, when the transistor 602 is an OS transistor, the potential of the node 607 is less likely to be changed. Thus, an image sensor that is less likely to be affected by noise can be provided. Note that the transistor 604 may be an OS transistor.

A diode element formed using a silicon substrate with a PN junction or a PIN junction can be used as the photoelectric conversion element 601. Alternatively, a PIN diode element or the like formed using an amorphous silicon film, a microcrystalline silicon film, or the like may be used. Alternatively, a diode-connected transistor may be used. Further alternatively, a variable resistor or the like utilizing a photoelectric effect may be formed using silicon, germanium, selenium, or the like.

The photoelectric conversion element may be formed using a material capable of generating electric charge by absorbing radiation. Examples of the material capable of generating electric charge by absorbing radiation include lead iodide, mercury iodide, gallium arsenide, CdTe, and CdZn.

The pixel driver 610 illustrated in FIG. 20C includes the transistor 602, a transistor 603, the transistor 604, a transistor 605, and the capacitor 606 and is connected to the photoelectric conversion element 601. In the pixel driver 610 illustrated in FIG. 20C, a photodiode is used as the photoelectric conversion element 601. One of the source and the drain of the transistor 602 is electrically connected to a cathode of the photoelectric conversion element 601. The other of the source and the drain of the transistor 602 is electrically connected to the node 607. An anode of the photoelectric conversion element 601 is electrically connected to a wiring 611. One of a source and a drain of the transistor 603 is electrically connected to the node 607. The other of the source and the drain of the transistor 603 is electrically connected to a wiring 608. The gate of the transistor 604 is electrically connected to the node 607. One of a source and a drain of the transistor 604 is electrically connected to a wiring 609. The other of the source and the drain of the transistor 604 is electrically connected to one of a source and a drain of the transistor 605. The other of the source and the drain of the transistor 605 is electrically connected to the wiring 608. One electrode of the capacitor 606 is electrically connected to the node 607. The other electrode of the capacitor 606 is electrically connected to the wiring 611.

The transistor 602 can function as a transfer transistor. A gate of the transistor 602 is supplied with a transfer signal TX. The transistor 603 can function as a reset transistor. A gate of the transistor 603 is supplied with a reset signal RST. The transistor 604 can function as an amplifier transistor. The transistor 605 can function as a selection transistor. A gate of the transistor 605 is supplied with a selection signal SEL. Moreover, VDD is supplied to the wiring 608 and VSS is supplied to the wiring 611.

Next, operations of the pixel driver 610 illustrated in FIG. 20C are described. First, the transistor 603 is turned on so that VDD is supplied to the node 607 (reset operation). Then, the transistor 603 is turned off so that VDD is held at the node 607. Next, the transistor 602 is turned on so that the potential of the node 607 is changed in accordance with the amount of light received by the photoelectric conversion element 601 (accumulation operation). After that, the transistor 602 is turned off so that the potential of the node 607 is held. Next, the transistor 605 is turned on so that a potential corresponding to the potential of the node 607 is output from the wiring 609 (selection operation). Measuring the potential of the wiring 609 can determine the amount of light received by the photoelectric conversion element 601.

An OS transistor is preferably used as each of the transistors 602 and 603. Since the off-state current of the OS transistor is extremely low as described above, the capacitor 606 can be made small or omitted. Furthermore, when the transistors 602 and 603 are OS transistors, the potential of the node 607 is less likely to be changed. Thus, an image sensor 120 that is less likely to be affected by noise can be provided.

<<Display Device>>

The display device 113 includes at least one of an electroluminescence (EL) element (e.g., an EL element including organic and inorganic materials, an organic EL element, or an inorganic EL element), an LED chip (e.g., a white LED chip, a red LED chip, a green LED chip, or a blue LED chip), a transistor (a transistor that emits light depending on current), an electron emitter, a display element including a carbon nanotube, a liquid crystal element, electronic ink, an electrowetting element, an electrophoretic element, a display element using micro electro mechanical systems (MEMS) (such as a grating light valve (GLV), a digital micromirror device (DMD), a digital micro shutter (DMS), MIRASOL (registered trademark), an interferometric modulator display (IMOD) element, a MEMS shutter display element, an optical-interference-type MEMS display element, or a piezoelectric ceramic display), quantum dots, and the like.

Other than above, the display device may include a display medium whose contrast, luminance, reflectance, transmittance, or the like is changed by an electric or magnetic effect. For example, the display device may be a plasma display panel (PDP).

Examples of a display device including an EL element include an EL display. Examples of a display device including an electron emitter include a field emission display (FED) and an SED-type flat panel display (SED: surface-conduction electron-emitter display).

Examples of display devices containing quantum dots in each pixel include a quantum dot display. Note that quantum dots may be provided not as display elements but as part of a backlight used for a liquid crystal display device or the like. The use of quantum dots enables display with high color purity.

Examples of display devices including liquid crystal elements include a liquid crystal display device (e.g., a transmissive liquid crystal display, a transflective liquid crystal display, a reflective liquid crystal display, a direct-view liquid crystal display, or a projection liquid crystal display).

In the case of a transflective liquid crystal display or a reflective liquid crystal display, some of or all of pixel electrodes serve as reflective electrodes. For example, some or all of pixel electrodes are formed to contain aluminum, silver, or the like. In such a case, a memory circuit such as an SRAM can be provided under the reflective electrodes, resulting in lower power consumption.

An example of a display device including electronic ink, Electronic Liquid Powder (registered trademark), or an electrophoretic element is electronic paper.

Note that in the case of using an LED chip for a display element or the like, graphene or graphite may be provided under an electrode or a nitride semiconductor of the LED chip. Graphene or graphite may be a multilayer film in which a plurality of layers are stacked. As described above, provision of graphene or graphite enables easy formation of a nitride semiconductor thereover, such as an n-type GaN semiconductor layer including crystals. Furthermore, a p-type GaN semiconductor layer including crystals or the like can be provided thereover, and thus the LED chip can be formed. Note that an AlN layer may be provided between the n-type GaN semiconductor layer including crystals and graphene or graphite. The GaN semiconductor layers included in the LED chip may be formed by MOCVD. Note that when the graphene is provided, the GaN semiconductor layers included in the LED chip can also be formed by a sputtering method.

In a display element including MEMS, a dry agent may be provided in a space where a display element is sealed (or between an element substrate over which the display element is placed and a counter substrate opposed to the element substrate, for example). Providing a dry agent can prevent MEMS and the like from becoming difficult to move or deteriorating easily because of moisture or the like.

Figure 21:
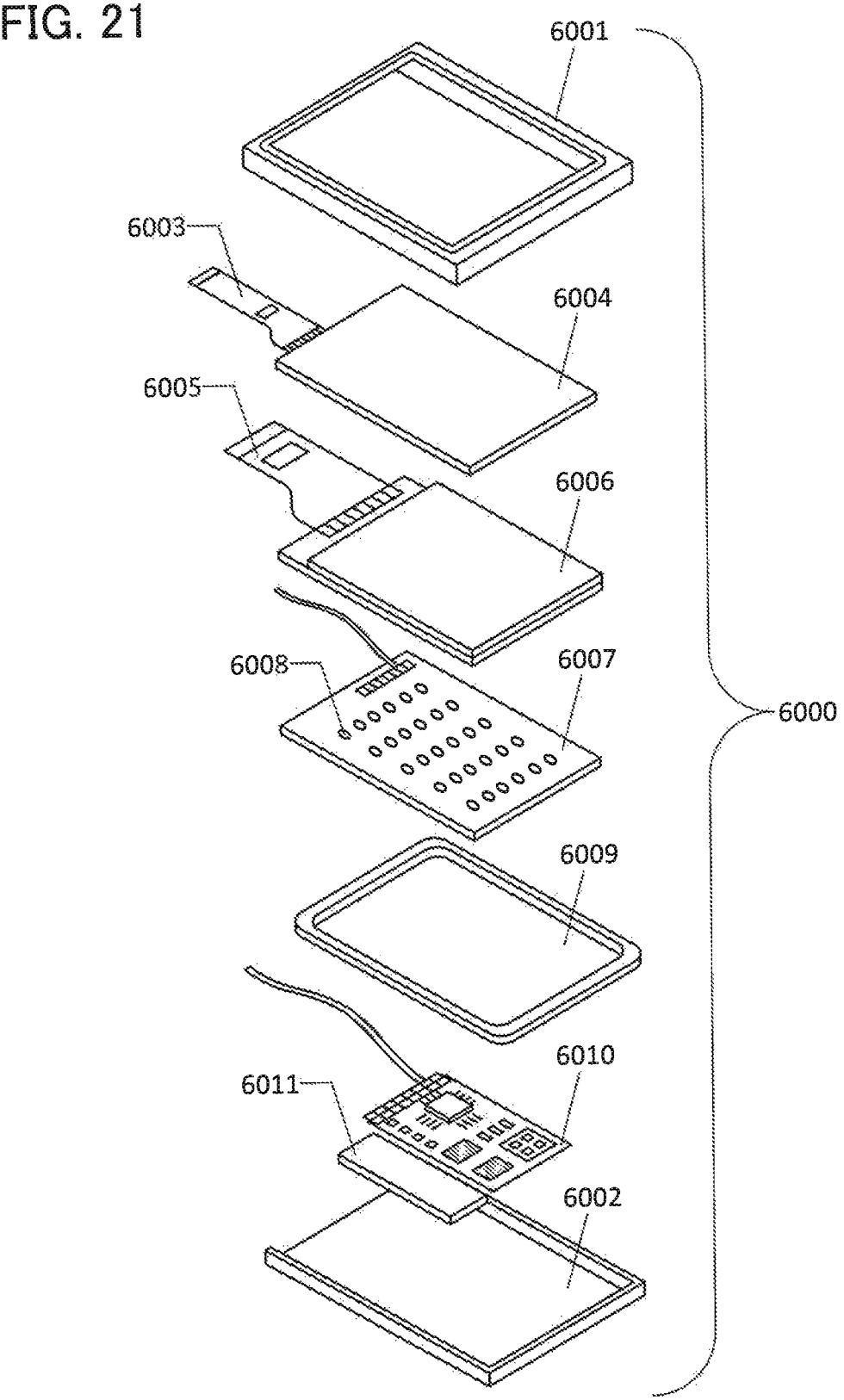
FIG. 21 is an exploded view illustrating a structure example of a display module.

FIG. 21 illustrates a structure example of a display module used for the display device 113. In a display module 6000 in FIG. 21, a touch sensor 6004 connected to an FPC 6003, a display panel 6006 connected to an FPC 6005, a backlight unit 6007, a frame 6009, a printed board 6010, and a battery 6011 are provided between an upper cover 6001 and a lower cover 6002. Note that the backlight unit 6007, the battery 6011, the touch sensor 6004, and the like are not provided in some cases.

The semiconductor device of one embodiment of the present invention can be provided for, for example, an integrated circuit mounted on the printed board 6010 and the like. The display portion 128 of the display device 113 is formed with the display panel 6006. The printed board 6010 has a power supply circuit, a signal processing circuit for outputting a video signal and a clock signal, and the like. As a power source for supplying power to the power supply circuit, the battery 6011 or a commercial power source may be used. Note that the battery 6011 can be omitted in the case where a commercial power source is used as the power source. The printed board 6010 may be provided with the receiver of one embodiment of the present invention, if necessary.

The shapes and sizes of the upper cover 6001 and the lower cover 6002 can be changed as appropriate in accordance with the sizes of the touch sensor 6004, the display panel 6006, and the like.

The touch sensor 6004 can be a resistive touch panel or a capacitive touch panel and may be formed to overlap with the display panel 6006. The display panel 6006 can have a touch sensor function. For example, an electrode for a touch sensor may be provided in each pixel of the display panel 6006 so that a capacitive touch panel function is added. Alternatively, a photosensor may be provided in each pixel of the display panel 6006 so that an optical touch sensor function is added.

The backlight unit 6007 includes a light source 6008. The light source 6008 may be provided at an end portion of the backlight unit 6007 and a light diffusing plate may be used. When a light-emitting display device or the like is used for the display panel 6006, the backlight unit 6007 can be omitted. The frame 6009 protects the display panel 6006 and also functions as an electromagnetic shield for blocking electromagnetic waves generated from the printed board 6010 side. The frame 6009 may function as a radiator plate. The display module 6000 can be additionally provided with a member such as a polarizing plate, a retardation plate, or a prism sheet.

Figure 22A:
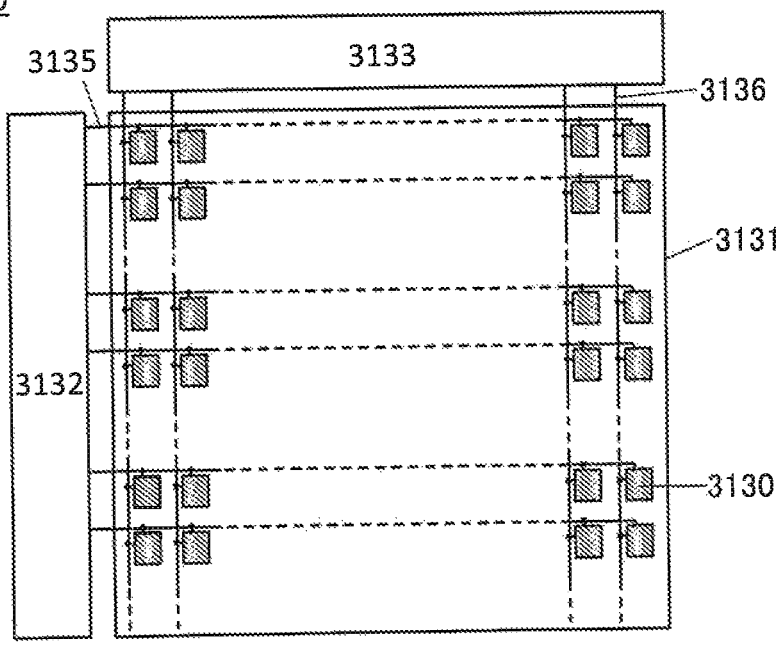
FIG. 22A is a block diagram illustrating a configuration example of a display portion.

FIG. 22A illustrates a configuration example of the display portion. A display portion 3100 in FIG. 22A includes a display area 3131 and circuits 3132 and 3133. The circuit 3132 functions as a scan line driver, for example, and the circuit 3133 functions as a signal line driver, for example.

The display portion 3100 includes m scan lines 3135 that are arranged parallel or substantially parallel to each other and whose potentials are controlled by the circuit 3132, and n signal lines 3136 that are arranged parallel or substantially parallel to each other and whose potentials are controlled by the circuit 3133. The display area 3131 includes a plurality of pixels 3130 arranged in a matrix of m rows by n columns. Note that m and n are each a natural number of 2 or more.

Each of the scan lines 3135 is electrically connected to the n pixels 3130 in the corresponding row among the pixels 3130 in the display area 3131. Each of the signal lines 3136 is electrically connected to the m pixels 3130 in the corresponding column among the pixels 3130.

Figure 22B:
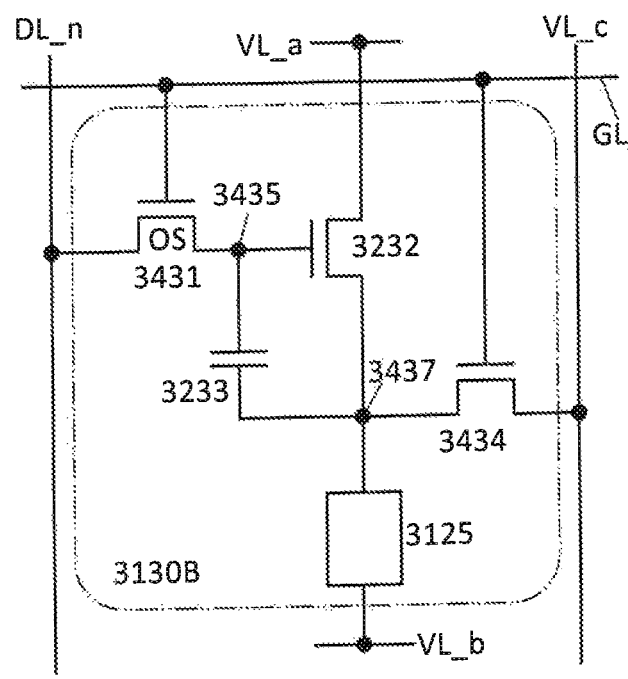
FIGS. 22B and 22C are circuit diagrams illustrating configuration examples of a pixel.
Figure 22C:
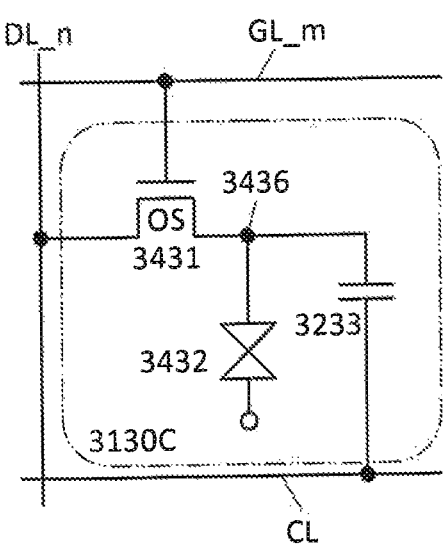

FIGS. 22B and 22C are circuit diagrams illustrating configuration examples of the pixel 3130. A pixel 3130B in FIG. 22B is a pixel of a self-luminous display device, and a pixel 3130C in FIG. 22C is a pixel of a liquid crystal display device.

The pixel 3130B includes a capacitor 3233, transistors 3431, 3232 and 3434, and a light-emitting element 3125. The pixel 3130B is electrically connected to the signal line 3136 in the n-th column to which a data signal is supplied (hereinafter referred to as a signal line DL_n), the scan line 3135 in the m-th row to which a gate signal is supplied (hereinafter referred to as a scan line GL_m), and potential supply lines VL_a and VL_b.

A plurality of pixels 3130B are each used as a subpixel, and the subpixels emit light in different wavelength ranges, so that a color image can be obtained. For example, the pixel 3130 emitting light in a red wavelength range, the pixel 3130 emitting light in a green wavelength range, and the pixel 3130 emitting light in a blue wavelength range are used as one pixel.

The combination of the wavelength ranges of light is not limited to red, green, and blue and may be cyan, yellow, and magenta. Subpixels emitting light in at least three different wavelength ranges are provided in one pixel, whereby a full-color image can be obtained.

One or more of yellow, cyan, magenta, white, and the like may be added to red, green and blue. For example, a subpixel that emits light in a yellow wavelength range may be added, in addition to red, green, and blue. One or more of red, green, blue, white, and the like may be added to cyan, yellow, and magenta. For example, a subpixel that emits light in a blue wavelength range may be added in addition to cyan, yellow, and magenta. When the subpixels that emit light in four or more different wavelength ranges are provided in one pixel, the reproducibility of colors of a displayed image can be further increased.

The pixel number ratio (or the ratio of light emitting area) of red to green and blue used for one pixel is not necessarily be 1:1:1. For example, the pixel number ratio (the ratio of light emitting area) of red to green and blue may be 1:1:2. Alternatively, the pixel number ratio (the ratio of light emitting area) of red to green and blue may be 1:2:3.

A subpixel emitting white light may be combined with red, green, and blue color filters or the like to enable full-color display. Alternatively, a subpixel emitting light in a red wavelength range, a subpixel emitting light in a green wavelength range, and a subpixel emitting light in a blue wavelength range may be combined with a color filter transmitting light in a red wavelength, a color filter transmitting light in a green wavelength, and a color filter transmitting light in a blue wavelength, respectively.

One embodiment of the present invention can be applied not only to a display device for color display, but also to a display device for monochrome display.

The pixel 3130C illustrated in FIG. 22C is electrically connected to the transistor 3431, the capacitor 3233, and a liquid crystal element 3432. The pixel 3130C is electrically connected to the signal line DL_n, the scan line GL_m, and a capacitor line CL.

The potential of one of a pair of electrodes of the liquid crystal element 3432 is set in accordance with the specifications of the pixel 3130C as appropriate. The alignment state of a liquid crystal in the liquid crystal element 3432 depends on data written to a node 3436. A common potential may be applied to the one of the pair of electrodes of the liquid crystal element 3432 included in each of the plurality of pixels 3130C. The potential of the capacitor line CL is set in accordance with the specifications of the pixel 3130C as appropriate. The capacitor 3233 functions as a storage capacitor for holding data written to the node 3436.

As examples of a mode of the liquid crystal element 3432, the following modes can be given: a TN mode, an STN mode, a VA mode, an axially symmetric aligned micro-cell (ASM) mode, an optically compensated birefringence (OCB) mode, a ferroelectric liquid crystal (FLC) mode, an antiferroelectric liquid crystal (AFLC) mode, an MVA mode, a patterned vertical alignment (PVA) mode, an IPS mode, an FFS mode, and a transverse bend alignment (TBA) mode. Other examples include an electrically controlled birefringence (ECB) mode, a polymer-dispersed liquid crystal (PDLC) mode, a polymer network liquid crystal (PNLC) mode, and a guest-host mode. Note that various modes can be used without being limited thereto.

Figure 23A:
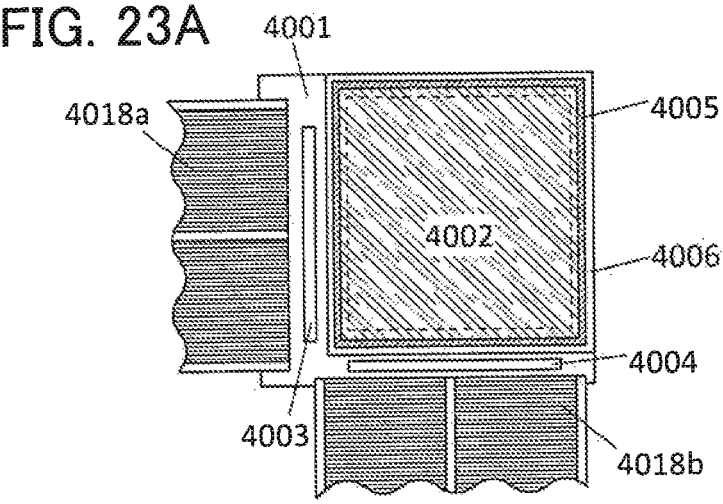
FIGS. 23A to 23C illustrate structure examples of a display panel.

The device structure of the display panel will be described with reference to FIGS. 23A to 23C. In FIG. 23A, a sealant 4005 is provided so as to surround a pixel portion 4002 provided over a substrate 4001, and the pixel portion 4002 is sealed with a substrate 4006. In FIG. 23A, a signal line driver 4003 and a scan line driver 4004 are mounted in a region different from the region surrounded by the sealant 4005 over the substrate 4001. The signal line driver 4003 is formed using a single crystal semiconductor or a polycrystalline semiconductor over another substrate. The same applies to the scan line driver 4004. Various signals and potentials are supplied to the signal line driver 4003, the scan line driver 4004, and the pixel portion 4002 through flexible printed circuits (FPCs) 4018a and 4018b.

Figure 23B:
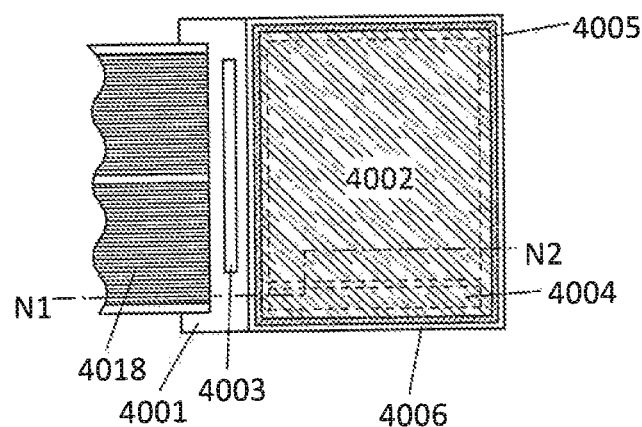
Figure 23C:
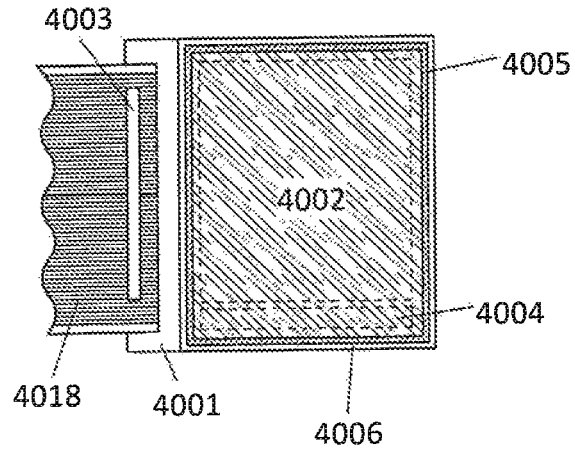

In FIGS. 23B and 23C, the sealant 4005 is provided so as to surround the pixel portion 4002 and the scan line driver 4004 that are provided over the substrate 4001. The substrate 4006 is provided over the pixel portion 4002 and the scan line driver 4004. Hence, the pixel portion 4002 and the scan line driver 4004 are sealed together with the display element by the substrate 4001, the sealant 4005, and the substrate 4006. Furthermore, in FIGS. 23B and 23C, the signal line driver 4003 is mounted in a region that is different from the region surrounded by the sealant 4005 over the substrate 4001. In FIGS. 23B and 23C, various signals and potentials are supplied to the signal line driver 4003, the scan line driver 4004, and the pixel portion 4002 through an FPC 4018.

Although FIGS. 23B and 23C each illustrate an example in which the signal line driver 4003 is formed separately and mounted on the substrate 4001, one embodiment of the present invention is not limited to this structure. The scan line driver may be separately formed and then mounted, or only part of the signal line driver or only part of the scan line driver may be separately formed and then mounted.

The connection method of a separately formed driver is not particularly limited; wire bonding, a chip on glass (COG), a tape carrier package (TCP), a chip on film (COF), or the like can be used. FIG. 23A illustrates an example in which the signal line driver 4003 and the scan line driver 4004 are mounted by a COG. FIG. 23B illustrates an example in which the signal line driver 4003 is mounted by a COG. FIG. 23C illustrates an example in which the signal line driver 4003 is mounted by a TCP. In some cases, the display device encompasses a panel in which a display element is sealed, and a module in which an IC or the like including a controller is mounted on the panel. The pixel portion and the scan line driver provided over the substrate 4001 include a plurality of transistors to which the transistor that is described in the above embodiment can be applied.

FIGS. 24A and 24B correspond to cross-sectional views taken along chain line N1-N2 in FIG. 23B. FIG. 24A illustrates a display panel 4000A of a liquid crystal display device, and FIG. 24B illustrates a display panel 4000B of a self-luminous display device.

The display panel 4000A has an electrode 4015, and the electrode 4015 is electrically connected to a terminal included in the FPC 4018 through an anisotropic conductive layer 4019. The electrode 4015 is electrically connected to a wiring 4014 in an opening formed in insulating layers 4112, 4111, and 4110. The display panel 4000A includes transistors 4010 and 4011 and a capacitor 4020. The capacitor 4020 includes a region where part of a source electrode or part of a drain electrode of the transistor 4010 overlaps with an electrode 4021 with an insulating layer 4103 positioned therebetween. The electrode 4021 is formed using the same conductive layer as an electrode 4017. The electrode 4015 is formed of the same conductive layer as a first electrode layer 4030, and the wiring 4014 is formed of the same conductive layer as source and drain electrodes of transistors 4010 and 4011. The same applies to the display panel 4000B.

The pixel portion 4002 and the scan line driver 4004 provided over the substrate 4001 include a plurality of transistors. In FIGS. 24A and 24B, the transistor 4010 included in the pixel portion 4002 and the transistor 4011 included in the scan line driver 4004 are illustrated as an example. The insulating layers 4112, 4111, and 4110 are provided over the transistors 4010 and 4011 in FIG. 24A, and a bank 4510 is further provided over the insulating layer 4112 in FIG. 24B.

In general, the capacitance of the capacitor provided in a pixel is set in consideration of leakage current or the like of transistors provided in the pixel so that charge can be held for a predetermined period. The capacitance of the capacitor may be set considering off-state current of the transistor or the like. For example, when an OS transistor is used for a pixel portion of a liquid crystal display device, the capacitance of the capacitor can be one-third or smaller, furthermore, one-fifth or smaller of liquid crystal capacitance. Using an OS transistor can omit the formation of a capacitor.

In FIG. 24A, a liquid crystal element 4013 includes the first electrode layer 4030, a second electrode layer 4031, and a liquid crystal layer 4008. Insulating layers 4032 and 4033 functioning as alignment films are provided so that the liquid crystal layer 4008 is sandwiched therebetween. The second electrode layer 4031 is provided on the substrate 4006 side, and the first electrode layer 4030 and the second electrode layer 4031 overlap with each other with the liquid crystal layer 4008 positioned therebetween.

A spacer 4035 is a columnar spacer obtained by selective etching of an insulating layer and is provided in order to control a distance between the first electrode layer 4030 and the second electrode layer 4031 (a cell gap). A spherical spacer may alternatively be used.

In the case where a liquid crystal element is used as the display element, a thermotropic liquid crystal, a low-molecular liquid crystal, a high-molecular liquid crystal, a polymer-dispersed liquid crystal, a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on a condition.

Alternatively, liquid crystal exhibiting a blue phase for which an alignment film is unnecessary may be used. A blue phase is a liquid crystal phase which is generated just before a cholesteric phase changes into an isotropic phase while the temperature of cholesteric liquid crystal is increased. Since the blue phase appears only in a narrow temperature range, a liquid crystal composition in which 5 wt. % or more of a chiral material is mixed is used for the liquid crystal layer in order to widen the temperature range. The liquid crystal composition that includes the liquid crystal exhibiting a blue phase and a chiral material has a short response time of 1 msec or less, and has optical isotropy, which makes the alignment process unnecessary and the viewing angle dependence small. In addition, since an alignment film does not need to be provided, rubbing treatment is unnecessary. Therefore, electrostatic discharge damage caused by the rubbing treatment can be prevented and thus defects and damage of the liquid crystal display device in the manufacturing process can be reduced. Accordingly, productivity of the liquid crystal display device can be increased.

Furthermore, it is possible to use a method called domain multiplication or multi-domain design in which a pixel is divided into some regions (subpixels) and molecules are aligned in different directions in their respective regions.

The inherent resistance of the liquid crystal material is greater than or equal to $1\times10^9$ Ω·cm, preferably greater than or equal to $1\times10^{11}$ Ω·cm and further preferably greater than or equal to $1\times10^{12}$ Ω·cm. The inherent resistance in this specification is measured at 20° C.

In the OS transistor used in this embodiment, the current in an off state (the off-state current) can be made small. Accordingly, an electrical signal such as an image signal can be held for a longer period, and a writing interval can be set longer in an on state. Accordingly, frequency of refresh operation can be reduced, which leads to an effect of suppressing power consumption.

In the OS transistor, relatively high field-effect mobility can be obtained, whereby high-speed operation is possible. Consequently, when the above transistor is used in a pixel portion of a display device, high-quality images can be obtained. Since a driver portion and the pixel portion can be formed over one substrate with the use of the above transistor, the number of components of the display device can be reduced.

In the display device, a black matrix (a light-blocking layer), an optical member (an optical substrate) such as a polarizing member, a retardation member, or an anti-reflection member, and the like may be provided as appropriate. For example, circular polarization may be applied with a polarizing substrate and a retardation substrate. In addition, a backlight, a side light, or the like may be used as a light source.

As the display element included in the display device, a light-emitting element utilizing electroluminescence (also referred to as an "EL element") can be used. An EL element includes a layer containing a light-emitting compound (also referred to as an "EL layer") is sandwiched between a pair of electrodes. By generating a potential difference between the pair of electrodes that is greater than the threshold voltage of the EL element, holes are injected to the EL layer from the anode side and electrons are injected to the EL layer from the cathode side. The injected electrons and holes are recombined in the EL layer, so that a light-emitting substance contained in the EL layer emits light.

EL elements are classified depending on whether a light-emitting material is an organic compound or an inorganic compound. In general, the former is referred to as an organic EL element, and the latter is referred to as an inorganic EL element.

In an organic EL element, by voltage application, electrons are injected form one electrode to the EL layer and holes are injected from the other electrode to the EL layer. The carriers (i.e., electrons and holes) are recombined; thus, the light-emitting organic compound is excited. The light-emitting organic compound returns to a ground state from the excited state, thereby emitting light. Based on such a mechanism, such a light-emitting element is referred to as a current-excitation type light-emitting element.

In addition to the light-emitting compound, the EL layer may further include any of a substance with a high hole-injection property, a substance with a high hole-transport property, a hole-blocking material, a substance with a high electron-transport property, a substance with a high electron-injection property, a substance with a bipolar property (a substance with a high electron- and hole-transport property), and the like.

The EL layer can be formed by an evaporation method (including a vacuum evaporation method), a transfer method, a printing method, an inkjet method, a coating method, or the like.

Inorganic EL elements are classified according to their element structures into a dispersion-type inorganic EL element and a thin-film inorganic EL element. The dispersion-type inorganic EL element has a light-emitting layer where particles of a light-emitting material are dispersed in a binder, and its light emission mechanism is donor-acceptor recombination type light emission that utilizes a donor level and an acceptor level. In contrast, the thin-film inorganic EL element has a structure where a light-emitting layer is sandwiched between dielectric layers, which is further sandwiched between electrodes, and its light emission mechanism is localized type light emission that utilizes inner-shell electron transition of metal ions. An example in which an organic EL element is used as the light-emitting element is described here.

In order to extract light emitted from the light-emitting element, at least one of the pair of electrodes is transparent. The transistor and the light-emitting element are formed over a substrate. The light-emitting element can have a top emission structure in which light emission is extracted through the surface opposite to the substrate; a bottom emission structure in which light emission is extracted through the surface on the substrate side; or a dual emission structure in which light emission is extracted through the side opposite to the substrate and the substrate side.

In FIG. 24B, a light-emitting element 4513 is electrically connected to the transistor 4010 in the pixel portion 4002. The structure of the light-emitting element 4513 is not limited to a stacked-layer structure including the first electrode layer 4030, a light-emitting layer 4511, and the second electrode layer 4031. The structure of the light-emitting element 4513 can be changed as appropriate depending on the direction in which light is extracted from the light-emitting element 4513, or the like.

The bank 4510 can be formed using an organic insulating material or an inorganic insulating material. It is particularly preferable that the bank 4510 be formed using a photosensitive resin material to have an opening over the first electrode layer 4030 so that a side surface of the opening slopes with continuous curvature.

The light-emitting layer 4511 may be formed using either a single layer or a plurality of layers stacked.

A protective layer may be formed over the second electrode layer 4031 and the bank 4510 in order to prevent entry of oxygen, hydrogen, moisture, carbon dioxide, or the like into the light-emitting element 4513. For the protective layer, silicon nitride, silicon nitride oxide, aluminum oxide, aluminum nitride, aluminum oxynitride, aluminum nitride oxide, diamond like carbon (DLC), or the like can be used. In addition, a filler 4514 is provided for sealing in a space that is confined by the substrate 4001, the substrate 4006, and the sealant 4005. It is preferable that the panel be packaged (sealed) with a protective film (such as a laminate film or an ultraviolet curable resin film) or a cover member with high air-tightness and little degasification so that the panel is not exposed to the outside air, in this manner.

As the filler 4514, an ultraviolet curable resin or a thermosetting resin can be used as well as an inert gas such as nitrogen or argon; for example, polyvinyl chloride (PVC), an acrylic resin, polyimide, an epoxy resin, a silicone resin, polyvinyl butyral (PVB), ethylene vinyl acetate (EVA), or the like can be used. A drying agent may be contained in the filler 4514.

For example, a glass material such as a glass frit, or a resin material such as a two-component-mixture-type resin which is curable at room temperature, a light curable resin, and a thermosetting resin can be used for the sealant 4005. A drying agent may be contained in the sealant 4005.

In addition, if necessary, an optical film, such as a polarizing plate, a circularly polarizing plate (including an elliptically polarizing plate), a retardation plate (a quarter-wave plate or a half-wave plate), or a color filter, may be provided as appropriate on a light-emission surface of the light-emitting element. Furthermore, the polarizing plate or the circularly polarizing plate may be provided with an anti-reflection film. For example, anti-glare treatment by which reflected light can be diffused by unevenness of the surface so as to reduce the glare can be performed.

When the light-emitting element has a microcavity structure, light with high color purity can be extracted. Furthermore, when a microcavity structure and a color filter are used in combination, the glare can be reduced and visibility of a display image can be increased.

The first electrode layer and the second electrode layer (each of which is also called a pixel electrode layer, a common electrode layer, a counter electrode layer, or the like) for applying voltage to the display element each have either a light-transmitting property or a light-reflecting property, which depends on the direction in which light is extracted, the position where the electrode layer is provided, the pattern structure of the electrode layer, and the like.

The first electrode layer 4030 and the second electrode layer 4031 can be formed using a light-transmitting conductive material such as indium oxide containing tungsten oxide, indium zinc oxide containing tungsten oxide, indium oxide containing titanium oxide, indium tin oxide, indium tin oxide containing titanium oxide, indium zinc oxide, or indium tin oxide to which silicon oxide is added.

The first electrode layer 4030 and the second electrode layer 4031 each can also be formed using one or more kinds of materials selected from a metal such as tungsten (W), molybdenum (Mo), zirconium (Zr), hafnium (Hf), vanadium (V), niobium (Nb), tantalum (Ta), chromium (Cr), cobalt (Co), nickel (Ni), titanium (Ti), platinum (Pt), aluminum (Al), copper (Cu), or silver (Ag); an alloy thereof; and a nitride thereof.

A conductive composition containing a conductive high molecule (also called a conductive polymer) can also be used for any of the first electrode layer 4030 and the second electrode layer 4031. As the conductive high molecule, a so-called π-electron conjugated conductive polymer can be used. For example, polyaniline or a derivative thereof, polypyrrole or a derivative thereof, polythiophene or a derivative thereof, a copolymer of two or more of aniline, pyrrole, and thiophene or a derivative thereof can be given.

Figures 25A, 25B:
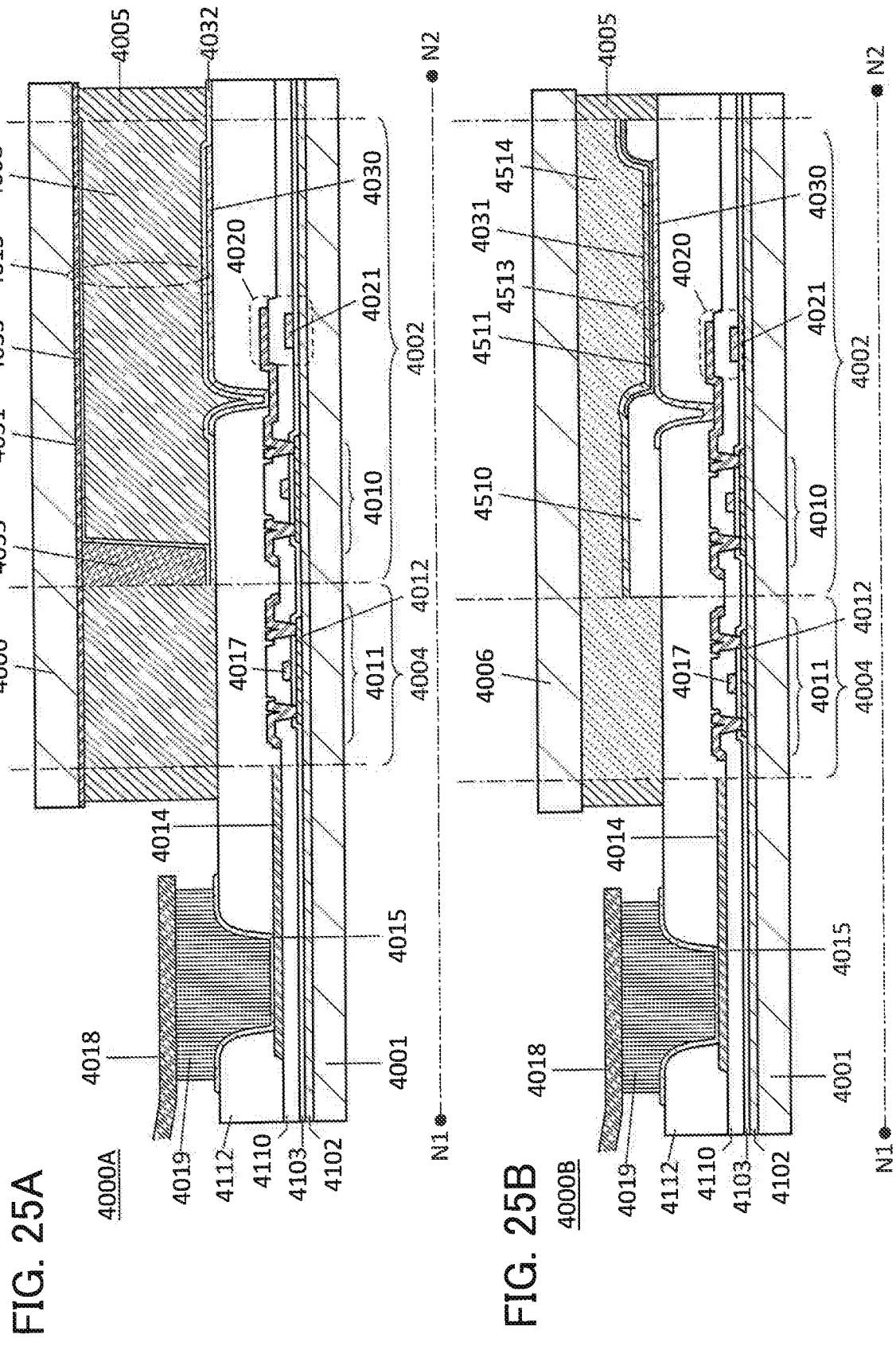
FIGS. 25A and 25B are cross-sectional views illustrating structure examples of a display panel.

FIG. 25A is a cross-sectional view in the case where top-gate transistors are provided as the transistors 4011 and 4010 in FIG. 24A. Similarly, FIG. 25B is a cross-sectional view in the case where top-gate transistors are provided as the transistors 4011 and 4010 in FIG. 24B.

In each of the transistors 4010 and 4011, the electrode 4017 functions as a gate electrode. The wiring 4014 functions as a source or drain electrode. The insulating layer 4103 functions as a gate insulating film. The transistors 4010 and 4011 each can include a semiconductor layer 4012. For the semiconductor layer 4012, crystalline silicon, polycrystalline silicon, amorphous silicon, an oxide semiconductor, an organic semiconductor, or the like may be used. Impurities may be introduced to the semiconductor layer 4012, if necessary, to increase conductivity of the semiconductor layer 4012 or control the threshold value of the transistor.

<<Electronic Device>>

Examples of electronic devices provided with the above-described display portion include a TV device, a monitor of a computer or the like, a digital camera, a digital video camera, a digital photo frame, a mobile phone (also referred to as a cellular phone or a mobile phone device), a portable game machine, a portable information terminal, an audio reproducing device, and a large game machine such as a pinball machine. Particularly when the electronic devices are flexible, they can be embedded in an inside/outside wall of a house or a building or an interior/exterior of a car along the curved surfaces. FIGS. 26A to 26F are structure examples of the electronic devices.

Figure 26A:
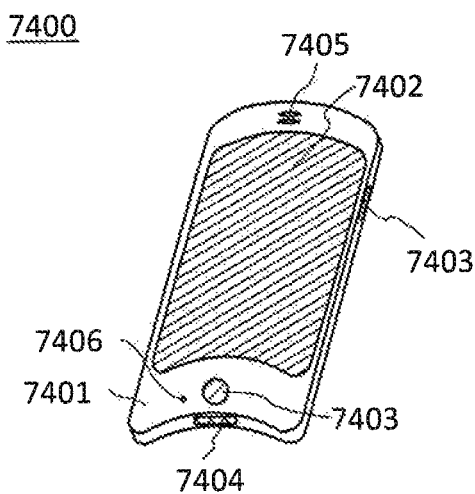
FIGS. 26A to 26F are schematic views each illustrating a structure example of an electronic device.

A mobile phone 7400 illustrated in FIG. 26A includes a display portion 7402 incorporated in a housing 7401, operation buttons 7403, an external connection port 7404, a speaker 7405, a microphone 7406, and the like. When the display portion 7402 of the mobile phone 7400 is touched with a finger or the like, data can be input to the mobile phone 7400. Further, operations such as making a call and inputting a letter can be performed by touch on the display portion 7402 with a finger or the like. With the operation buttons 7403, power ON or OFF can be switched. In addition, types of images displayed on the display portion 7402 can be switched; switching images from a mail creation screen to a main menu screen, for example.

Figure 26B:
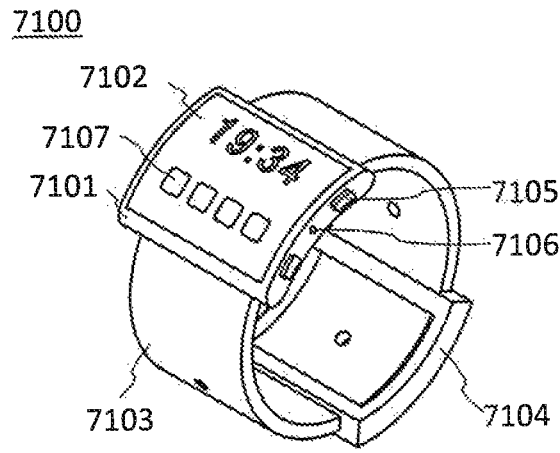

FIG. 26B illustrates an example of a wrist-watch-type portable information terminal. A portable information terminal 7100 illustrated in FIG. 26B includes a housing 7101, a display portion 7102, a band 7103, a buckle 7104, an operation button 7105, an input/output terminal 7106, and the like. The portable information terminal 7100 is capable of executing a variety of applications such as mobile phone calls, e-mailing, reading and editing texts, music reproduction, Internet communication, and a computer game. The display surface of the display portion 7102 is curved, and images can be displayed on the curved display surface. Furthermore, the display portion 7102 includes a touch sensor, and operation can be performed by touching the screen with a finger, a stylus, or the like. For example, by touching an icon 7107 displayed on the display portion 7102, an application can be started.

With the operation button 7105, a variety of functions such as time setting, power on/off, on/off control of wireless communication, setting and cancellation of silent mode, and setting and cancellation of power saving mode can be performed. The functions of the operation button 7105 can be set freely by the operating system incorporated in the portable information terminal 7100, for example. The portable information terminal 7100 can employ near field communication, which is a communication method based on an existing communication standard. In that case, for example, mutual communication between the portable information terminal 7100 and a headset capable of wireless communication can be performed, and thus hands-free calling is possible. Moreover, the portable information terminal 7100 includes the input/output terminal 7106, and data can be directly transmitted to and received from another information terminal via a connector. Charging through the input/output terminal 7106 is possible. Note that the charging operation may be performed by wireless power feeding without using the input/output terminal 7106.

Figure 26C:
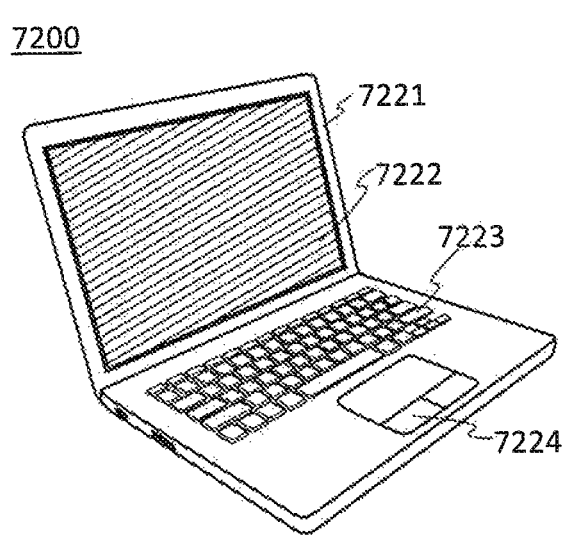

FIG. 26C illustrates a laptop personal computer (PC). A PC 7200 illustrated in FIG. 26C includes a housing 7221, a display portion 7222, a keyboard 7223, a pointing device 7224, and the like.

Figure 26D:
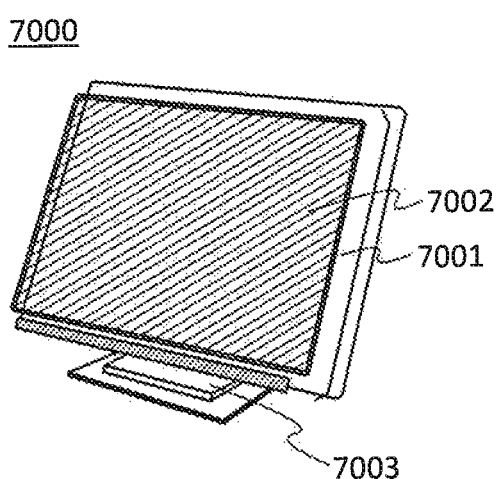

FIG. 26D illustrates a stationary display device. A display device 7000 illustrated in FIG. 26D includes a housing 7001, a display portion 7002, a support base 7003, and the like.

Figure 26E:
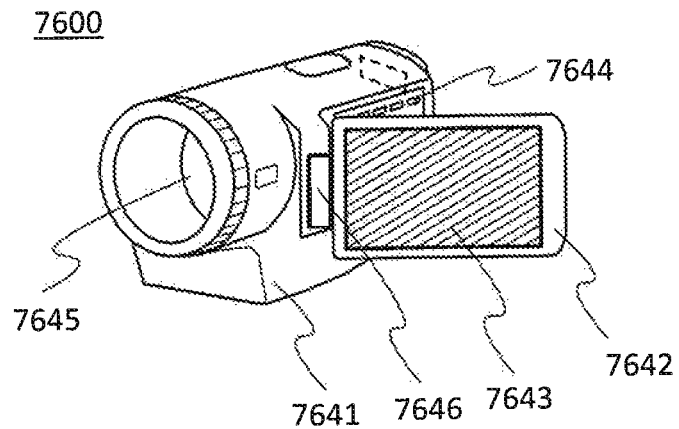

FIG. 26E illustrates a video camera 7600, which includes a first housing 7641, a second housing 7642, a display portion 7643, operation keys 7644, a lens 7645, a joint 7646, and the like.

Figure 26F:
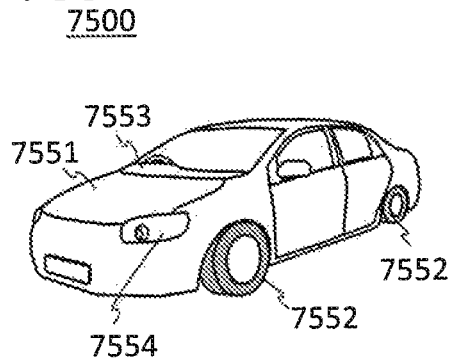

FIG. 26F illustrates a car 7500, which includes a car body 7551, wheels 7552, a dashboard 7553, lights 7554, and the like.

In the case where the number of pixels in the display portion of the above-described electronic device is as high as, for example, 4K or 8K, it is preferable that the above-described electronic device includes the receiver of one embodiment of the present invention. When the above-described electronic device includes the receiver of one embodiment of the present invention, it is possible to receive and display an image at high speed and with low power consumption.

Embodiment 3

In this embodiment, a device structure of an OS transistor and the like will be described.

<<Structure Example 1 of Transistor>>

Figure 27A:
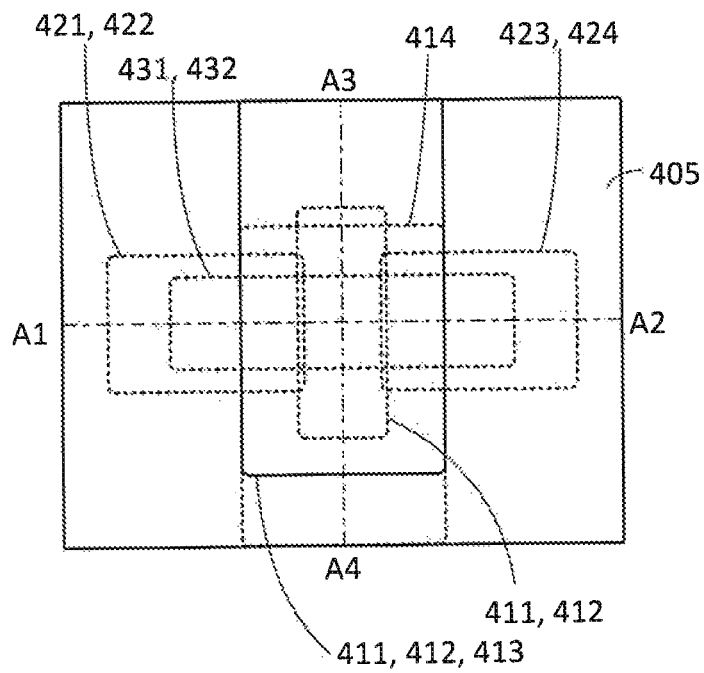
FIG. 27A and FIGS. 27B and 27C are a top view and cross-sectional views, respectively, each illustrating a structure example of a transistor.
Figure 27B:
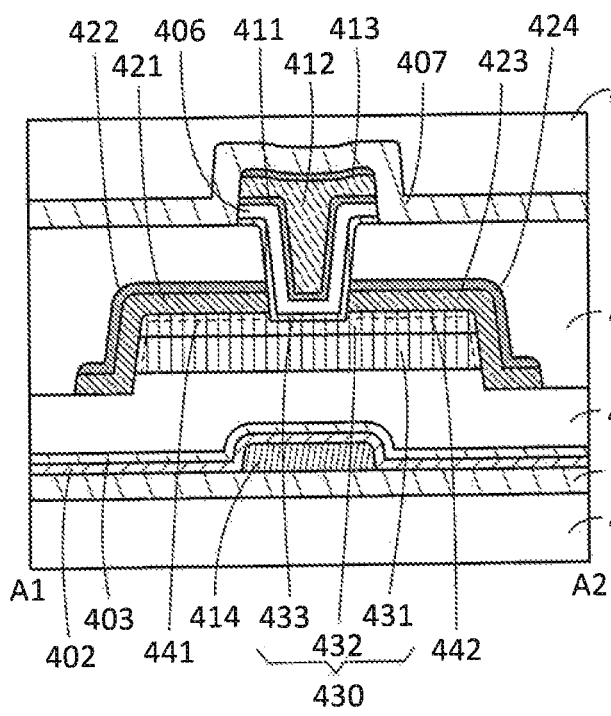
Figure 27C:
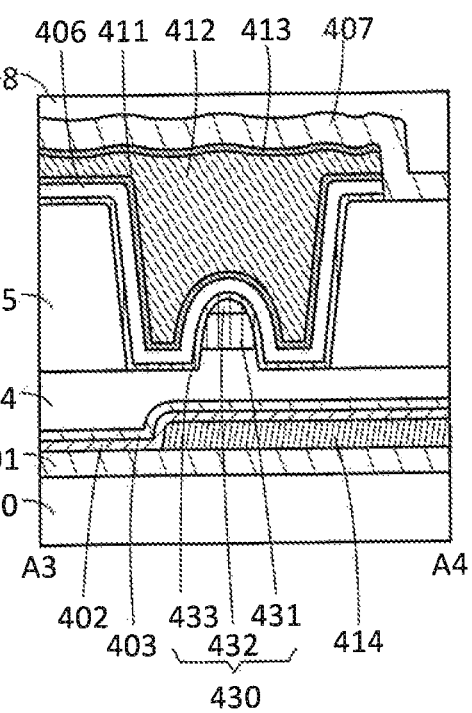

FIG. 27A is a top view of a transistor 400a. FIG. 27B is a cross-sectional view taken along line A1-A2 in FIG. 27A, and FIG. 27C is a cross-sectional view taken along line A3-A4 in FIG. 27A. Note that the directions of the line A1-A2 and the line A3-A4 are sometimes referred to as a channel length direction of the transistor 400a and a channel width direction of the transistor 400a, respectively. Note that for simplification of the drawing, some components are not illustrated in FIG. 27A. The same applies to FIG. 28A and the like.

The transistor 400a includes a substrate 450, an insulating film 401 over the substrate 450, a conductive film 414 over the insulating film 401, an insulating film 402 covering the conductive film 414, an insulating film 403 over the insulating film 402, an insulating film 404 over the insulating film 403, a metal oxide 431 and a metal oxide 432 which are stacked in this order over the insulating film 404, a conductive film 421 in contact with top and side surfaces of the metal oxide 432, a conductive film 423 also in contact with the top and side surfaces of the metal oxide 432, a conductive film 422 over the conductive film 421, a conductive film 424 over the conductive film 423, an insulating film 405 over the conductive films 422 and 424, a metal oxide 433 in contact with the metal oxides 431 and 432, the conductive films 421 to 424, and the insulating film 405, an insulating film 406 over the metal oxide 433, a conductive film 411 over the insulating film 406, a conductive film 412 over the conductive film 411, a conductive film 413 over the conductive film 412, an insulating film 407 covering the conductive film 413, and an insulating film 408 over the insulating film 407. Note that the metal oxides 431 to 433 are collectively referred to as a metal oxide 430.

The metal oxide 432 is a semiconductor and functions as a channel of the transistor 400a. Furthermore, the metal oxides 431 and 432 include a region 441 and a region 442. The region 441 is formed in the vicinity of a region where the conductive film 421 is in contact with the metal oxides 431 and 432. The region 442 is formed in the vicinity of a region where the conductive film 423 is in contact with the metal oxides 431 and 432. The regions 441 and 442 function as low-resistance regions. The region 441 contributes to a decrease in the contact resistance between the conductive film 421 and the metal oxides 431 and 432. The region 442 also contributes to a decrease in the contact resistance between the conductive film 423 and the metal oxides 431 and 432.

The conductive films 421 and 422 function as one of source and drain electrodes of the transistor 400a. The conductive films 423 and 424 function as the other of the source and drain electrodes of the transistor 400a. The conductive film 422 is configured to allow less oxygen to pass therethrough than the conductive film 421. It is thus possible to prevent a decrease in the conductivity of the conductive film 421 due to oxidation. The conductive film 424 is also configured to allow less oxygen to pass therethrough than the conductive film 423. It is thus possible to prevent a decrease in the conductivity of the conductive film 423 due to oxidation.

The conductive films 411 to 413 function as a first gate electrode of the transistor 400a. The conductive films 411 and 413 are configured to allow less oxygen to pass therethrough than the conductive film 412. It is thus possible to prevent a decrease in the conductivity of the conductive film 412 due to oxidation. The insulating film 406 functions as a first gate insulating film of the transistor 400a. The conductive film 414 functions as a second gate electrode of the transistor 400a. The potential applied to the conductive films 411 to 413 may be the same as or different from that applied to the conductive film 414. The conductive film 414 may be omitted in some cases.

The insulating films 401 to 404 function as a base insulating film of the transistor 400a. The insulating films 402 to 404 also function as a second gate insulating film of the transistor 400a. The insulating films 405 to 408 function as a protective insulating film or an interlayer insulating film of the transistor 400a.

As illustrated in FIG. 27C, the side surface of the metal oxide 432 is surrounded by the conductive film 411. With this structure, the metal oxide 432 can be electrically surrounded by an electric field of the conductive film 411. Such a structure of a transistor in which a semiconductor is electrically surrounded by an electric field of a gate electrode is referred to as a surrounded channel (s-channel) structure. Therefore, a channel is formed in the entire metal oxide 432 (bulk). In the s-channel structure, a large amount of current can be flow between a source and a drain of a transistor, increasing the on-state current of the transistor. The s-channel structure, because of its high on-state current, is suitable for a semiconductor device such as large-scale integration (LSI) which requires a miniaturized transistor. A semiconductor device including the miniaturized transistor can have a high integration degree and a high density.

In the transistor 400a, a region functioning as a gate electrode is formed so as to fill an opening formed in the insulating film 405 and the like, that is, in a self-aligned manner.

As illustrated in FIG. 27B, the conductive films 411 and 422 have a region where they overlap with each other with the insulating film positioned therebetween. The conductive films 411 and 423 also have a region where they overlap with each other with the insulating film positioned therebetween. These regions function as the parasitic capacitance caused between the gate electrode and the source or drain electrode and might decrease the operation speed of the transistor 400a. This parasitic capacitance can be reduced by providing the insulating film 405 in the transistor 400a. The insulating film 405 preferably contains a material with a low relative dielectric constant.

Figure 28A:
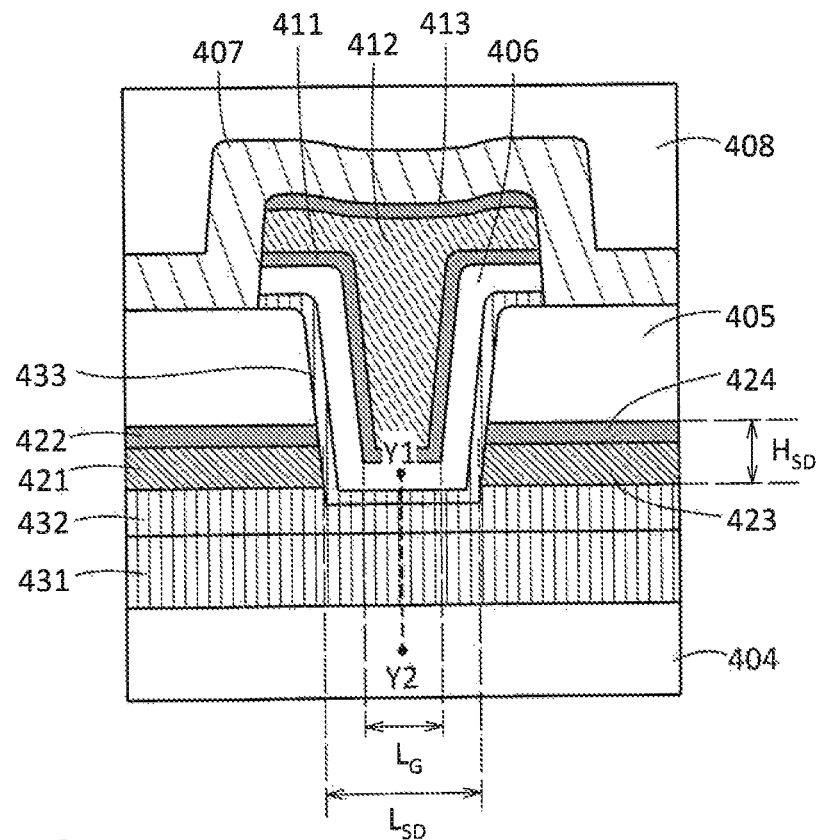
FIG. 28A is a partial enlarged view of the transistor.

FIG. 28A is an enlarged view of the center of the transistor 400a. In FIG. 28A, a width $L_G$ denotes the length of the bottom surface of the conductive film 411, which faces and lies parallel to the top surface of the metal oxide 432 with the insulating film 406 and the metal oxide 433 positioned therebetween. The width $L_G$ is the line width of the gate electrode. In FIG. 28A, a width $L_{SD}$ denotes the length between the conductive films 421 and 423, i.e., the length between the source and drain electrodes.

The width $L_{SD}$ is generally determined by the minimum feature size. As illustrated in FIG. 28A, the width $L_G$ is narrower than the width $L_{SD}$. This means that in the transistor 400a, the line width of the gate electrode can be made narrower than the minimum feature size; specifically, the width $L_G$ can be greater than or equal to 5 nm and less than or equal to 60 nm, preferably greater than or equal to 5 nm and less than or equal to 30 nm.

In FIG. 28A, a height $H_{SD}$ denotes the total thickness of the conductive films 421 and 422, or the total thickness of the conductive films 423 and 424. The thickness of the insulating film 406 is preferably less than or equal to the height $H_{SD}$, in which case the electric field of the gate electrode can be applied to the entire channel formation region. The thickness of the insulating film 406 is less than or equal to 30 nm, preferably less than or equal to 10 nm.

The parasitic capacitance between the conductive films 422 and 411 and the parasitic capacitance between the conductive films 424 and 411 are inversely proportional to the thickness of the insulating film 405. For example, the thickness of the insulating film 405 is preferably three times or more, further preferably five times or more, the thickness of the insulating film 406, in which case the parasitic capacitance is negligibly small. As a result, the transistor 400a can operate at high frequencies. Components of the transistor 400a will be described below.

<Metal Oxide Layer>

The transistor 400a preferably has a low current (off-state current) flowing between a source and a drain in the non-conduction state. Examples of the transistor with a low off-state current include a transistor including an oxide semiconductor in a channel formation region.

The metal oxide 432 is an oxide semiconductor containing indium (In), for example. The metal oxide 432 can have high carrier mobility (electron mobility) by containing indium, for example. The metal oxide 432 preferably contains an element M. The element M is preferably aluminum (Al), gallium (Ga), yttrium (Y), tin (Sn), or the like. Other elements that can be used as the element M are boron (B), silicon (Si), titanium (Ti), iron (Fe), nickel (Ni), germanium (Ge), zirconium (Zr), molybdenum (Mo), lanthanum (La), cerium (Ce), neodymium (Nd), hafnium (Hf), tantalum (Ta), tungsten (W), and the like. Note that two or more of these elements may be used in combination as the element M The element M is an element having high bonding energy with oxygen, for example. The element M is an element whose bonding energy with oxygen is higher than that of indium, for example. The element M is an element that can increase the energy gap of the metal oxide, for example. Furthermore, the metal oxide 432 preferably contains zinc (Zn). When containing zinc, the metal oxide is easily crystallized in some cases.

Note that the metal oxide 432 is not limited to the oxide semiconductor containing indium. The metal oxide 432 may be an oxide semiconductor that does not contain indium and contains at least one of zinc, gallium, and tin (e.g., a zinc tin oxide or a gallium tin oxide).

For the metal oxide 432, an oxide semiconductor with a wide energy gap is used, for example. The energy gap of the metal oxide 432 is, for example, greater than or equal to 2.5 eV and less than or equal to 4.2 eV, preferably greater than or equal to 2.8 eV and less than or equal to 3.8 eV and further preferably greater than or equal to 3 eV and less than or equal to 3.5 eV. A CAAC-OS film which is described later is preferably used for the metal oxide 432.

The metal oxides 431 and 433 include, for example, one or more or two or more elements other than oxygen included in the metal oxide 432. Since the metal oxides 431 and 433 include one or more or two or more elements other than oxygen included in the metal oxide 432, an interface state is less likely to be formed at an interface between the metal oxides 431 and 432 and an interface between the metal oxides 432 and 433.

In the case of using an In-M-Zn oxide as the metal oxide 431, when the total proportion of In and M is assumed to be 100 atomic %, the proportions of In and Mare preferably set to be lower than 50 atomic % and higher than 50 atomic %, respectively, and further preferably lower than 25 atomic % and higher than 75 atomic %, respectively. When the metal oxide 431 is formed by a sputtering method, a sputtering target with the above composition is preferably used. For example, In:M:Zn is preferably 1:3:2 or 1:3:4.

In the case of using an In-M-Zn oxide as the metal oxide 432, when the total proportion of In and M is assumed to be 100 atomic %, the proportions of In and Mare preferably set to be higher than 25 atomic % and lower than 75 atomic %, respectively, and further preferably higher than 34 atomic % and lower than 66 atomic %, respectively. When the metal oxide 432 is formed by a sputtering method, a sputtering target with the above composition is preferably used. For example, In:M:Zn is preferably 1:1:1, 1:1:1.2, 2:1:3, 3:1:2, or 4:2:4.1. In particular, when a sputtering target with an atomic ratio of In to Ga and Zn of 4:2:4.1 is used, the atomic ratio of In to Ga and Zn in the metal oxide 432 may be 4:2:3 or in the neighborhood of 4:2:3.

In the case of using an In-M-Zn oxide as the metal oxide 433, when the total proportion of In and M is assumed to be 100 atomic %, the proportions of In and Mare preferably set to be lower than 50 atomic % and higher than 50 atomic %, respectively, and further preferably lower than 25 atomic % and higher than 75 atomic %, respectively. For example, In:M:Zn is preferably 1:3:2 or 1:3:4. The metal oxide 433 may be a metal oxide that is the same type as that of the metal oxide 431.

The metal oxide 431 or the metal oxide 433 does not necessarily contain indium in some cases. For example, the metal oxide 431 or the metal oxide 433 may be gallium oxide.

<Energy Band Structure>

Figure 28B:
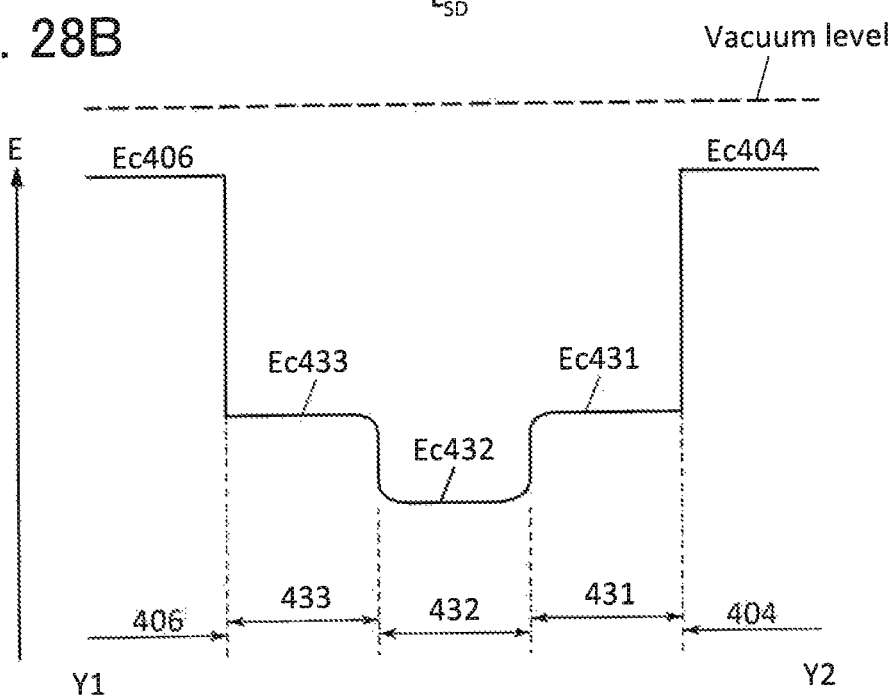
FIG. 28B is an energy band diagram of the transistor.

The function and effect of the metal oxide 430, which includes a stack of the metal oxides 431 to 433, are described with reference to FIG. 28B. FIG. 28B shows an energy band structure of a portion taken along line Y1-Y2 in FIG. 28A, that is, the energy band structure of a channel formation region of the transistor 400a and the vicinity thereof.

In FIG. 28B, Ec404, Ec431, Ec432, Ec433, and Ec406 indicate the energy at the bottom of the conduction band of the insulating film 404, the metal oxide 431, the metal oxide 432, the metal oxide 433, and the insulating film 406, respectively.

Here, a difference in energy between the vacuum level and the bottom of the conduction band (the difference is also referred to as an electron affinity) corresponds to a value obtained by subtracting an energy gap from a difference in energy between the vacuum level and the top of the valence band (the difference is also referred to as an ionization potential). Note that the energy gap can be measured using a spectroscopic ellipsometer. The energy difference between the vacuum level and the top of the valence band can be measured using an ultraviolet photoelectron spectroscopy (UPS) device.

Since the insulating films 404 and 406 are insulators, Ec406 and Ec404 are closer to the vacuum level (i.e., have a lower electron affinity) than Ec431, Ec432, and Ec433.

The metal oxide 432 is a metal oxide having a higher electron affinity than those of the metal oxides 431 and 433. For example, as the metal oxide 432, a metal oxide having an electron affinity higher than those of the metal oxides 431 and 433 by 0.07 eV or more and 1.3 eV or less, preferably 0.1 eV or more and 0.7 eV or less and further preferably 0.15 eV or more and 0.4 eV or less, is used. Note that the electron affinity is an energy gap between the vacuum level and the bottom of the conduction band.

Indium gallium oxide has a low electron affinity and a high oxygen-blocking property. Therefore, the metal oxide 433 preferably includes indium gallium oxide. The gallium atomic ratio [Ga/(In+Ga)] is, for example, higher than or equal to 70%, preferably higher than or equal to 80% and further preferably higher than or equal to 90%.

At this time, when gate voltage is applied, a channel is formed in the metal oxide 432 having the highest electron affinity among the metal oxides 431 to 433. At this time, electrons move mainly in the metal oxide 432, not in the metal oxides 431 and 433. Hence, the on-state current hardly varies even when the interface state density, which inhibits electron movement, is high at the interface between the metal oxide 431 and the insulating film 404 or at the interface between the metal oxide 433 and the insulating film 406. The metal oxides 431 and 433 function as an insulating film.

In some cases, there is a mixed region of the metal oxides 431 and 432 between the metal oxides 431 and 432. Furthermore, in some cases, there is a mixed region of the metal oxides 432 and 433 between the metal oxides 432 and 433. Because the mixed region has a low interface state density, a stack of the metal oxides 431 to 433 has a band structure where energy at each interface and in the vicinity of the interface is changed continuously (continuous junction).

As described above, the interface between the metal oxides 431 and 432 or the interface between the metal oxides 432 and 433 has a low interface state density. Hence, electron movement in the metal oxide 432 is less likely to be inhibited and the on-state current of the transistor can be increased.

Electron movement in the transistor is inhibited, for example, in the case where physical unevenness in a channel formation region is large. To increase the on-state current of the transistor, for example, root mean square (RMS) roughness with a measurement area of 1 μm×1 μm of a top surface or a bottom surface of the metal oxide 432 (a formation surface; here, the top surface of the metal oxide 431) is less than 1 nm, preferably less than 0.6 nm, further preferably less than 0.5 nm, and still further preferably less than 0.4 nm. The average surface roughness (Ra) with the measurement area of 1 μm×1 μm is less than 1 nm, preferably less than 0.6 nm, further preferably less than 0.5 nm, and still further preferably less than 0.4 nm. The maximum difference (P-V) with the measurement area of 1 μm×1 μm is less than 10 nm, preferably less than 9 nm, further preferably less than 8 nm, and still further preferably less than 7 nm. The RMS roughness, Ra, and P-V can be measured with, for example, a scanning probe microscope SPA-500 manufactured by SII Nano Technology Inc.

The electron movement is also inhibited in the case where the density of defect states is high in the channel formation region. For example, in the case where the metal oxide 432 contains oxygen vacancies (Vo), donor levels are formed by entry of hydrogen into sites of oxygen vacancies in some cases. A state in which hydrogen enters sites of oxygen vacancies is denoted by $V_{OH}$ in the following description in some cases. $V_{OH}$ is a factor of decreasing the on-state current of the transistor because $V_{OH}$ scatters electrons. Note that sites of oxygen vacancies become more stable by entry of oxygen than by entry of hydrogen. Thus, by decreasing oxygen vacancies in the metal oxide 432, the on-state current of the transistor can be increased in some cases.

For example, at a certain depth in the metal oxide 432 or in a certain region of the metal oxide 432, the concentration of hydrogen measured by secondary ion mass spectrometry (SIMS) is set to be higher than or equal to $1\times10^{16}$ atoms/cm$^3$ and lower than or equal to $2\times10^{20}$ atoms/cm$^3$, preferably higher than or equal to $1\times10^{16}$ atoms/cm$^3$ and lower than or equal to $5\times10^{19}$ atoms/cm$^3$, further preferably higher than or equal to $1\times10^{16}$ atoms/cm$^3$ and lower than or equal to $1\times10^{19}$ atoms/cm$^3$, and still further preferably higher than or equal to $1\times10^{16}$ atoms/cm$^3$ and lower than or equal to $5\times10^{18}$ atoms/cm$^3$.

To decrease oxygen vacancies in the metal oxide 432, for example, there is a method in which excess oxygen contained in the insulating film 404 is moved to the metal oxide 432 through the metal oxide 431. In that case, the metal oxide 431 is preferably a layer having an oxygen-transmitting property (a layer through which oxygen is transmitted).

Note that in the case where the transistor has an s-channel structure, a channel is formed in the entire metal oxide 432. Therefore, as the metal oxide 432 has larger thickness, a channel region becomes larger. In other words, the thicker the metal oxide 432 is, the larger the on-state current of the transistor is.

Moreover, the thickness of the metal oxide 433 is preferably as small as possible to increase the on-state current of the transistor. For example, the metal oxide 433 has a region with a thickness of less than 10 nm, preferably less than or equal to 5 nm and further preferably less than or equal to 3 nm. Meanwhile, the metal oxide 433 has a function of blocking entry of elements other than oxygen (such as hydrogen and silicon) included in the adjacent insulator into the metal oxide 432 where a channel is formed. Thus, the metal oxide 433 preferably has a certain thickness. For example, the metal oxide 433 may have a region with a thickness of greater than or equal to 0.3 nm, preferably greater than or equal to 1 nm and further preferably greater than or equal to 2 nm. The metal oxide 433 preferably has an oxygen blocking property to inhibit outward diffusion of oxygen released from the insulating film 404 and the like.

To improve reliability, preferably, the thickness of the metal oxide 431 is large and the thickness of the metal oxide 433 is small. For example, the metal oxide 431 has a region with a thickness of greater than or equal to 10 nm, preferably greater than or equal to 20 nm, further preferably greater than or equal to 40 nm, and still further preferably greater than or equal to 60 nm. An increase in the thickness of the metal oxide 431 can increase the distance from the interface between the adjacent insulator and the metal oxide 431 to the metal oxide 432 where a channel is formed. Note that the metal oxide 431 has a region with a thickness of, for example, less than or equal to 200 nm, preferably less than or equal to 120 nm and further preferably less than or equal to 80 nm, otherwise the productivity of the semiconductor device might be decreased.

For example, a region where the concentration of silicon by SIMS is higher than or equal to $1\times10^{16}$ atoms/cm$^3$ and lower than $1\times10^{19}$ atoms/cm$^3$ is provided between the metal oxides 432 and 431. The concentration of silicon is preferably higher than or equal to $1\times10^{16}$ atoms/cm$^3$ and lower than $5\times10^{18}$ atoms/cm$^3$ and further preferably higher than or equal to $1\times10^{16}$ atoms/cm$^3$ and lower than $2\times10^{18}$ atoms/cm$^3$. A region where the concentration of silicon by SIMS is higher than or equal to $1\times10^{16}$ atoms/cm$^3$ and lower than $1\times10^{19}$ atoms/cm$^3$ is provided between the metal oxides 432 and 433. The concentration of silicon is preferably higher than or equal to $1\times10^{16}$ atoms/cm$^3$ and lower than $5\times10^{18}$ atoms/cm$^3$ and further preferably higher than or equal to $1\times10^{16}$ atoms/cm$^3$ and lower than $2\times10^{18}$ atoms/cm$^3$.

It is preferable to reduce the concentration of hydrogen in the metal oxides 431 and 433 in order to reduce the concentration of hydrogen in the metal oxide 432. The metal oxides 431 and 433 each have a region where the concentration of hydrogen by SIMS is higher than or equal to $1\times10^{16}$ atoms/cm$^3$ and lower than or equal to $2\times10^{20}$ atoms/cm$^3$. The concentration of hydrogen is preferably higher than or equal to $1\times10^{16}$ atoms/cm$^3$ and lower than or equal to $5\times10^{19}$ atoms/cm$^3$, further preferably higher than or equal to $1\times10^{16}$ atoms/cm$^3$ and lower than or equal to $1\times10^{19}$ atoms/cm$^3$, and still further preferably higher than or equal to $1\times10^{16}$ atoms/cm$^3$ and lower than or equal to $5\times10^{18}$ atoms/cm$^3$. It is also preferable to reduce the concentration of nitrogen in the metal oxides 431 and 433 in order to reduce the concentration of nitrogen in the metal oxide 432. The metal oxides 431 and 433 each have a region where the concentration of nitrogen by SIMS is higher than or equal to $1\times10^{16}$ atoms/cm$^3$ and lower than $5\times10^{19}$ atoms/cm$^3$. The concentration of nitrogen is preferably higher than or equal to $1\times10^{16}$ atoms/cm$^3$ and lower than or equal to $5\times10^{18}$ atoms/cm$^3$, further preferably higher than or equal to $1\times10^{16}$ atoms/cm$^3$ and lower than or equal to $1\times10^{18}$ atoms/cm$^3$, and still further preferably higher than or equal to $1\times10^{16}$ atoms/cm$^3$ and lower than or equal to $5\times10^{17}$ atoms/cm$^3$.

The metal oxides 431 to 433 may be formed by a sputtering method, a chemical vapor deposition (CVD) method, a molecular beam epitaxy (MBE) method, a pulsed laser deposition (PLD) method, an atomic layer deposition (ALD) method, or the like.

After the metal oxides 431 and 432 are formed, first heat treatment is preferably performed. The first heat treatment can be performed at a temperature higher than or equal to 250° C. and lower than or equal to 650° C., preferably higher than or equal to 450° C. and lower than or equal to 600° C., and further preferably higher than or equal to 520° C. and lower than or equal to 570° C. The first heat treatment is performed in an inert gas atmosphere or an atmosphere containing an oxidizing gas at 10 ppm or more, 1% or more, or 10% or more. The first heat treatment may be performed under a reduced pressure. Alternatively, the first heat treatment may be performed in such a manner that heat treatment is performed in an inert gas atmosphere, and then another heat treatment is performed in an atmosphere containing an oxidizing gas at 10 ppm or more, 1% or more, or 10% or more in order to compensate desorbed oxygen. The crystallinity of the metal oxides 431 and 432 can be increased by the first heat treatment. Furthermore, impurities such as hydrogen and water can be removed by the first heat treatment.

The above three-layer structure is an example. For example, a two-layer structure without the metal oxide 431 or 433 may be employed. Alternatively, any one of the semiconductors given as examples of the metal oxides 431 to 433 may be provided over or below the metal oxide 431 or over or below the metal oxide 433, i.e., a four-layer structure may be employed. Further alternatively, an n-layer structure (n is an integer of 5 or more) in which any one of the semiconductors given as examples of the metal oxides 431 to 433 is provided at two or more of the following positions may be employed: over the metal oxide 431, below the metal oxide 431, over the metal oxide 433, and below the metal oxide 433.

<Substrate>

As the substrate 450, for example, an insulator substrate, a semiconductor substrate, or a conductor substrate may be used. Examples of the insulator substrate include a glass substrate, a quartz substrate, a sapphire substrate, a stabilized zirconia substrate (e.g., an yttria-stabilized zirconia substrate), and a resin substrate. Examples of the semiconductor substrate include a semiconductor substrate of silicon, germanium, or the like, and a compound semiconductor substrate of silicon carbide, silicon germanium, gallium arsenide, indium phosphide, zinc oxide, or gallium oxide. The semiconductor substrate may be a silicon on insulator (SOI) substrate in which an insulating region is provided in the above semiconductor substrate. Examples of the conductor substrate include a graphite substrate, a metal substrate, an alloy substrate, and a conductive resin substrate. A substrate including a metal nitride, a substrate including a metal oxide, or the like can also be used. An insulator substrate provided with a conductor or a semiconductor, a semiconductor substrate provided with a conductor or an insulator, a conductor substrate provided with a semiconductor or an insulator, or the like can be used. Alternatively, any of these substrates over which an element is provided may be used. Examples of the element provided over the substrate include a capacitor, a resistor, a switching element, a light-emitting element, and a memory element.

A flexible substrate may be used as the substrate 450. As a method for providing a transistor over a flexible substrate, there is a method in which a transistor is formed over a non-flexible substrate, and then the transistor is separated and transferred to the substrate 450 that is a flexible substrate. In that case, a separation layer is preferably provided between the non-flexible substrate and the transistor. As the substrate 450, a sheet, a film, or foil containing a fiber may be used. The substrate 450 may have elasticity. The substrate 450 may have a property of returning to its original shape when bending or pulling is stopped. Alternatively, the substrate 450 may have a property of not returning to its original shape. The thickness of the substrate 450 is, for example, greater than or equal to 5 µm and less than or equal to 700 µm, preferably greater than or equal to 10 µm and less than or equal to 500 µm and further preferably greater than or equal to 15 µm and less than or equal to 300 µm. When the substrate 450 has a small thickness, the weight of the semiconductor device can be reduced. When the substrate 450 has a small thickness, even in the case of using glass or the like, the substrate 450 may have elasticity or a property of returning to its original shape when bending or pulling is stopped. Therefore, an impact applied to the semiconductor device over the substrate 450, which is caused by dropping or the like, can be reduced. That is, a durable semiconductor device can be provided.

For the flexible substrate 450, metal, an alloy, a resin, glass, or fiber thereof can be used, for example. The flexible substrate 450 preferably has a lower coefficient of linear expansion because deformation due to an environment is suppressed. The flexible substrate 450 is preferably formed using, for example, a material whose coefficient of linear expansion is lower than or equal to $1\times10^{-3}$/K, lower than or equal to $5\times10^{-5}$/K, or lower than or equal to $1\times10^{-5}$/K. Examples of the resin include polyester, polyolefin, polyamide (e.g., nylon or aramid), polyimide, polycarbonate, acrylic, and polytetrafluoroethylene (PTFE). In particular, aramid is preferably used as the material of the flexible substrate 450 because of its low coefficient of linear expansion.

<Base Insulating Film>

The insulating film 401 has a function of electrically isolating the substrate 450 from the conductive film 414. The insulating film 401 or 402 is formed using an insulating film having a single-layer structure or a stacked-layer structure. Examples of the material of an insulating film include aluminum oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, and tantalum oxide. The insulating film 402 may be formed using silicon oxide with high step coverage which is formed by reacting tetraethyl orthosilicate (TEOS), silane, or the like with oxygen, nitrous oxide, or the like. After the insulating film 402 is formed, the insulating film 402 may be subjected to planarization treatment using a CMP method or the like to improve the planarity of the top surface thereof.

The insulating film 404 preferably contains an oxide. In particular, the insulating film 404 preferably contains an oxide material from which part of oxygen is released by heating. The insulating film 404 preferably contains an oxide containing oxygen at a proportion higher than that in the stoichiometric composition. Part of oxygen is released by heating from an oxide film containing oxygen at a proportion higher than that in the stoichiometric composition. Oxygen released from the insulating film 404 is supplied to the metal oxide 430, so that oxygen vacancies in the metal oxide 430 can be reduced. Consequently, changes in the electrical characteristics of the transistor can be reduced and the reliability of the transistor can be improved.

The oxide film containing oxygen at a proportion higher than that in the stoichiometric composition is an oxide film of which the amount of released oxygen converted into oxygen atoms is greater than or equal to $1.0\times10^{18}$ atoms/cm$^3$, preferably greater than or equal to $3.0\times10^{20}$ atoms/cm$^3$, in thermal desorption spectroscopy (TDS) analysis. Note that the temperature of the film surface in the TDS analysis is preferably higher than or equal to 100° C. and lower than or equal to 700° C., or higher than or equal to 100° C. and lower than or equal to 500° C.

The insulating film 404 preferably contains an oxide that can supply oxygen to the metal oxide 430. For example, a material containing silicon oxide or silicon oxynitride is preferably used. Alternatively, a metal oxide such as aluminum oxide, aluminum oxynitride, gallium oxide, gallium oxynitride, yttrium oxide, yttrium oxynitride, hafnium oxide, or hafnium oxynitride may be used for the insulating film 404. To make the insulating film 404 contain excess oxygen, the insulating film 404 is formed in an oxygen atmosphere, for example. Alternatively, a region containing excess oxygen may be formed by introducing oxygen into the insulating film 404 that has been formed. Both the methods may be combined.

For example, oxygen (at least including any of oxygen radicals, oxygen atoms, and oxygen ions) may be introduced into the insulating film 404 that has been formed, so that a region containing excess oxygen is formed. Oxygen can be introduced by, for example, an ion implantation method, an ion doping method, a plasma immersion ion implantation method, plasma treatment, or the like. A gas containing oxygen can be used for oxygen introducing treatment. Examples of the gas containing oxygen include oxygen, nitrous oxide, nitrogen dioxide, carbon dioxide, and carbon monoxide. Furthermore, a rare gas may be included in the gas containing oxygen for the oxygen introducing treatment. Moreover, hydrogen or the like may be included. For example, a mixed gas of carbon dioxide, hydrogen, and argon may be used. After the insulating film 404 is formed, the insulating film 404 may be subjected to planarization treatment using a CMP method or the like to improve the planarity of the top surface thereof.

The insulating film 403 has a passivation function of preventing oxygen contained in the insulating film 404 from decreasing by bonding to metal contained in the conductive film 414. The insulating film 403 has a function of blocking oxygen, hydrogen, water, alkali metal, alkaline earth metal, and the like. Providing the insulating film 403 can prevent outward diffusion of oxygen from the metal oxide 430 and entry of hydrogen, water, or the like into the metal oxide 430 from the outside. The insulating film 403 can be, for example, a nitride insulating film. The nitride insulating film is formed using silicon nitride, silicon nitride oxide, aluminum nitride, aluminum nitride oxide, or the like. Note that instead of the nitride insulating film, an oxide insulating film having a blocking effect against oxygen, hydrogen, water, and the like may be provided. Examples of the oxide insulating film include an aluminum oxide film, an aluminum oxynitride film, a gallium oxide film, a gallium oxynitride film, an yttrium oxide film, an yttrium oxynitride film, a hafnium oxide film, and a hafnium oxynitride film.

The threshold voltage of the transistor 400a can be controlled by injecting electrons into a charge trap layer. The charge trap layer is preferably provided in the insulating film 402 or the insulating film 403 or as one of these films. For example, when the insulating film 403 is formed using hafnium oxide, aluminum oxide, tantalum oxide, aluminum silicate, or the like, the insulating film 403 can function as a charge trap layer.

<Gate Electrode and Source and Drain Electrodes>

The conductive films 411 to 414 and 421 to 424 each preferably have a single-layer structure or a stacked-layer structure of a conductive film containing a low-resistance material selected from copper (Cu), tungsten (W), molybdenum (Mo), gold (Au), aluminum (Al), manganese (Mn), titanium (Ti), tantalum (Ta), nickel (Ni), chromium (Cr), lead (Pb), tin (Sn), iron (Fe), cobalt (Co), ruthenium (Ru), platinum (Pt), iridium (Ir), and strontium (Sr), an alloy of such a low-resistance material, or a compound containing such a material as its main component. It is particularly preferable to use a high-melting-point material which has both heat resistance and conductivity, such as tungsten or molybdenum. In addition, the conductive film is preferably formed using a low-resistance conductive material such as aluminum or copper. The use of a Cu—Mn alloy is further preferable, in which case manganese oxide formed at the interface with an insulator containing oxygen has a function of preventing Cu diffusion.

The conductive films 421 to 424 are preferably formed using a conductive oxide including noble metal, such as iridium oxide, ruthenium oxide, or strontium ruthenate. Such a conductive oxide hardly takes oxygen from an oxide semiconductor even when it is in contact with the oxide semiconductor and hardly generates oxygen vacancies in the oxide semiconductor.

<Low-Resistance Region>

The regions 441 and 442 are formed when, for example, the conductive films 421 and 423 extract oxygen from the metal oxides 431 and 432. Oxygen is more likely to be extracted at higher temperatures. Oxygen vacancies are formed in the regions 441 and 442 through several heating steps in the manufacturing process of the transistor. In addition, hydrogen enters sites of the oxygen vacancies by heating, increasing the carrier concentration in the regions 441 and 442. As a result, the resistance of the regions 441 and 442 is reduced.

<Gate Insulating Film>

The insulating film 406 preferably contains an insulator with a high relative dielectric constant. For example, the insulating film 406 preferably contains gallium oxide, hafnium oxide, an oxide containing aluminum and hafnium, oxynitride containing aluminum and hafnium, an oxide containing silicon and hafnium, or oxynitride containing silicon and hafnium.

The insulating film 406 preferably has a stacked-layer structure containing silicon oxide or silicon oxynitride and an insulator with a high relative dielectric constant. Because silicon oxide and silicon oxynitride have thermal stability, combination of silicon oxide or silicon oxynitride with an insulator with a high relative dielectric constant allows the stacked-layer structure to be thermally stable and have a high relative dielectric constant. For example, when aluminum oxide, gallium oxide, or hafnium oxide is closer to the metal oxide 433, entry of silicon from silicon oxide or silicon oxynitride into the metal oxide 432 can be suppressed.

When silicon oxide or silicon oxynitride is closer to the metal oxide 433, for example, trap centers might be formed at the interface between aluminum oxide, gallium oxide, or hafnium oxide and silicon oxide or silicon oxynitride. The trap centers can shift the threshold voltage of the transistor in the positive direction by trapping electrons in some cases.

<Interlayer Insulating Film and Protective Insulating Film>

The insulating film 405 preferably contains an insulator with a low relative dielectric constant. For example, the insulating film 405 preferably contains silicon oxide, silicon oxynitride, silicon nitride oxide, silicon nitride, or a resin. Alternatively, the insulating film 405 preferably has a stacked-layer structure containing silicon oxide or silicon oxynitride and a resin. Because silicon oxide and silicon oxynitride have thermal stability, combination of silicon oxide or silicon oxynitride with a resin allows the stacked-layer structure to be thermally stable and have a low relative dielectric constant. Examples of the resin include polyester, polyolefin, polyamide (e.g., nylon or aramid), polyimide, polycarbonate, and acrylic.

The insulating film 407 has a function of blocking oxygen, hydrogen, water, alkali metal, alkaline earth metal, and the like. Providing the insulating film 407 can prevent outward diffusion of oxygen from the metal oxide 430 and entry of hydrogen, water, or the like into the metal oxide 430 from the outside. The insulating film 407 can be, for example, a nitride insulating film. The nitride insulating film is formed using silicon nitride, silicon nitride oxide, aluminum nitride, aluminum nitride oxide, or the like. Note that instead of the nitride insulating film, an oxide insulating film having a blocking effect against oxygen, hydrogen, water, and the like may be provided. Examples of the oxide insulating film include an aluminum oxide film, an aluminum oxynitride film, a gallium oxide film, a gallium oxynitride film, an yttrium oxide film, an yttrium oxynitride film, a hafnium oxide film, and a hafnium oxynitride film. An aluminum oxide film is preferably used as the insulating film 407 because it is highly effective in preventing transmission of both oxygen and impurities such as hydrogen and moisture.

When the insulating film 407 is formed by a sputtering method in an atmosphere containing oxygen or a plasma CVD method with a gas containing oxygen, oxygen can be added to side and top surfaces of the insulating films 405 and 406. It is preferable to perform second heat treatment at any time after the formation of the insulating film 407. Through the second heat treatment, oxygen added to the insulating films 405 and 406 is diffused in the insulating films to reach the metal oxide 430, whereby oxygen vacancies in the metal oxide 430 can be reduced.

The insulating film 407 has a function of blocking oxygen and prevents oxygen from being diffused over the insulating film 407. The insulating film 403 also has a function of blocking oxygen and prevents oxygen from being diffused under the insulating film 403.

Note that the second heat treatment may be performed at a temperature that allows oxygen added to the insulating films 405 and 406 to be diffused to the metal oxide 430. For example, the description of the first heat treatment may be referred to for the second heat treatment. Alternatively, the temperature of the second heat treatment is preferably lower than that of the first heat treatment. The second heat treatment is preferably performed at a temperature lower than that of the first heat treatment by 20° C. or higher and 150° C. or lower, preferably 40° C. or higher and 100° C. or lower. Accordingly, superfluous release of oxygen from the insulating film 404 can be inhibited. Note that the second heat treatment is not necessarily performed when heating during formation of the films can work as heat treatment comparable to the second heat treatment. As described above, oxygen can be supplied to the metal oxide 430 from above and below through the formation of the insulating film 407 and the second heat treatment. Alternatively, oxygen can be added to the insulating films 405 and 406 by forming a film containing indium oxide, for example, an In-M-Zn oxide, as the insulating film 407.

The insulating film 408 can be formed using an insulator including one or more kinds of materials selected from aluminum oxide, aluminum nitride oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, tantalum oxide, and the like. Alternatively, for the insulating film 408, a resin which can be used for the insulating film 405, such as a polyimide resin, can be used. The insulating film 408 may be a stack including any of the above materials.

<<Structure Example 2 of Transistor>>

Figure 29A:
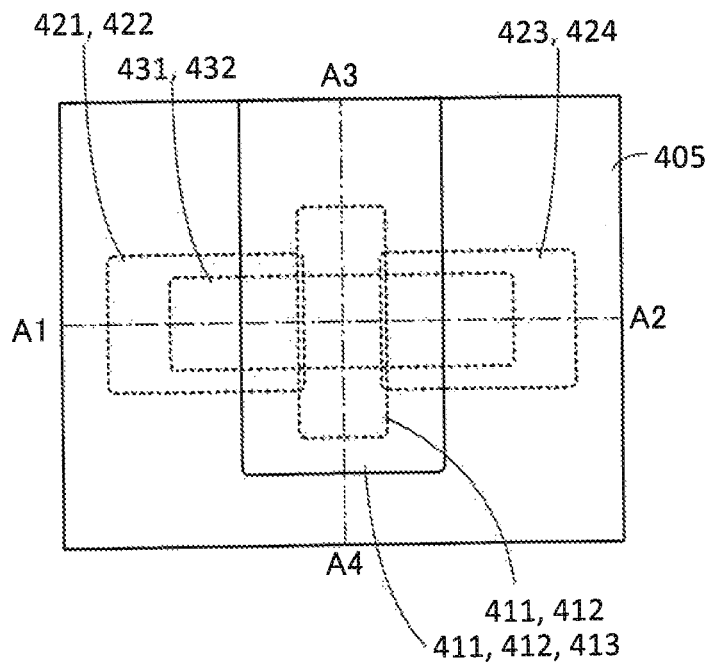
FIG. 29A and FIGS. 29B and 29C are a top view and cross-sectional views, respectively, each illustrating a structure example of a transistor.
Figure 29B:
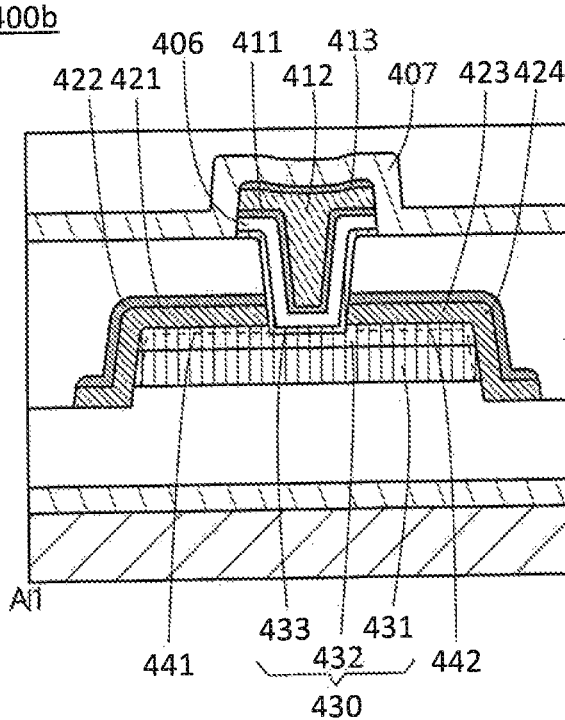
Figure 29C:
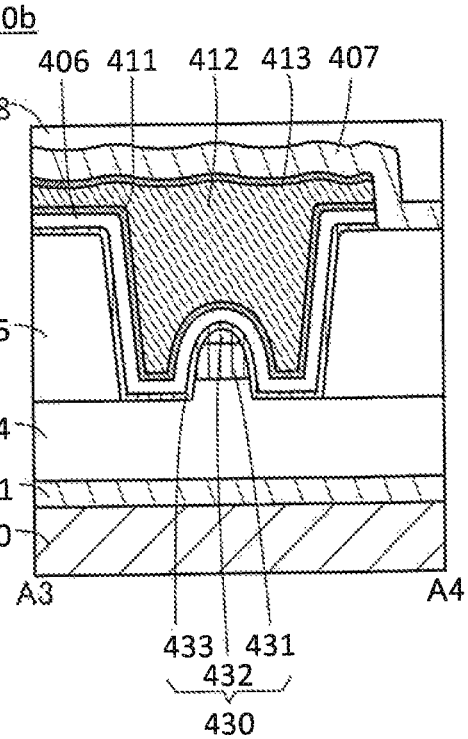

The conductive film 414 and the insulating films 402 and 403 can be omitted in the transistor 400a illustrated in FIGS. 27A to 27C. An example of such a structure is illustrated in FIGS. 29A to 29C. FIG. 29A is a top view of a transistor 400b. FIG. 29B is a cross-sectional view taken along line A1-A2 in FIG. 29A, and FIG. 29C is a cross-sectional view taken along line A3-A4 in FIG. 29A.

<<Structure Example 3 of Transistor>>

Figure 30A:
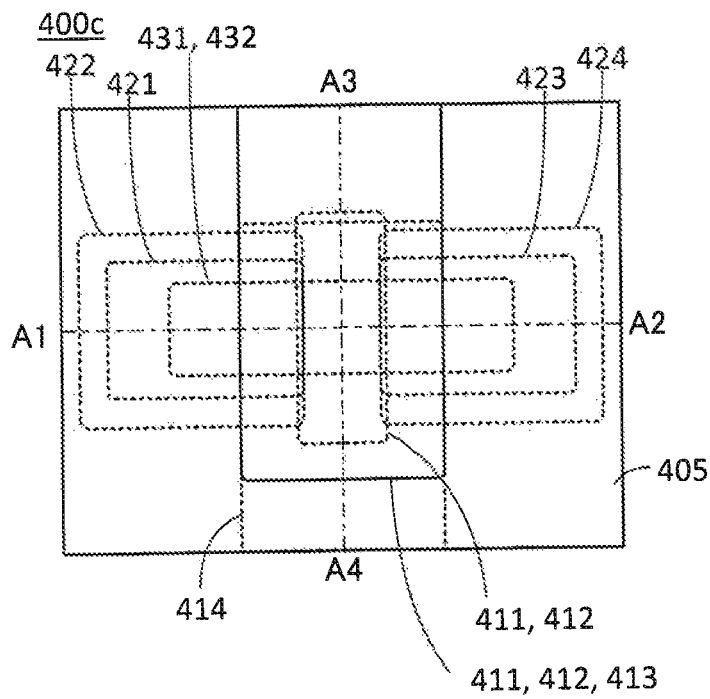
FIG. 30A and FIGS. 30B and 30C are a top view and cross-sectional views, respectively, each illustrating a structure example of a transistor.
Figure 30B:
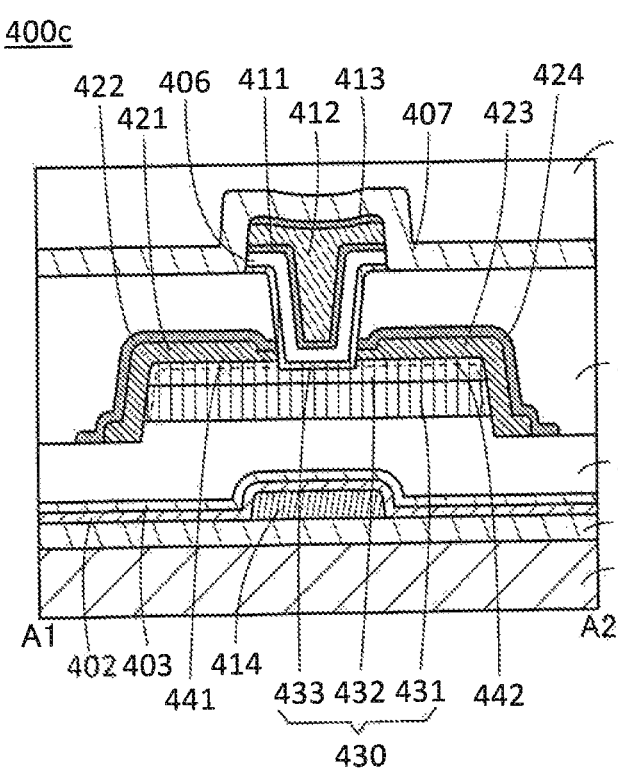
Figure 30C:
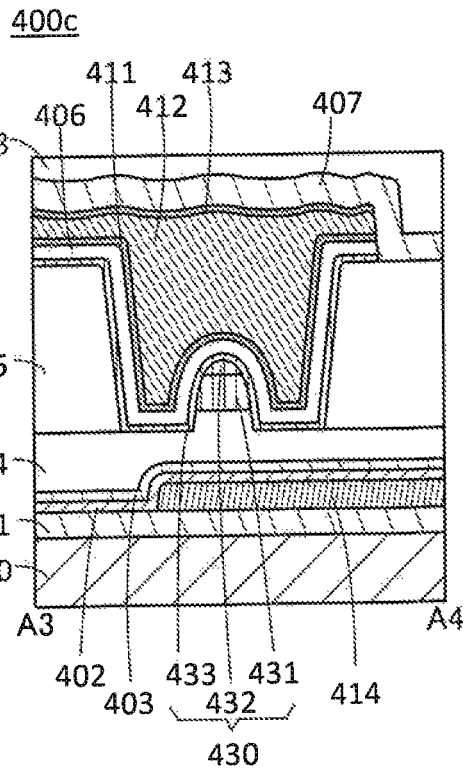

In the transistor 400a illustrated in FIGS. 27A to 27C, part of the conductive films 421 and 423 that overlap with the gate electrode (the conductive films 411 to 413) can be reduced in thickness. An example of such a structure is illustrated in FIGS. 30A to 30C. FIG. 30A is a top view of a transistor 400c. FIG. 30B is a cross-sectional view taken along line A1-A2 in FIG. 30A, and FIG. 30C is a cross-sectional view taken along line A3-A4 in FIG. 30A.

As illustrated in FIG. 30B, in the transistor 400c, part of the conductive film 421 that overlaps with the gate electrode is reduced in thickness, and the conductive film 422 covers the conductive film 421. Part of the conductive film 423 that overlaps with the gate electrode is also reduced in thickness, and the conductive film 424 covers the conductive film 423. With such a structure, a distance between the gate and source electrodes or between the gate and drain electrodes can be increased. This results in a reduction in the parasitic capacitance formed between the gate electrode and the source and drain electrodes. As a result, a transistor capable of high-speed operation can be obtained.

<<Structure Example 4 of Transistor>>

FIG. 31A is a top view of a transistor 400d. FIG. 31B is a cross-sectional view taken along line A1-A2 in FIG. 31A, and FIG. 31C is a cross-sectional view taken along line A3-A4 in FIG. 31A. The transistor 400d has an s-channel structure like the transistor 400a and the like. In the transistor 400d, an insulating film 409 is provided in contact with a side surface of the conductive film 412 that forms a gate electrode. The insulating film 409 and the conductive film 412 are covered with the insulating film 407. The insulating film 409 functions as a sidewall insulating film of the transistor 400d. The gate electrode of the transistor 400d may be a stack of the conductive films 411 to 413 like that of the transistor 400a.

The insulating film 406 and the conductive film 412 overlap with the conductive film 414 and the metal oxide 432 at least partly. It is preferable that the side edge of the conductive film 412 in the channel length direction be approximately aligned with the side edge of the insulating film 406 in the channel length direction. Here, the insulating film 406 functions as a gate insulating film of the transistor 400d, the conductive film 412 functions as a gate electrode of the transistor 400d, and the insulating film 409 functions as a sidewall insulating film of the transistor 400d.

The metal oxide 432 has a region that overlaps with the conductive film 412 with the metal oxide 433 and the insulating film 406 positioned therebetween. Preferably, the outer edge of the metal oxide 431 is approximately aligned with the outer edge of the metal oxide 432, and the outer edge of the metal oxide 433 is outside of the outer edges of the metal oxides 431 and 432. However, the shape of the transistor in this embodiment is not limited to that where the outer edge of the metal oxide 433 is outside of the outer edge of the metal oxide 431. For example, the outer edge of the metal oxide 431 may be outside of the outer edge of the metal oxide 433, or the outer edge of the metal oxide 431 may be approximately aligned with the outer edge of the metal oxide 433.

FIG. 31D is an enlarged view of part of FIG. 31B. As illustrated in FIG. 31D, regions 461a to 461e are formed in the metal oxide 430. The regions 461b to 461e have a higher concentration of dopant and therefore have a lower resistance than the region 461a. Furthermore, the regions 461b and 461c have a higher concentration of hydrogen and therefore have a much lower resistance than the regions 461d and 461e. The concentration of a dopant in the region 461a is, for example, less than or equal to 5%, less than or equal to 2%, or less than or equal to 1% of the maximum concentration of a dopant in the region 461b or 461c. Note that the dopant may be rephrased as a donor, an acceptor, an impurity, or an element.

As illustrated in FIG. 31D, in the metal oxide 430, the region 461a substantially overlaps with the conductive film 412, and the regions 461b to 461e are the regions other than the region 461a. In the regions 461b and 461c, the top surface of the metal oxide 433 is in contact with the insulating film 407. In the regions 461d and 461e, the top surface of the metal oxide 433 is in contact with the insulating film 409 or 406. That is, as illustrated in FIG. 31D, the border between the regions 461b and 461d overlaps with the border between the side edges of the insulating films 407 and 409. The same applies to the border between the regions 461c and 461e. Here, part of the regions 461d and 461e preferably overlaps with part of a region (a channel formation region) where the metal oxide 432 and the conductive film 412 overlap with each other. For example, preferably, the side edges of the regions 461d and 461e in the channel length direction are inside of the conductive film 412 and the distance between the side edge of the conductive film 412 and each of the side edges of the regions 461d and 461e is d. In that case, the thickness $t_{406}$ of the insulating film 406 and the distance d preferably satisfy $0.25t_{406} < d < t_{406}$.

In the above manner, the regions 461d and 461e are formed in part of the region where the metal oxide 430 and the conductive film 412 overlap with each other. Accordingly, the channel formation region of the transistor 400d is in contact with the low-resistance regions 461d and 461e and a high-resistance offset region is not formed between the region 461a and each of the regions 461d and 461e, so that the on-state current of the transistor 400d can be increased. Furthermore, since the side edges of the regions 461d and 461e in the channel length direction are formed so as to satisfy the above range, the regions 461d and 461e can be prevented from being formed too deeply in the channel formation region and always conducted.

The regions 461b to 461e are formed by ion doping treatment such as an ion implantation method. Therefore, as illustrated in FIG. 31D, the positions of the side edges of the regions 461d and 461e in the channel length direction are sometimes shifted to the side edge of the metal oxide 430 in the channel length direction in a deeper area from the top surface of the metal oxide 433. The distance din that case is the distance between the side edge of the conductive film 412 in the channel length direction and each of the side edges of the regions 461d and 461e that are closest to the inner part of the conductive film 412.

In some cases, for example, the regions 461d and 461e in the metal oxide 431 do not overlap with the conductive film 412. In that case, at least part of the regions 461d and 461e in the metal oxide 431 or 432 is preferably formed in a region overlapping with the conductive film 412.

In addition, low-resistance regions 451 and 452 are preferably formed in the metal oxide 431, the metal oxide 432, and the metal oxide 433 in the vicinity of the interface with the insulating film 407. The low-resistance regions 451 and 452 contain at least one of the elements included in the insulating film 407. Preferably, part of the low-resistance regions 451 and 452 is substantially in contact with or overlaps partly with the region (the channel formation region) where the metal oxide 432 and the conductive film 412 overlap with each other.

Since a large part of the metal oxide 433 is in contact with the insulating film 407, the low-resistance regions 451 and 452 are likely to be formed in the metal oxide 433. The low-resistance regions 451 and 452 in the metal oxide 433 contain a higher concentration of elements included in the insulating film 407 than the other regions of the metal oxide 433 (e.g., the region of the metal oxide 433 that overlaps with the conductive film 412).

The low-resistance regions 451 and 452 are formed in the regions 461b and 461c, respectively. Ideally, the metal oxide 430 has a structure in which the concentration of added elements is the highest in the low-resistance regions 451 and 452, the second highest in the regions 461b and 461c to 461e other than the low-resistance regions 451 and 452, and the lowest in the region 461a. The added elements refer to a dopant for forming the regions 461b and 461c and an element added from the insulating film 407 to the low-resistance regions 451 and 452.

Although the low-resistance regions 451 and 452 are formed in the transistor 400d, the semiconductor device shown in this embodiment is not limited to this structure. For example, the low-resistance regions 451 and 452 are not necessarily formed in the case where the regions 461b and 461c have a sufficiently low resistance.

<<Structure Example 5 of Transistor>>

Figure 32A:
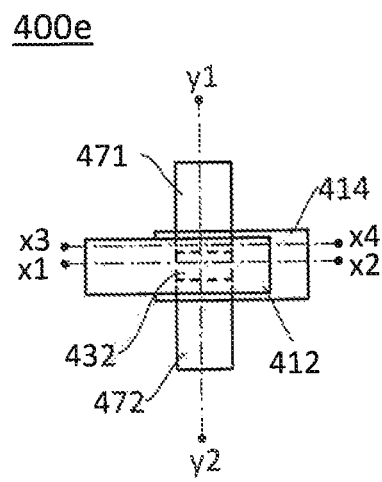
FIG. 32A and FIGS. 32B to 32D are a top view and cross-sectional views, respectively, each illustrating a structure example of a transistor.
Figure 32B:
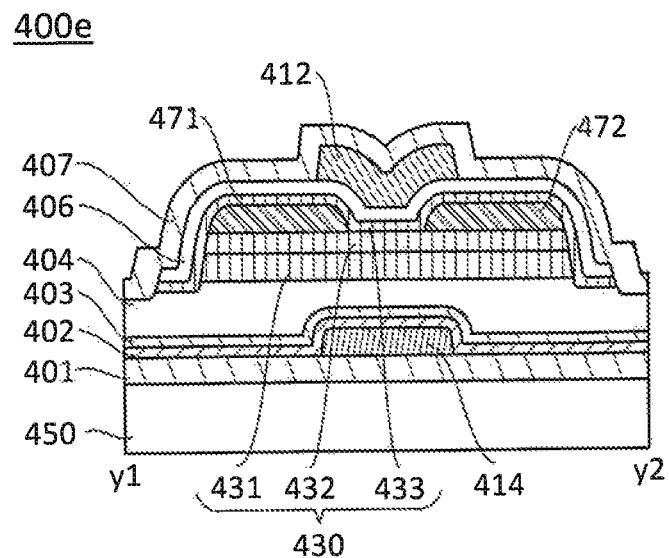
Figure 32C:
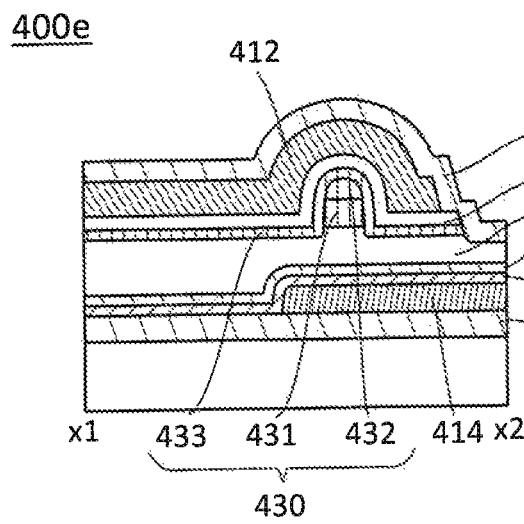
Figure 32D:
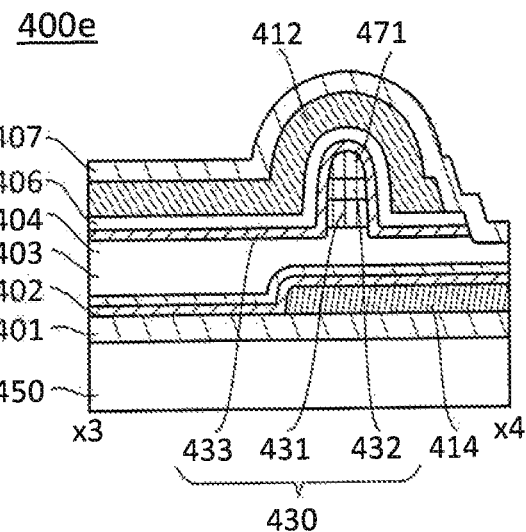

FIGS. 32A to 32D illustrate a structure example of a transistor. FIG. 32A is a top view illustrating a structure example of an OS transistor. FIG. 32B is a cross-sectional view taken along line y1-y2 in FIG. 32A, FIG. 32C is a cross-sectional view taken along line x1-x2 in FIG. 32A, and FIG. 32D is a cross-sectional view taken along line x3-x4 in FIG. 32A.

A transistor 400e has an s-channel structure like the transistor 400a and the like. The transistor 400e is provided with conductive films 471 and 472. The conductive films 471 and 472 each function as a source or drain electrode. A gate electrode of the transistor 400e may be a stack of the conductive films 411 to 413 like that of the transistor 400a.

As illustrated in FIGS. 32B and 32C, the metal oxide 430 includes a portion where the metal oxides 431, 432, and 433 are stacked in that order. The conductive films 471 and 472 are provided over the stack formed of the metal oxides 431 and 432. The metal oxide 433 is formed to cover the metal oxides 431 and 432 and the conductive films 471 and 472. The insulating film 406 covers the metal oxide 433. Here, the metal oxide 433 and the insulating film 406 are etched using the same mask.

The conductive films 471 and 472 are formed using a hard mask used for forming the stack of the metal oxides 431 and 432. Therefore, the conductive films 471 and 472 do not have regions in contact with the side surfaces of the metal oxides 431 and 432. For example, through the following steps, the metal oxides 431 and 432 and the conductive films 471 and 472 can be formed. A two-layer oxide semiconductor film including the metal oxides 431 and 432 is formed. A single-layer or multi-layer conductive film is formed over the oxide semiconductor film. This conductive film is etched, so that a hard mask is formed. Using this hard mask, the two-layer oxide semiconductor film is etched to form the stack of the metal oxides 431 and 432. Then, the hard mask is etched to form the conductive films 471 and 472.

<<Structure Example 6 of Transistor>>

Figure 33A:
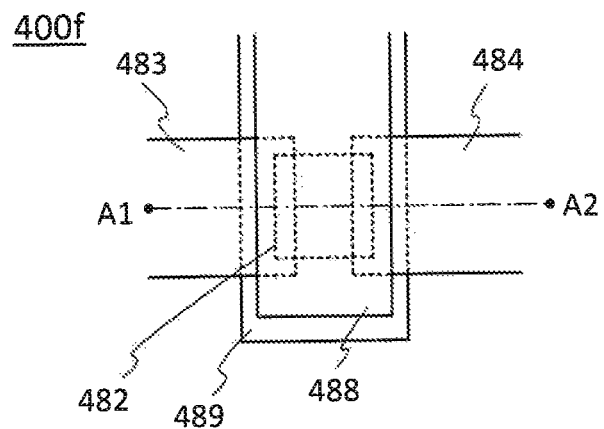
FIG. 33A and FIG. 33B are a top view and a cross-sectional view, respectively, each illustrating a structure example of a transistor.
Figure 33B:
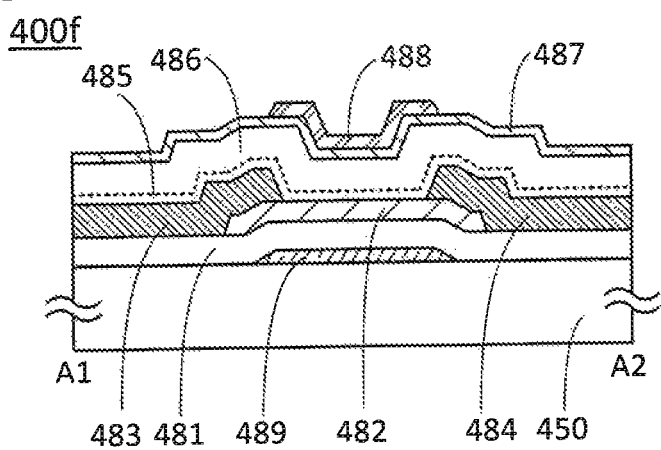

FIG. 33A is a top view of a transistor 400f FIG. 33B is a cross-sectional view taken along line A1-A2 in FIG. 33A.

The transistor 400f includes a conductive film 489 functioning as a first gate, a conductive film 488 functioning as a second gate, a semiconductor 482, conductive films 483 and 484 functioning as a source and a drain, an insulating film 481, an insulating film 485, an insulating film 486, and an insulating film 487.

The conductive film 489 is on an insulating surface. The conductive film 489 overlaps with the semiconductor 482 with the insulating film 481 positioned therebetween. The conductive film 488 overlaps with the semiconductor 482 with the insulating films 485, 486, and 487 positioned therebetween. The conductive films 483 and 484 are connected to the semiconductor 482.

The insulating films 485 to 487 are sequentially stacked over the semiconductor 482 and the conductive films 483 and 484 in FIG. 33B; however, an insulating film provided over the semiconductor 482 and the conductive films 483 and 484 may be a single layer or a stack including a plurality of insulating films.

In the case of using an oxide semiconductor as the semiconductor 482, the insulating film 486 preferably contains oxygen at a proportion higher than or equal to that in the stoichiometric composition and has a function of supplying part of oxygen to the semiconductor 482 by heating. Note that in the case where the provision of the insulating film 486 directly on the semiconductor 482 causes damage to the semiconductor 482 at the time of formation of the insulating film 486, the insulating film 485 is preferably provided between the semiconductor 482 and the insulating film 486, as illustrated in FIG. 33B. The insulating film 485 preferably allows oxygen to pass therethrough, and causes little damage to the semiconductor 482 when the insulating film 485 is formed compared with the case of the insulating film 486. If the insulating film 486 can be formed directly on the semiconductor 482 while damage to the semiconductor 482 is reduced, the insulating film 485 is not necessarily provided.

For the insulating films 485 and 486, a material containing silicon oxide or silicon oxynitride is preferably used, for example. Alternatively, a metal oxide such as aluminum oxide, aluminum oxynitride, gallium oxide, gallium oxynitride, yttrium oxide, yttrium oxynitride, hafnium oxide, or hafnium oxynitride can be used.

The insulating film 487 preferably has an effect of blocking diffusion of oxygen, hydrogen, and water. Alternatively, the insulating film 487 preferably has an effect of blocking diffusion of hydrogen and water.

An insulating film has a better blocking effect as the insulating film has a higher density and becomes denser or has a fewer dangling bonds and becomes more chemically stable. An insulating film that has an effect of blocking diffusion of oxygen, hydrogen, and water can be formed using, for example, aluminum oxide, aluminum oxynitride, gallium oxide, gallium oxynitride, yttrium oxide, yttrium oxynitride, hafnium oxide, or hafnium oxynitride. An insulating film that has an effect of blocking diffusion of hydrogen and water can be formed using, for example, silicon nitride or silicon nitride oxide.

In the case where the insulating film 487 has an effect of blocking diffusion of water, hydrogen, and the like, impurities such as water and hydrogen that exist in a resin in a panel or exist outside the panel can be prevented from entering the semiconductor 482. In the case where an oxide semiconductor is used as the semiconductor 482, part of water or hydrogen that enters the oxide semiconductor serves as an electron donor (donor). Thus, the use of the insulating film 487 having the blocking effect can prevent a shift in the threshold voltage of the transistor 400f due to generation of donors.

In addition, in the case where an oxide semiconductor is used as the semiconductor 482, the insulating film 487 has an effect of blocking diffusion of oxygen, so that diffusion of oxygen from the oxide semiconductor to the outside can be prevented. Accordingly, oxygen vacancies in the oxide semiconductor that serve as donors are reduced, so that a shift in the threshold voltage of the transistor 400f due to generation of donors can be prevented.

Embodiment 4

In this embodiment, a semiconductor device having a device structure in which a Si transistor and an OS transistor are stacked will be described. Here, an example of the structure of a semiconductor device including the AM2 (FIG. 6B) having the transistor MO1 and the capacitor C1 is shown.

FIGS. 34A and 34B are cross-sectional views illustrating the device structure of the RS 223B, typically, the transistors MO1 and MR1 and the capacitor C1. FIG. 34A is a cross-sectional view of a transistor that forms the RS 223B in the channel length direction, and FIG. 34B is a cross-sectional view of the transistor in a channel width direction.

A semiconductor device includes layers 781 to 789 from the bottom. The layer 781 includes a substrate 700, the transistor MR1 formed using the substrate 700, an element isolation layer 701, and a plurality of plugs such as a plug 710 and a plug 711. The layer 782 includes a plurality of wirings such as a wiring 730 and a wiring 731. The layer 783 includes a plurality of plugs such as a plug 712 and a plug 713 and a plurality of wirings (not illustrated). The layer 784 includes insulating films 702 to 704, the transistor MO1, an insulating film 705, and a plurality of plugs such as a plug 714 and a plug 715.

The layer 785 includes a plurality of wirings such as wirings 732 and 733. The layer 786 includes a plurality of plugs such as a plug 716 and a plurality of wirings (not illustrated). The layer 787 includes a plurality of wirings such as a wiring 734. The layer 788 includes a capacitor C1 and a plurality of plugs such as a plug 717. The capacitor C1 includes electrodes 751 and 752 and an insulating film 753. The layer 789 includes a plurality of wirings such as a wiring 735.

The OS transistor in Embodiment 3 is preferably used as the transistor MO1. Here, the transistor MO1 has the same device structure as the transistor 400c (FIGS. 30A to 30C). The transistor MR1 is a Si transistor.

As the substrate 700, a single crystal semiconductor substrate or a polycrystalline semiconductor substrate of silicon or silicon carbide, a compound semiconductor substrate of silicon germanium, an SOI substrate, or the like can be used. For example, a glass substrate, a quartz substrate, a plastic substrate, a metal substrate, a flexible substrate, an attachment film, paper including a fibrous material, or a base film may be used as the substrate 700. Alternatively, a semiconductor element may be formed using one substrate, and then transferred to another substrate. Here, as an example, a single crystal silicon wafer is used as the substrate 700.

The insulating films 704 and 705 preferably have a blocking effect against hydrogen, water, and the like. Water, hydrogen, and the like are factors that generate carriers in an oxide semiconductor; thus, providing such a blocking layer against hydrogen, water, and the like can improve the reliability of the transistor MO1. Examples of the insulator having a blocking effect against hydrogen, water, and the like include aluminum oxide, aluminum oxynitride, gallium oxide, gallium oxynitride, yttrium oxide, yttrium oxynitride, hafnium oxide, hafnium oxynitride, and yttria-stabilized zirconia (YSZ).

The wirings 730 to 735 and the plugs 710 to 717 each preferably have a single-layer structure or a stacked-layer structure of a conductive film containing a low-resistance material selected from copper (Cu), tungsten (W), molybdenum (Mo), gold (Au), aluminum (Al), manganese (Mn), titanium (Ti), tantalum (Ta), nickel (Ni), chromium (Cr), lead (Pb), tin (Sn), iron (Fe), and cobalt (Co), an alloy of such a low-resistance material, or a compound containing such a material as its main component. It is particularly preferable to use a high-melting-point material which has both heat resistance and conductivity, such as tungsten or molybdenum. It is also preferable to use a low-resistance conductive material such as aluminum or copper. The use of a Cu—Mn alloy is further preferable, in which case manganese oxide formed at the interface with an insulator containing oxygen has a function of preventing Cu diffusion.

Figure 35:
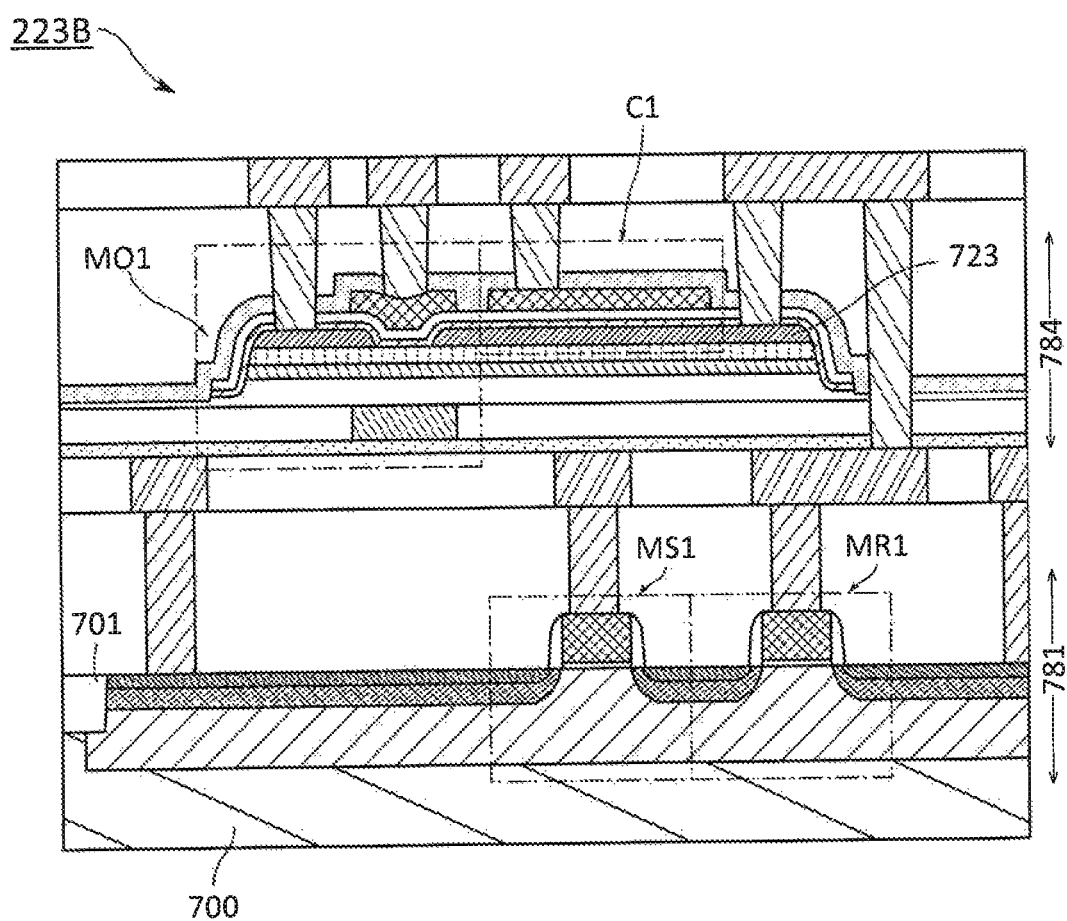
FIG. 35 is a cross-sectional view illustrating a structure example of a semiconductor device.

The OS transistor and the storage capacitor may be formed in the same element layer. FIG. 35 illustrates an example of such a case. FIG. 35 typically illustrates the transistors MO1, MR1, and MS1 and the capacitor C1. In FIG. 35, regions that are not denoted by reference numerals or are not hatched are formed of an insulator. Further, regions that are hatched but not denoted by reference numerals are formed of conductors and form wirings and electrodes.

The transistor MO1 has the same device structure as the transistor 400e (FIG. 32A to 32D). The capacitor C1 is formed together with the transistor MO1. This results in a reduction of the number of manufacturing steps of the semiconductor device. One of a pair of electrodes of the capacitor C1 is formed of a conductive film 723 (a source or drain electrode of the transistor MO1). The other electrode is formed of a conductor in the same layer as a gate electrode of the transistor MO1.

In FIGS. 34A and 34B and FIG. 35, regions without reference numerals and hatch patterns represent regions formed of an insulator. As the insulator, an insulator including one or more kinds of materials selected from aluminum oxide, aluminum nitride oxide, magnesium oxide, silicon oxide, silicon oxynitride, silicon nitride oxide, silicon nitride, gallium oxide, germanium oxide, yttrium oxide, zirconium oxide, lanthanum oxide, neodymium oxide, hafnium oxide, tantalum oxide, and the like can be used. Alternatively, in the regions, an organic resin such as a polyimide resin, a polyamide resin, an acrylic resin, a siloxane resin, an epoxy resin, or a phenol resin can be used. Note that in this specification, an oxynitride refers to a compound that contains more oxygen than nitrogen, and a nitride oxide refers to a compound that contains more nitrogen than oxygen.

Embodiment 5

In this embodiment, an oxide semiconductor will be described. An oxide semiconductor described here is a metal oxide that can be applied to the metal oxides of the OS transistors in Embodiment 3.

In this specification and the like, trigonal and rhombohedral crystal systems are included in a hexagonal crystal system. In this specification and the like, the term "parallel" indicates that an angle formed between two straight lines is greater than or equal to −10° and less than or equal to 10°, and accordingly includes the case where the angle is greater than or equal to −5° and less than or equal to 5°. The term "substantially parallel" indicates that an angle formed between two straight lines is greater than or equal to −30° and less than or equal to 30°. In addition, the term "perpendicular" indicates that an angle formed between two straight lines is greater than or equal to 80° and less than or equal to 100°, and accordingly includes the case where the angle is greater than or equal to 85° and less than or equal to 95°. The term "substantially perpendicular" indicates that an angle formed between two straight lines is greater than or equal to 60° and less than or equal to 120°.

<<Oxide Semiconductor Structure>>

An oxide semiconductor is classified into a single crystal oxide semiconductor and a non-single-crystal oxide semiconductor. Examples of a non-single-crystal oxide semiconductor include a c-axis aligned crystalline oxide semiconductor (CAAC-OS), a polycrystalline oxide semiconductor, a nanocrystalline oxide semiconductor (nc-OS), an amorphous-like oxide semiconductor (a-like OS), and an amorphous oxide semiconductor.

From another perspective, an oxide semiconductor is classified into an amorphous oxide semiconductor and a crystalline oxide semiconductor. Examples of a crystalline oxide semiconductor include a single crystal oxide semiconductor, a CAAC-OS, a polycrystalline oxide semiconductor, and an nc-OS.

It is known that an amorphous structure is generally defined as being metastable and unfixed, and being isotropic and having no non-uniform structure. In other words, an amorphous structure has a flexible bond angle and a short-range order but does not have a long-range order.

This means that an inherently stable oxide semiconductor cannot be regarded as a completely amorphous oxide semiconductor. Moreover, an oxide semiconductor that is not isotropic (e.g., an oxide semiconductor that has a periodic structure in a microscopic region) cannot be regarded as a completely amorphous oxide semiconductor. Note that an a-like OS has a periodic structure in a microscopic region, but at the same time has a void and thus has an unstable structure. For this reason, an a-like OS has physical properties similar to those of an amorphous oxide semiconductor.

<CAAC-OS>

A CAAC-OS is an oxide semiconductor having a plurality of c-axis aligned crystal parts (also referred to as pellets).

When a combined analysis image (also referred to as a high-resolution TEM image) of a bright-field image and a diffraction pattern of a CAAC-OS is observed by a transmission electron microscope (TEM), a plurality of pellets can be observed. However, in the high-resolution TEM image, a boundary between pellets, that is, a grain boundary is not clearly observed. Thus, in the CAAC-OS, a reduction in electron mobility due to the grain boundary is less likely to occur.

The CAAC-OS observed with a TEM is described below. A high-resolution TEM image of a cross section of the CAAC-OS observed from a direction substantially parallel to a sample surface shows that metal atoms are arranged in a layered manner in a pellet. Each metal atom layer has a configuration reflecting unevenness of a surface over which a CAAC-OS film is formed (hereinafter the surface is referred to as a formation surface) or a top surface of the CAAC-OS, and is arranged parallel to the formation surface or the top surface of the CAAC-OS.

According to the high-resolution TEM image, the CAAC-OS has a characteristic atomic arrangement. The size of a pellet is greater than or equal to 1 nm or greater than or equal to 3 nm, and the size of a space caused by tilt of the pellets is approximately 0.8 nm. Therefore, the pellet can also be referred to as a nanocrystal (nc). The CAAC-OS can be referred to as an oxide semiconductor including c-axis aligned nanocrystals (CANC).

A Cs-corrected high-resolution TEM image of a plane of the CAAC-OS observed from a direction substantially perpendicular to the sample surface shows that metal atoms are arranged in a triangular, quadrangular, or hexagonal configuration in a pellet. However, there is no regularity of arrangement of metal atoms between different pellets.

Next, a CAAC-OS analyzed by X-ray diffraction (XRD) is described. For example, when the structure of a CAAC-OS including an $InGaZnO_4$ crystal is analyzed by an out-of-plane method, a peak appears at a diffraction angle ($2\theta$) of around 31°. This peak is derived from the (009) plane of the $InGaZnO_4$ crystal, which indicates that crystals in the CAAC-OS have c-axis alignment, and that the c-axes are aligned in a direction substantially perpendicular to the formation surface or the top surface of the CAAC-OS.

In structural analysis of the CAAC-OS by an out-of-plane method, another peak might appear when $2\theta$ is around 36°, in addition to the peak at $2\theta$ of around 31°. The peak of $2\theta$ at around 36° indicates that a crystal having no c-axis alignment is included in part of the CAAC-OS. It is preferable that in the CAAC-OS analyzed by an out-of-plane method, a peak appear when $2\theta$ is around 31° and that a peak not appear when $2\theta$ is around 36°.

On the other hand, in structural analysis of the CAAC-OS by an in-plane method in which an X-ray is incident on a sample in a direction substantially perpendicular to the c-axis, a peak appears when $2\theta$ is around 56°. This peak is derived from the (110) plane of the $InGaZnO_4$ crystal. In the case of the CAAC-OS, when analysis ($\phi$ scan) is performed with $2\theta$ fixed at around 56° and with the sample rotated using a normal vector of the sample surface as an axis ($\phi$ axis), a peak is not clearly observed. In contrast, in the case of a single crystal oxide semiconductor of $InGaZnO_4$, when $\phi$ scan is performed with $2\theta$ fixed at around 56°, six peaks which are derived from crystal planes equivalent to the (110) plane are observed. Accordingly, the structural analysis using XRD shows that the directions of a-axes and b-axes are irregularly oriented in the CAAC-OS.

Next, a CAAC-OS analyzed by electron diffraction is described. For example, when an electron beam with a probe diameter of 300 nm is incident on a CAAC-OS including an $InGaZnO_4$ crystal in the direction parallel to the sample surface, a diffraction pattern (also referred to as a selected-area transmission electron diffraction pattern) can be obtained. In this diffraction pattern, spots derived from the (009) plane of an $InGaZnO_4$ crystal are included. Thus, the electron diffraction also indicates that pellets included in the CAAC-OS have c-axis alignment and that the c-axes are aligned in a direction substantially perpendicular to the formation surface or the top surface of the CAAC-OS. Meanwhile, a ring-like diffraction pattern is observed when an electron beam with a probe diameter of 300 nm is incident on the same sample in a direction perpendicular to the sample surface. Therefore, the electron diffraction also indicates that the a-axes and b-axes of the pellets included in the CAAC-OS do not have regular alignment.

As described above, the CAAC-OS is an oxide semiconductor with high crystallinity. Entry of impurities, formation of defects, or the like might decrease the crystallinity of an oxide semiconductor. This means that the CAAC-OS has small amounts of impurities and defects (e.g., oxygen vacancies).

Note that the impurity means an element other than the main components of the oxide semiconductor, such as hydrogen, carbon, silicon, or a transition metal element. For example, an element (e.g., silicon) having higher strength of bonding to oxygen than a metal element included in an oxide semiconductor extracts oxygen from the oxide semiconductor, which results in disorder of the atomic arrangement and reduced crystallinity of the oxide semiconductor. A heavy metal such as iron or nickel, argon, carbon dioxide, or the like has a large atomic radius (or molecular radius), and thus disturbs the atomic arrangement of the oxide semiconductor and decreases crystallinity.

The characteristics of an oxide semiconductor having impurities or defects might be changed by light, heat, or the like. Impurities contained in the oxide semiconductor might serve as carrier traps or carrier generation sources, for example. Furthermore, oxygen vacancies in the oxide semiconductor might serve as carrier traps or serve as carrier generation sources when hydrogen is captured therein.

The CAAC-OS having small amounts of impurities and oxygen vacancies is an oxide semiconductor with a low carrier density (specifically, lower than $8 \times 10^{11}/cm^3$, preferably lower than $1 \times 10^{11}/cm^3$, and further preferably lower than $1 \times 10^{10}/cm^3$, and is higher than or equal to $1 \times 10^{-9}/cm^3$). Such an oxide semiconductor is referred to as a highly purified intrinsic or substantially highly purified intrinsic oxide semiconductor. A CAAC-OS has a low impurity concentration and a low density of defect states. That is, the CAAC-OS can be referred to as an oxide semiconductor having stable characteristics.

<nc-OS>

An nc-OS has a region where a crystal part is observed and a region where a crystal part is not observed clearly in a high-resolution TEM image. In most cases, a crystal part in the nc-OS is greater than or equal to 1 nm and less than or equal to 10 nm, or greater than or equal to 1 nm and less than or equal to 3 nm. Note that an oxide semiconductor including a crystal part whose size is greater than 10 nm and less than or equal to 100 nm is sometimes referred to as a microcrystalline oxide semiconductor. In a high-resolution TEM image of the nc-OS, for example, a grain boundary cannot be found clearly in some cases. There is a possibility that the origin of the nanocrystal is the same as that of a pellet in a CAAC-OS. Therefore, a crystal part of the nc-OS is sometimes referred to as a pellet in the following description.

In the nc-OS, a microscopic region (e.g., a region with a size greater than or equal to 1 nm and less than or equal to 10 nm, in particular, a region with a size greater than or equal to 1 nm and less than or equal to 3 nm) has periodic atomic arrangement. There is no regularity of crystal orientation between different pellets in the nc-OS. Thus, the orientation of the whole film is not observed. Accordingly, in some cases, the nc-OS cannot be distinguished from an a-like OS or an amorphous oxide semiconductor depending on an analysis method. For example, when the nc-OS is analyzed by an out-of-plane method using an X-ray having a diameter larger than that of a pellet, a peak that shows a crystal plane does not appear. Furthermore, a halo pattern is shown in an electron diffraction pattern of the nc-OS obtained by using an electron beam having a probe diameter larger than the diameter of a pellet (e.g., larger than or equal to 50 nm). Meanwhile, spots are shown in a nanobeam electron diffraction pattern of the nc-OS obtained by using an electron beam having a probe diameter close to or smaller than the diameter of a pellet. Furthermore, in a nanobeam electron diffraction pattern of the nc-OS, regions with high luminance in a circular (ring) pattern are observed in some cases. Moreover, a plurality of spots are shown in a ring-like region in some cases.

Since there is no regularity of crystal orientation between the pellets (nanocrystals) as described above, the nc-OS can also be referred to as an oxide semiconductor including random aligned nanocrystals (RANC) or an oxide semiconductor including non-aligned nanocrystals (NANC).

The nc-OS is an oxide semiconductor that has higher regularity than an amorphous oxide semiconductor. Therefore, the nc-OS is likely to have lower density of defect states than an a-like OS and an amorphous oxide semiconductor. Note that there is no regularity of crystal orientation between different pellets in the nc-OS. Therefore, the nc-OS has a higher density of defect states than the CAAC-OS.

<a-Like OS>

An a-like OS has a structure between the nc-OS and the amorphous oxide semiconductor. In a high-resolution TEM image of the a-like OS, a void is observed in some cases. Furthermore, in the high-resolution TEM image, there are a region where a crystal part is clearly observed and a region where a crystal part is not observed. The a-like OS has an unstable structure because it contains a void. In some cases, growth of the crystal part in the a-like OS is induced by electron irradiation. In contrast, in the nc-OS and the CAAC-OS, growth of the crystal part is hardly induced by electron irradiation. Therefore, the a-like OS has an unstable structure as compared with the nc-OS and the CAAC-OS.

The a-like OS has a lower density than the nc-OS and the CAAC-OS because it contains a void. Specifically, the density of the a-like OS is higher than or equal to 78.6% and lower than 92.3% of the density of a single crystal oxide semiconductor having the same composition. The density of each of the nc-OS and the CAAC-OS is higher than or equal to 92.3% and lower than 100% of the density of a single crystal oxide semiconductor having the same composition. It is difficult to deposit an oxide semiconductor having a density of lower than 78% of the density of a single crystal oxide semiconductor.

For example, in the case of an oxide semiconductor having an atomic ratio of In:Ga:Zn=1:1:1, the density of single crystal $InGaZnO_4$ with a rhombohedral crystal structure is 6.357 $g/cm^3$. Accordingly, in the case of the oxide semiconductor having an atomic ratio of In:Ga:Zn=1:1:1, the density of the a-like OS is higher than or equal to 5.0 $g/cm^3$ and lower than 5.9 $g/cm^3$. For example, in the case of the oxide semiconductor having an atomic ratio of In:Ga:Zn=1:1:1, the density of each of the nc-OS and the CAAC-OS is higher than or equal to 5.9 $g/cm^3$ and lower than 6.3 $g/cm^3$.

Single crystals with the same composition do not exist in some cases. In that case, by combining single crystals with different compositions at a given proportion, it is possible to calculate density that corresponds to the density of a single crystal with a desired composition. The density of the single crystal with a desired composition may be calculated using weighted average with respect to the combination ratio of the single crystals with different compositions. It is preferable to combine as few kinds of single crystals as possible for density calculation.

As described above, oxide semiconductors have various structures and various properties. The oxide semiconductor may be a stacked film including two or more of an amorphous oxide semiconductor, an a-like OS, an nc-OS, and a CAAC-OS, for example.

Information about this specification and the like will be described below.

In the drawings, the size, the layer thickness, or the region may be exaggerated for clarity. Therefore, the scale is not necessarily limited to that illustrated in the drawings. Note that in the drawings, ideal examples are schematically illustrated, and shapes or values are not limited to those illustrated in the drawings. For example, the following can be included: variation in signal, voltage, or current due to noise or difference in timing.

In this specification, terms for describing arrangement, such as "over" and "under," may be used for convenience to describe the positional relation between components with reference to drawings. The positional relation between components is changed as appropriate in accordance with the direction in which each component is described. Thus, there is no limitation on terms used in this specification, and description can be made appropriately depending on the situation.

The positional relation of circuit blocks in block diagrams are specified for description, and even in the case where different circuit blocks have different functions in the diagrams, the different circuit blocks may be provided in an actual circuit block so that different functions are achieved in the same circuit block. In addition, the functions of circuit blocks are specified for description, and even in the case where one circuit block is illustrated, blocks may be provided in an actual circuit block so that processing performed by one circuit block is performed by a plurality of circuit blocks.

In this specification and the like, the terms "film" and "layer" can be interchanged with each other depending on the case or circumstances. For example, the term "conductive layer" can be changed into the term "conductive film" in some cases. Also, the term "insulating film" can be changed into the term "insulating layer" in some cases.

In this specification and the like, it may be possible for those skilled in the art to constitute one embodiment of the invention even when portions to which all the terminals of an active element (e.g., a transistor or a diode), a passive element (e.g., a capacitor or a resistor), and the like are connected are not specified. In other words, one embodiment of the invention is clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function of a circuit is specified, one embodiment of the present invention is clear, and it can be determined that the embodiment is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

In one embodiment of the present invention, a variety of switches can be used as a switch. A switch is brought into a conduction state or a non-conduction state (is turned on or off) to determine whether current flows therethrough or not. Alternatively, a switch has a function of determining and changing a current path. For example, a switch has a function of determining whether current can flow through a path 1 or a path 2 and switching the paths. For example, an electrical switch or a mechanical switch can be used. That is, a switch is not limited to a certain element and can be any element capable of controlling current. Examples of a switch are a transistor (e.g., a bipolar transistor or a metal-oxide-semiconductor (MOS) transistor), a diode (e.g., a PN diode, a PIN diode, a Schottky diode, a metal-insulator-metal (MIM) diode, a metal-insulator-semiconductor (MIS) diode, or a diode-connected transistor), and a logic circuit in which such elements are combined. An example of a mechanical switch is a switch formed using a microelectromechanical system (MEMS) technology, such as a digital micromirror device (DMD). Such a switch includes an electrode that can be moved mechanically, and operates by controlling conduction and non-conduction in accordance with movement of the electrode.

In one embodiment of the present invention, there is no particular limitation on the device structure of a capacitor intentionally provided as an element. For example, a MIM capacitor or a MOS capacitor can be used.

REFERENCE NUMERALS

10: LAT (latch circuit), 11: MUX (multiplexer), 12: AND (AND gate), 13: NOR (NOR gate), 20: AND (AND gate), 21: output timing generation circuit, 22: output signal generation circuit, 23: output timing generation circuit, 32: MUX, 33: MUX, 34: MUX, 35: MUX, 36: MUX, 40: register, 41: register, 42: register, 50_1: RS latch (reset/set latch circuit), 50_2: RS latch, 50_3: RS latch, 53: MUX, 55_1: RS latch, 55_2: RS latch, 553: RS latch, 56_1: AND, 56_2: AND, 56_3: AND, 57: AND, 59: MUX, 100: broadcast system, 110: camera, 111: transmitter, 112: receiver, 113: display device, 120: image sensor, 121: image processor, 122: encoder, 123: modulator, 125: demodulator, 126: decoder, 127: image processor, 128: display portion, 140: Raw data, 141: image data, 142: encoded data, 143: broadcast signal, 144: image data, 145: data signal, 146: digital signal, 147: data stream, 148: data stream, 160: TV (television receiver), 161: broadcast station, 162: artificial satellite, 163: radio wave tower, 164: antenna, 165: antenna, 166A: radio wave, 166B, radio wave, 167A: radio wave, 167B: radio wave, 171: receiver, 172: wireless device, 173: wireless device, 174: receiver, 175: connector portion, 180: circuit, 181: circuit, 181*a*: frame separation circuit, 181*b*: LDPC decoder circuit, 181*c*: authentication processing circuit, 181*d*: descrambler, 182: circuit, 183: circuit, 183*a*: DCT circuit, 183*b*: inter-frame prediction circuit, 183*c*: motion compensation prediction circuit, 200: FPGA, 210: logic array, 211: input/output unit (I/O), 212: clock generator, 213: configuration controller, 214: context controller, 215: row driver, 216: column driver, 220: LE (logic element), 221: RSA (routing switch array), 222: CFM (configuration memory), 222*i*: CFM, 222*oa*: CFM, 222*ob*: CFM, 223: RS (routing switch), 223B: RS, 223C: RS, 225: LE, 230: SW (switch circuit), 230B: SW, 230C: SW, 230D: SW, 231: line, 232: line, 233: line, 234: wiring, 235: latch circuit, 240: MC (memory cell), 241: line, 242: line, 243: line, 244: wiring, 250: arithmetic circuit, 251: replica circuit, 252: DIN (data input portion), 253: data output portion, 255: DOUT, 260: circuit, 270: circuit, 280:

circuit, 290: circuit, 300: ambulance, 301: medical institution, 302: medical institution, 305: high-speed network, 310: camera, 311: encoder, 312: communication device, 315: image data, 316: image data, 320: communication device, 321: decoder, 323: display device, 400*a*: transistor, 400*b*: transistor, 400*c*: transistor, 400*d*: transistor, 400*e*: transistor, 400*f*: transistor, 401: insulating film, 402: insulating film, 403: insulating film, 404: insulating film, 405: insulating film, 406: insulating film, 407: insulating film, 408: insulating film, 409: insulating film, 411: conductive film, 412: conductive film, 413: conductive film, 414: conductive film, 421: conductive film, 422: conductive film, 423: conductive film, 424: conductive film, 430: metal oxide, 431: metal oxide, 432: metal oxide, 433: metal oxide, 441: region, 442: region, 450: substrate, 451: low-resistance region, 452: low-resistance region, 461*a*: region, 461*b*: region 461*c*: region, 461*d*: region, 461*e*: region, 471: conductive film, 472: conductive film, 481: insulating film, 482: semiconductor, 483: conductive film, 484: conductive film, 485: insulating film, 486: insulating film, 487: insulating film, 488: conductive film, 489: conductive film, 601: photoelectric conversion element, 602: transistor, 603: transistor, 604: transistor, 605: transistor, 606: capacitor, 607: node, 608: wiring, 609: wiring, 610: pixel driver, 611: wiring, 621: pixel portion, 622: pixel, 622B: pixel, 622G: pixel, 622R: pixel, 623: pixel, 624: filter, 624B: filter, 624G: filter, 624R: filter, 625: lens, 626: wiring group, 660: light, 700: substrate, 701: element isolation layer, 702: insulating film, 703: insulating film, 704: insulating film, 705: insulating film, 710: plug, 711: plug, 712: plug, 713: plug, 714: plug, 715: plug, 716: plug, 717: plug, 723: conductive film, 730: wiring, 732: wiring, 733: wiring, 734: wiring, 735: wiring, 751: electrode, 752: electrode, 753: insulating film, 781: layer, 782: layer, 783: layer, 784: layer, 785: layer, 786: layer, 787: layer, 788: layer, 789: layer, 824: insulating film, 852: conductive film, 3100: display portion, 3125: light-emitting element, 3130: pixel, 3130B: pixel, 3130C: pixel, 3131: display area, 3132: circuit 3133: circuit, 3135: scan line, 3136: signal line, 3232: transistor, 3233: capacitor, 3431: transistor, 3432: liquid crystal element, 3434: transistor, 3436: node, 4000A: display panel, 4000B: display panel, 4001: substrate, 4002: pixel portion, 4003: signal line driver, 4004: scan line driver, 4005: sealant, 4006: substrate, 4008: liquid crystal layer, 4010: transistor, 4011: transistor, 4012: semiconductor layer, 4013: liquid crystal element, 4014: wiring, 4015: electrode, 4017: electrode, 4018: FPC, 4018*a*: FPC, 4018*b*: FPC, 4019: anisotropic conductive layer, 4020: capacitor, 4021: electrode, 4030: electrode layer, 4031: electrode layer, 4032: insulating layer, 4033: insulating layer, 4035: spacer, 4103: insulating layer, 4110: insulating layer, 4111: insulating layer, 4112: insulating layer, 4510: bank, 4511: light-emitting layer, 4513: light-emitting element, 4514: filler, 6000: display module, 6001: upper cover, 6002: lower cover, 6003: FPC, 6004: touch sensor, 6005: FPC, 6006: display panel, 6007: backlight unit, 6008: light source, 6009: frame, 6010: printed board, 6011: battery, 7000: display device, 7001: housing, 7002: display portion, 7003: support base, 7100: portable information terminal, 7101: housing, 7102: display portion, 7103: band, 7104: buckle, 7105: operation button, 7106: input/output terminal, 7107: icon, 7200: PC (personal computer), 7221: housing, 7222: display portion, 7223: keyboard, 7224: pointing device 7224, 7400: mobile phone, 7401: housing, 7402: display portion, 7403: operation button, 7404: external connection port, 7405 speaker, 7406: microphone, 7500: car, 7551: car body, 7552: wheel, 7553: dashboard, 7554: light, 7600: video camera, 7641: housing, 7642: housing, 7643: display portion, 7644: operation key, 7645: lens, 7646: joint, AM1: analog memory, AM2: analog memory, AM3: analog memory, C1: capacitor, C2: capacitor, C3: capacitor, MO1: transistor, MO2: transistor, MO3: transistor, MR1: transistor, MR2: transistor, MR3: transistor, MS1: transistor, MS11: transistor, SN1: node, SN2: node, SN3: node, TP1: transistor, TP2: transistor.

This application is based on Japanese Patent Application serial no. 2015-082016 filed with Japan Patent Office on Apr. 13, 2015, the entire contents of which are hereby incorporated by reference.

The invention claimed is:

1. A display device comprising a logic circuit,
   wherein the logic circuit comprises latch circuits, multiplexers, an arithmetic circuit, a delay circuit, and an output timing generation circuit,
   wherein each of the latch circuits is capable of receiving a pulse signal from an adjacent logic circuit and outputting a first signal and a second signal,
   wherein a third signal obtained by a logical operation on the first signals controls power supply to the arithmetic circuit and the delay circuit,
   wherein each of the multiplexers is capable of receiving each of the second signals and a binary data signal from an adjacent logic circuit and outputting the second signal or the binary data signal to the arithmetic circuit,
   wherein the second signal is obtained by delaying the first signal in each of the latch circuits,
   wherein the arithmetic circuit is capable of receiving the second signal or the binary data signal and outputting a fourth signal,
   wherein the delay circuit is capable of receiving the third signal and outputting a fifth signal,
   wherein the fifth signal is obtained by delaying the third signal so as to correspond to a delay in a critical path of the arithmetic circuit,
   wherein the output timing generation circuit is capable of receiving a sixth signal obtained by a logical operation on the third signal and the fifth signal and resetting the latch circuits,
   wherein each of the multiplexers is configured to output the binary data signal from the adjacent logic circuit when the display device displays an image for a 8k broadcast, and
   wherein each of the multiplexers is configured to output the second signal when the display device displays an image for a 4K broadcast or a 2K broadcast.

2. The display device according to claim 1,
   wherein a clock frequency used in the logic circuit is a first frequency when the image has a first resolution which, and
   wherein the clock frequency used in the logic circuit is a second frequency lower than the first frequency when the image has a second resolution which is lower than the first resolution.

3. The display device according to claim 1,
   wherein a period when the pulse signal is high level is shorter than a period when the binary signal is high level.

4. The display device according to claim 1, further comprising a configuration memory,
   wherein the configuration memory is electrically connected to the multiplexers, wherein the configuration memory comprises a storage capacitor and a transistor connected to the storage capacitor, and wherein a channel formation region of the transistor is formed from an oxide semiconductor.

5. The display device according to claim 1, further comprising a receiver, wherein the receiver comprises a demodulator and a decoder comprising the logic circuit, wherein the demodulator has a function of demodulating the broadcast signal, and wherein the decoder has a function of processing the demodulated broadcast signal.

* * * * *